United States Patent
Aoshima

(10) Patent No.: US 6,713,985 B2
(45) Date of Patent: Mar. 30, 2004

(54) DRIVE CONTROL APPARATUS FOR STEPPING MOTOR

(75) Inventor: Chikara Aoshima, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/819,863

(22) Filed: Mar. 29, 2001

(65) Prior Publication Data

US 2002/0008491 A1 Jan. 24, 2002

(30) Foreign Application Priority Data

| Mar. 31, 2000 | (JP) | 2000-096081 |
| Apr. 18, 2000 | (JP) | 2000-116078 |
| Apr. 18, 2000 | (JP) | 2000-116079 |
| Jul. 27, 2000 | (JP) | 2000-226729 |
| Oct. 24, 2000 | (JP) | 2000-323816 |

(51) Int. Cl.⁷ ............................................. H02P 8/00
(52) U.S. Cl. ................. 318/696; 318/685; 318/599; 388/804
(58) Field of Search .................... 318/685, 696, 318/599; 388/804

(56) References Cited

U.S. PATENT DOCUMENTS

| 4,518,907 A | * | 5/1985 | Giguere .................... 318/696 |
| 4,775,902 A | * | 10/1988 | Trovato et al. .......... 360/78.13 |
| 5,384,506 A | | 1/1995 | Aoshima ................. 310/49 R |
| 5,831,356 A | | 11/1998 | Aoshima ................. 310/49 R |
| 5,925,945 A | | 7/1999 | Aoshima ................. 310/49 R |
| 5,942,872 A | * | 8/1999 | Steger et al. .............. 318/696 |
| 5,945,753 A | | 8/1999 | Maegawa et al. ......... 310/68 B |
| 5,969,453 A | | 10/1999 | Aoshima .................... 310/156 |
| 5,973,425 A | | 10/1999 | Aoshima ................. 310/49 R |
| 6,046,517 A | | 4/2000 | Sasaki et al. ......... 310/40 MM |
| 6,081,053 A | | 6/2000 | Maegawa et al. ........ 310/49 R |
| 6,118,963 A | * | 9/2000 | Fujikura et al. ............ 318/696 |
| 6,157,107 A | | 12/2000 | Aoshima et al. ............. 310/56 |
| 6,172,440 B1 | | 1/2001 | Sasaki et al. ............... 310/156 |

FOREIGN PATENT DOCUMENTS

| JP | 60-140934 | 9/1985 |
| JP | 6-64281 | 3/1994 |
| JP | 6-250070 | 9/1994 |
| JP | 9-023695 | 1/1997 |
| JP | 9-047088 | 2/1997 |
| JP | 9-331555 | 12/1997 |
| JP | 9-331666 | 12/1997 |

OTHER PUBLICATIONS

U.S. patent application Ser. No. 09/944,068, Aoshima, filed Sep. 4, 2001.*

* cited by examiner

Primary Examiner—Karen Masih
(74) Attorney, Agent, or Firm—Fitzpatrick, Cella, Harper & Scinto

(57) ABSTRACT

A driving apparatus for a stepping motor, especially which, in micro step driving, partly changes a combination of an energization value to each phase of a motor depending upon a rotational direction of the motor and accurately controls a stopping position of a driven object which is driven by the motor.

18 Claims, 31 Drawing Sheets

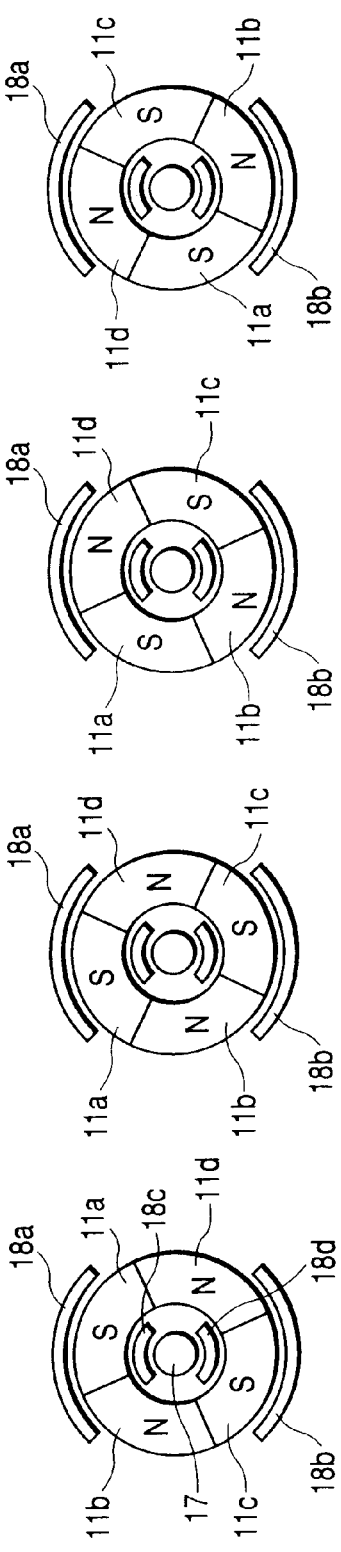

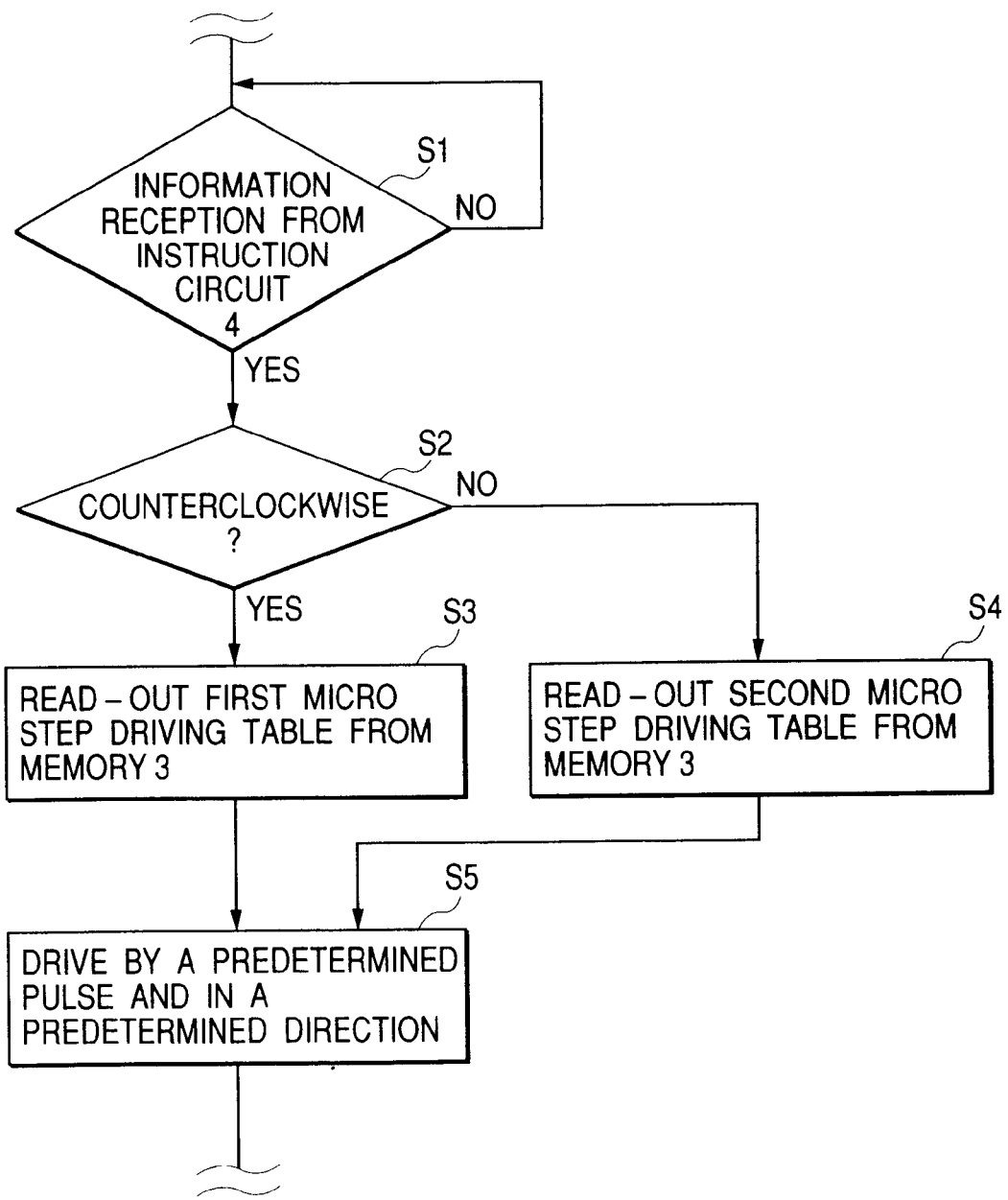

An : ENERGIZATION VALUE TO COIL 12
Bn : ENERGIZATION VALUE TO COIL 13

DRIVE CONTROL APPARATUS FOR STEPPING MOTOR

BACKGROUND OF THE INVENTION

1. Field of the Invention

The present invention relates to a method and apparatus for driving a stepping motor, and more particularly, to a method and apparatus for driving a stepping motor using a micro step driving mode where an exciting current which is increased and decreased step by step is energized to each phase.

2. Related Background Art

Various instruments are driven using a motor driven by pulse signals, for example, a stepping motor. A shutter device, for example, where a shutter blade is driven to be opened and shut using the stepping motor is known as disclosed in Japanese Utility Model Application Laid-Open No. 60-140934, Japanese Patent Publication No. 6-64281 and the like. A lens barrel device where a lens is moved along an optical axis using the stepping motor is also known as proposed in Japanese Patent Application Laid-Open No. 6-250070, for example. In the above mentioned stutter device and lens barrel, driving frequency or number of driving pulses (steps) of the stepping motor is controlled so that accurate control is carried out with respect to a speed and position of opening and closing of the shutter blade or a position of the lens along the optical axis, thereby permitting more proper photographing with a camera compared with the case of using a direct current motor or the like.

As a technique of minute control of positions, a micro step driving mode is known where an energized electrical current to a coil varies step by step to stop a rotor of the motor in a position corresponding to the energized electrical current. Also known is an energizing method to a coil of a stepping motor of two-phase permanent magnet type disclosed in Japanese Patent Application Laid-Open No. 9-047088 or the like.

A typical energizing method of the micro step driving is shown in FIG. 39. In this figure, a horizontal axis shows passage of time and a vertical axis shows values of electrical currents which flows in phases A and B of coils which are shifted 90° each other. Each electrical current value is divided into a large number of steps and periodically repeats increasing and decreasing, and energizing the electrical current of such a value in each phase step by step allows the motor to be rotatably driven in small steps.

However, in the case where such a micro step driving mode is used to drive the shutter blade, lens or other delicate instruments by the stepping motor and stop to hold the rotor of the stepping motor in the position corresponding to the energized electrical current to the coil, there is a problem that stopping positions vary due to backlash of a reduction gear of a gear or a screw or due to inertial friction of a sliding portion.

Full step driving has a higher speed of rotation and output torque of the motor than the micro step driving does, while the micro step driving obviously has a higher rotational resolution of the output shaft of the motor than the full step driving does. For this reason, in case of situating a driven object in a predetermined position, the object is driven at high speed by the full step driving when far from a target position and on the way driven by the micro step driving when close to the target position to be minutely positioned, which permits positioning at high speed and accuracy.

Alternatively, in order to start moving smoothly, the object is driven at low speed by the micro step driving at first, gradually speeded up, and from more than predetermined speed, driven at much higher speed by the full step driving, which permits smooth driving of the driven object at high speed.

Energizing when switching the driving mode of the stepping motor from the micro step driving to full step driving or vice versa during driving is disclosed in Japanese Patent Application Laid-Open No. 9-023695 and herein shown in FIG. 40. The stepping motor of PM type using a two phase permanent magnet is, for example, disclosed in Japanese Patent Application Laid-Open No. 9-331666.

This motor is configured in such a manner that cylindrically formed is a rotor in the form of the permanent magnet which is circumferentially equally divided and alternately attracted to different poles, that a first coil, a rotor and a second coil are arranged in turn axially of the rotor, that a first outer magnetic pole and a first inner magnetic pole excited by the first coil are faced to an outer surface and an inner surface of the rotor, and that a second outer magnetic pole and a second inner magnetic pole excited by the second coil are faced to the outer surface and the inner surface of the rotor, and a rotor axis as a rotary axis is taken out of the cylindrical permanent magnet.

A sectional view thereof is shown in FIG. 41. A relationship between phase of attraction of the rotor having the permanent magnet and the first outer magnetic pole and first inner magnetic pole is shifted 360°/(2×number of attracted poles) with respect to a relationship between the phase of attraction of the rotor in the form of the permanent magnet and the second outer magnetic pole and second inner magnetic pole, namely shifted 45° in Japanese Patent Application Laid-Open No. 9-331666 which has four poles.

However, in the case where energizing of the coil is changed from the micro step driving to full step driving as shown in FIG. 40, taking the stepping motor proposed in Japanese Patent Application Laid-Open No. 9-331666 mentioned above for example, the position of the rotor at a time point T1 in FIG. 40 is as shown in FIGS. 42A and 42B, and at a time point T2 as shown in FIGS. 43A and 43B.

FIGS. 42A and 43A show sections taken along A of FIG. 41, and FIGS. 42B and 43B show sections taken along B of FIG. 41. There is a difference of 74 degree between positions of rotation of the rotor shown in FIGS. 42A and 42B and FIGS. 43A and 43B, which means that the change is not smoothly made. Therefore, vibration or step out occurs to make it impossible to smoothly drive the driven object at high speed and to position the same at high speed and accuracy.

In the case where the micro step driving mode is used to drive the lens or others by the stepping motor and stop to hold the rotor of the stepping motor in the position corresponding to the energized electrical current to the coil, there is the problem that the stopping positions vary due to the backlash of the reduction gear of the gear or screw or due to the inertial friction of the sliding portion.

As another problem of the micro step control, if a driving force is low for positioning the rotor in a position where the rotor is stopped, the rotor is influenced by the friction or driving load and cannot stop at the predetermined position, leaving a difference in stopping position. Especially, when the position of the rotor comes closer to an original position to be positioned by the micro step control, the rotational driving force becomes lower which is produced to try to position in the original position so that only a slight friction force is produced which makes it difficult to position in the original position.

On the other hand, when merely rotated, the rotor is easy to be rotated with a certain delay relative to an electrical signal even if there is the friction. Namely, if the position is delayed from the original position relative to a certain energizing condition, the driving force increases to a certain extent so that the force for trying to rotate to the original position is relatively high. For this reason, the influence of the friction is less in mere rotation compared to stopping to position in the original position as described above.

Increasing the driving force can reduce the difference in stopping position, which requires high current flown in the coil, so that there is a disadvantage of consuming high power and of heating the motor, which results in a poor characteristic.

A conventional stepping motor of a small cylindrical shape which carries out the micro step control or the like is as shown in FIG. 44. A stator 102 is configured in such a manner that a stator coil 105 is concentrically winded around a bobbin 101 which is axially fixed in a nip between two stator yokes 106, that stator teeth 106*a* and 106*b* are alternately arranged in a circumferential direction of an inner diameter of the bobbin 101 in the stator yoke 106, and that the stator yoke 106 integral with the stator teeth 106*a* and 106*b* in a casing 103.

Fixed to one of two pairs of casing 103 are a flange 115 and a bearing 108, and to the other is another bearing 108. A rotor 109 is in the form of a rotor magnet 111 fixed to a rotor axis 110 and the rotor magnet 111 makes a radial air gap with the stator yoke 106*a* on the stator 102. The rotor axis 110 is rotatably supported between two bearings 108.

A stepping motor driven by one coil is as shown in FIG. 46 which is often used in clocks. Reference numeral 201 denotes a rotor in the form of the permanent magnet, 202 and 203; stators, 204; a coil.

The above conventional stepping motor of small size shown in FIG. 44 has a disadvantage of having an outer shape of the motor in larger size since the casing 103, bobbin 101, stator coil 105 and stator yoke 106 are concentrically arranged on an outer periphery of the rotor. There is also a disadvantage of not increasing output of the motor since magnetic flux generated by energizing the stator coil 105 mainly passes an end surface 106*a*1 of the stator teeth 106*a* and an end surface 106*b*1 of the stator teeth 106*b* as shown in FIG. 45 and is not effectively applied on the rotor magnet 111.

In FIG. 46, the magnetic flux generated by energizing the coil is concentrated on a small gap between a stator 202 and a stator 203 and is not effectively applied on the magnet. The applicant proposes the motor which solves such problems in Japanese Patent Application Laid-Open No. 9-331555 mentioned above.

This motor as proposed is configured in such a manner that cylindrically formed is the rotor in the form of the permanent magnet which is circumferentially equally divided and alternately attracted to the different poles, that the first coil, rotor and second coil are arranged in turn axially of the rotor, that the first outer magnetic pole and first inner magnetic pole excited by the first coil are faced to the outer surface and inner surface of the rotor, and that the second outer magnetic pole and second inner magnetic pole excited by the second coil are faced to the outer surface and inner surface of the rotor, and the rotor axis as the rotary axis is taken out of the cylindrical permanent magnet.

The motor with such a configuration has high output and can reduce the outer size of the motor, but it is desired to facilitate jointing the rotor axis and permanent magnet. Further, in the above configuration, thinning of the magnet results in reducing a distance between the first outer magnetic pole and first inner magnetic pole and a distance between the second outer magnetic pole and second inner magnetic pole and thereby reducing magnetic resistance of a magnetic circuit. According to this, the electrical current flown to the first and second coils of small amount can generate much magnetic flux.

However, the motor of the type as disclosed in the Japanese Patent Application Laid-Open No. 9-331666 or the like axially requires a certain length. For this reason, recently desired is a driving transmitting device having a micro motor with an axially short length. The driving transmitting device having the micro motor with the axially short length is especially required when used as the driving transmitting device arranged in a barrel of a camera and adopted for driving the shutter blade, shutter, lens and the like.

SUMMARY OF THE INVENTION

One aspect of the invention is to provide a driving apparatus for a stepping motor using a micro step driving mode where an exciting current which is increased and decreased step by step is energized to each phase comprising:

a drive control circuit which carries out energization to each phase by a predetermined combination of energization values to each phase, said circuit partly changing the combination of the energization values to each said phase depending upon a rotational direction of a motor.

One aspect of the invention is to provide a driving control apparatus for a stepping motor having a full step energizing mode where an exciting current for step driving is energized to each phase and a micro step driving mode where a step in the full step energizing mode is divided into a plurality of steps and the exciting current which is increased and decreased step by step is energized to each phase comprising:

a switch control circuit for carrying out switching from full step energization to micro step energization and switching from the micro step energization to the full step energization at a timing such that an absolute value of an energized electrical current in each phase during the micro step energization is the same or substantially the same One aspect of the invention is to provide a driving apparatus for a stepping motor using a micro step driving mode where an exciting current which is increased and decreased step by step is energized to each phase comprising:

a drive control circuit which carries out the energization to each phase by a predetermined first combination of the energization values to each phase or a predetermined second combination of the energization values to each phase which has a larger whole amount of energization compared to said first combination; and a selection circuit for selecting the first combination or the second combination.

One aspect of the invention is to provide a driving apparatus for a stepping motor of two-phase PM type comprising:

memorizing means for memorizing the first micro step driving table constituted by a combined value of the PWM values energized to each phase;

calculating circuit for calculating the value of said first micro step driving table with a first function;

setting means for setting number of driving steps of the stepping motor; and a control circuit for carrying out the micro step driving selectively by the first micro step driving table or a micro step driving table after the calculation of the value of said first micro step driving table with the first function by said calculating circuit depending upon an area in the step set by said setting means.

One aspect of the invention is to provide a driving apparatus for a stepping motor having a full step energizing mode where an exciting current for step driving is energized to each phase and a micro step driving mode where a step in the full step energizing mode is divided into a plurality of steps and the exciting current which is increased and decreased step by step is energized to each phase comprising:

memorizing means for memorizing at least a first micro step driving table;

calculating circuit for calculating the value of said first micro step driving table with a first function;

full step driving means for driving the stepping motor by full steps;

means for setting number of driving steps of the stepping motor;

means for determining whether the number of steps set by said means for setting the number of steps is larger than a predetermined number of steps set in advance;

means for commencing the micro step driving by the first micro step driving when said number of steps is determined to be larger than the predetermined number of steps;

means for switching to the full step driving after said micro step driving;

means for switching from the full step driving to a second micro step driving by the micro step driving table after the calculation of the value of first micro step driving table with the first function by said calculation means after the switching by said means for switching.

One aspect of the invention is to provide a driving force transmitting apparatus comprising:

a first driving device having a magnet which is, at least at an outer peripheral surface thereof, circumferentially divided and alternately attracted to different poles to be rotatable, a gear provided integrally with said magnet and having teeth of number corresponding to the number of attracted poles of the magnet, a coil aligned with said magnet in the axial direction, a stator faced, at an outer magnetic pole portion and an inner magnetic pole portion excited by a coil, to an outer surface and an inner surface of said magnet;

a second driving device having a magnet which is, at least at an outer peripheral surface thereof, circumferentially divided and alternately attracted to different poles to be rotatable, a gear provided integrally with said magnet and having teeth of number corresponding to number of attracted poles of the magnet, a coil aligned with said magnet in the axial direction, a stator faced, at an outer magnetic pole portion and a inner magnetic pole portion excited by said coil, to an outer surface and an inner surface of said magnet; and a transmitting mechanism having a gear portion in mesh with a gear of said first driving device and said second driving device.

One aspect of the invention is to provide a driving force transmitting apparatus comprising:

a first driving device having a magnet which is, at least at an outer peripheral surface thereof, circumferentially divided and alternately attracted to different poles to be rotatable, a gear provided integrally with said magnet, a coil aligned with said magnet in the axial direction, a stator faced, at an outer magnetic pole portion and a inner magnetic pole portion excited by a coil, to an outer surface and an inner surface of said magnet;

a second driving device having a magnet which is, at least at an outer peripheral surface thereof, circumferentially divided and alternately attracted to different poles to be rotatable, a gear provided integrally with said magnet, a coil aligned with said magnet in the axial direction, a stator faced, at an outer magnetic pole portion and a inner magnetic pole portion excited by said coil, to an outer surface and an inner surface of said magnet; and a transmitting mechanism having a gear portion in mesh with a gear of said first driving device and said second driving device.

Further objects of the present invention will become clear from the following description of the embodiments taken in conjunction with the accompanying drawings.

BRIEF DESCRIPTION OF THE DRAWINGS

FIGS. 4A, 4B, 4C, 4D, 4E, 4F, 4G and 4H are sectional views taken along the lines A—A and B—B of FIG. 3;

FIG. 7 is a flow chart showing a flow of operation of a control circuit;

DETAILED DESCRIPTION OF THE PREFERRED EMBODIMENTS

Embodiment 1
[Driving Device of Stepping Motor]

Figure 1:
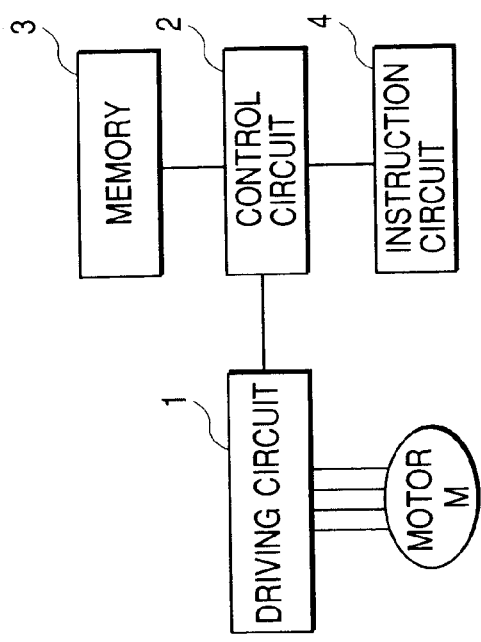
FIG. 1 is a block diagram of an electrical circuit according to a first embodiment of the present invention.
Figure 2:
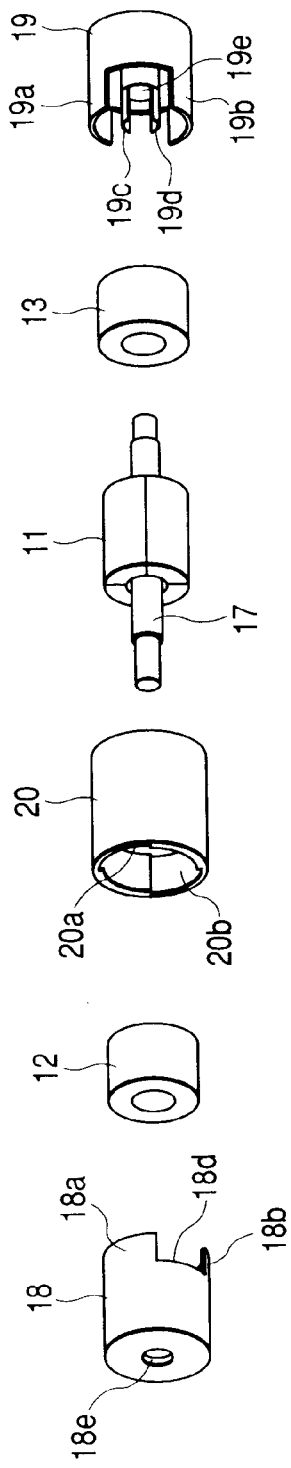
FIG. 2 is an exploded perspective view of a stepping motor.

FIG. 1 is a block diagram of the electric circuit for driving a stepping motor. In the drawing, M denotes a stepping motor, I a driving circuit, 2 a control circuit, 3 a memory and 4 an instruction circuit. The driving circuit 1 is for letting the energized electrical current specified by the control circuit 2 flow to a coil of the stepping motor and composed of a circuit having H circuits in the corresponding number of coils which is capable of selectively energizing coils composed of four pieces of transistors in both forward and reverse directions. In the description of the present embodiment, a two-phase stepping motor is used and therefore at least two pieces of the two-phase motors are provided. The instruction circuit is for inputting a rotational direction and a driving amount (the number of steps) to the control circuit 2.

The memory 3 stores, to be described in detail later by using FIGS. 6A and 6B, a first micro step drive table comprising combined values of a PWM value energizing to each phase of the coil of the stepping motor M and a second micro step drive table comprising combined values of the PWM value which is different at least in one part from the combined values of the PWM value energizing to each phase of the first micro step drive table.

Although the control circuit 2 transmits a signal to the driving circuit 1 so that the stepping motor M is driven by the driving amount inputted by the instruction circuit 4, at this time, it selects either the first micro step drive table of the memory 3 or the second micro step drive table in response to the driving direction and drives the driving circuit 1 so that each phase of the coil is energized by the combination of the PWM values in response to the selected table.

The stepping motor used in the present embodiment uses the motor disclosed, for example, by Japanese Patent Application Laid-Open No. 9-331666 and the configuration thereof will be described hereinafter.

In FIG. 2 to FIGS. 4A to 4H, reference numeral 11 denotes a rotator of the motor, that is, a cylindrical magnet constituting the rotor, and this magnet 11 circumferentially divides its outer peripheral surface into N portions (four portions in the present embodiment) which are taken as magnetized portions magnetized with a S pole and an N pole alternatively 11a, 11b, 11c and 11d, and these magnetized portions 11a and 11c are magnetized with the S pole and the other magnetized portions 11b, 11d are magnetized with the N pole. Numeral reference 17 denotes an output axis and this output axis 17 is fixed to the magnet 11 which is a rotor, and these output axis 17 and magnet 11 constitute the rotor. Reference numerals 12 and 13 denote cylindrical coils, and the coils 12 and 13 are concentric with the above described magnet 11 and arranged axially in a position which pinches the magnet 11. The coils 12 and 13 have outer diameters which are approximately the same in size as the outer diameter of the above described magnet 11.

Reference numerals 18 and 19 are a first stator and a second stator which are composed of soft magnetic materials. The phases of the first stator 18 and the second stator 19 are arranged so as to be shifted 180°/n away, that is, 45° away, and these first stator 18 and second stator 19 are composed of an outer cylinder and an inner cylinder. A coil 12 is disposed between the outer cylinder and the inner cylinder of the first stator 18, and the energizing to the coil 12 excites the first stator 18. The outer cylinder and the inner cylinder of the first stator 18 have the tip portion forming outer magnetic poles 18a, 18b and inner magnetic poles 18c, 18d, and the phases of the inner magnetic pole 18c and the inner magnetic pole 18d are formed so as to be shifted 360/° (n/2) away, that is, 180° away to be mutually in the same phase. The outer magnetic pole 18a is arranged in opposite to the inner magnetic pole 18c and the outer magnetic pole 18b is also arranged in opposite to the inner magnetic pole 18d. The outer magnetic poles 18a, 18b and the inner magnetic poles 18c, 18d of the first stator 18 are disposed so as to pinch one end side of the magnet 11 in opposing to the outer peripheral surface and the inner peripheral surface of one end side of the magnet 11. One end portion of a rotary shaft 17 is rotatably engaged with a hole 18e of the first stator 18.

A coil 13 is disposed between the outer cylinder and the inner cylinder of the second stator 19, and the energizing to the coil 13 excites the second stator 19. The outer cylinder and the inner cylinder of the second stator 19 have the tip portion forming the outer magnetic poles 19a, 19b and the inner magnetic poles 19c, 19d, and the phases of the inner magnetic pole 19c and the inner magnetic pole 19d are formed so as to be shifted 360°/(n/2) away, that is, 180° away to be mutually in the same phase. The outer magnetic pole 19a is arranged in opposite to the inner magnetic pole 19c and the outer magnetic pole 19b is arranged in opposite to the inner magnetic pole 19d. The outer magnetic poles of 19a, 19b and the inner magnetic poles 19c, 19d of the second stator 19 are disposed so as to pinch the other end side of a permanent magnet 11 in opposing to the outer peripheral surface and the inner peripheral surface of the other end side of the permanent magnet 11. A hole 19e of the second stator 19 is rotatably engaged with the other end portion of the rotary axis 17.

Accordingly, the magnetic flux generated by the coil 12 crosses the magnet 11 which is a rotor between the outer magnetic poles 18a, 18b and the inner magnetic poles 18c, 18d and acts effectively on the magnet 11 which is a rotor, while the magnetic flux generated by the coil 13 crosses the magnet which is a rotor between the outer magnetic poles 19a, 19b and the inner magnetic poles 19c, 19d and acts effectively on the magnet 11 which is a rotor, thereby enhancing the output of the motor.

Reference numeral 20 denotes a coupling ring as a cylindrical member which is composed of a soft magnetic material, and grooves 20a, 20b are disposed at one end side of the inner side of this coupling ring 20, and grooves 20c, 20d having phases shifted by 45° away against the grooves 20a, 20b are disposed at the other end side. The outer magnetic poles 18a, 18b of the first stator 18 are engaged with the grooves 20a, 20b and the outer magnetic poles 19a, 19b of the second stator 19 are engaged with the grooves 20c, 20d. These engaged portions are fixed by an adhesive agent so that the first stator 18 and the second stator 19 are mounted on the coupling ring 20. These first stator 18 and second stator 19 allow the tips of the outer magnetic poles 18a, 18b and the inner magnetic poles 18c, 18d to oppose to the tips of outer magnetic poles 19a, 19b and the inner magnetic poles 19c, 19d and are fixed to the coupling ring 20 with the clearance between the outer magnetic poles 18a, 18b and the outer magnetic poles 19a, 19b separated by the width between the inner projecting portions 20e, 20f.

Figure 3:
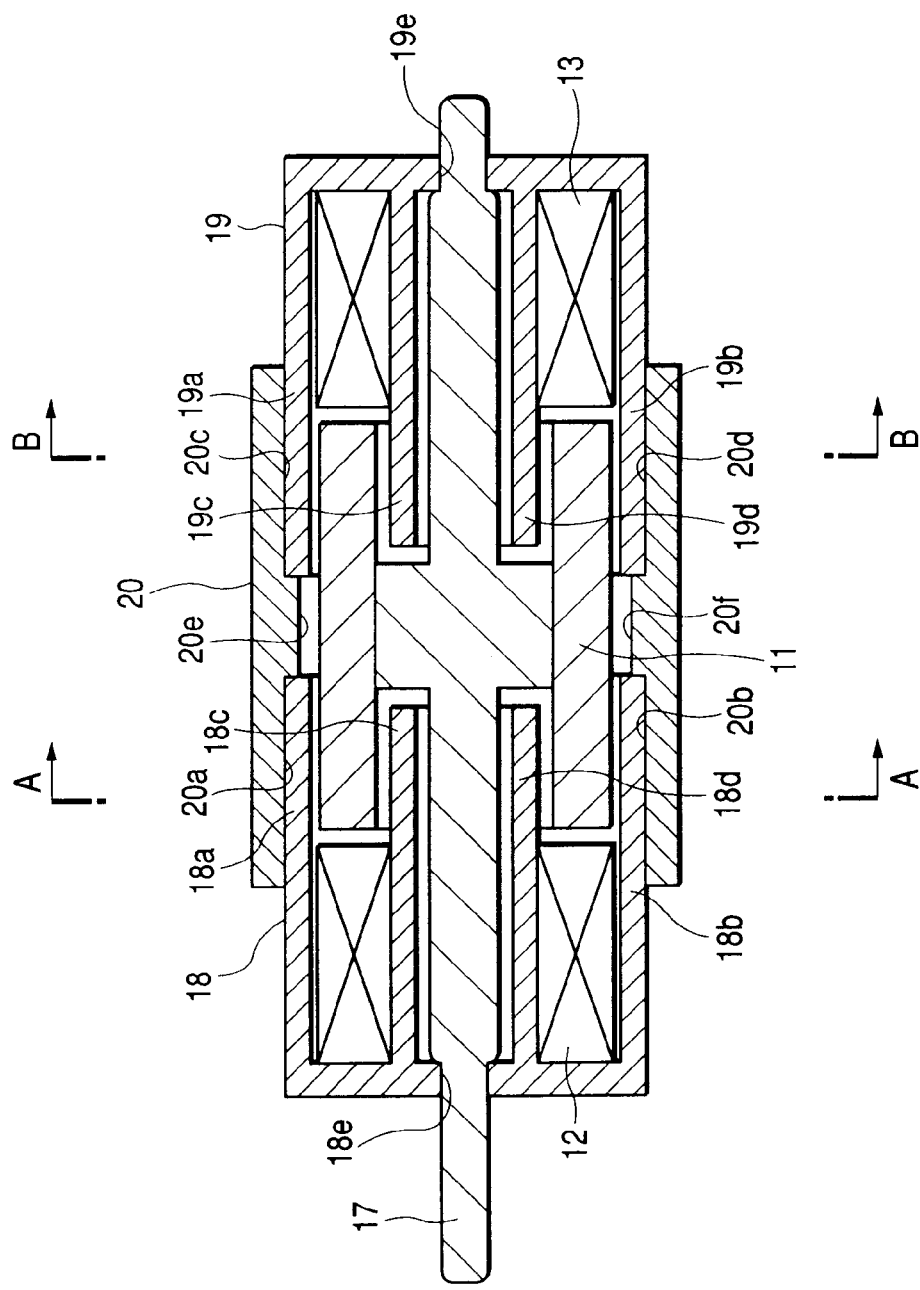
FIG. 3 is a sectional view axially of the stepping motor after assembly.

FIG. 3 is a sectional view of the stepping motor. FIGS. 4A, 4B, 4C and 4D show sectional views cut along A—A line in FIG. 3 and FIGS. 4E, 4F, 4G and 4H show sectional views cut along B—B line in FIG. 3. FIGS. 4A and 4E are sectional views at the same point, FIGS. 4B and 4F are sectional views at the same point, FIGS. 4C and 4G are sectional views at the same point and FIGS. 4D and 4H are sectional views at the same point.

Next, the operation of this stepping motor will be described. When, by energizing the coils 12 and 13 from the state of FIGS. 4A and 4E, the outer magnetic poles 18a, 18b of the first stator 18 are excited as N poles and the inner magnetic poles 18c, 18d as S poles, and the outer magnetic poles 19a, 19b are excited as S poles and the inner magnetic poles 19c, 19d as N poles, the magnet 11 which is a rotor revolves 45° counterclockwise and is put in the state as shown in FIGS. 4B and 4F.

Next, when the energizing to the coil 12 is reversed and the outer magnetic coils 18a, 18b of the first stator 18 are excited as S poles and the inner magnetic poles 18c, 18d as N poles and the outer magnetic poles 19a, 19b are excited as S poles and the inner magnetic poles 19c, 19d as the N poles, the magnet 11 which is a rotor revolves further by 45° counterclockwise and is put in the state as shown in FIGS. 4C and 4G.

Next, when the energizing to the coil 13 is reversed and the outer magnetic poles 19a, 19b of the second stator 19 are excited as N poles and the inner magnetic poles 19c, 19d as S poles and the outer magnetic poles 18a, 18b of the first stator 18 are excited as S poles and the inner magnetic poles 18c, 18d as N poles, the magnet 11 which is a rotor revolves 45° counterclockwise and is put in the state as shown in FIGS. 4D and 4H. Hereinafter, by switching the energizing directions of the coil 12 and the coil 13 in order in this way, the magnet 11 which is a rotor revolves to the positions corresponding to the energized phases. In contrast, when the energizing to the coils is switched from the state as shown in FIGS. 4D and 4H to the state as shown in FIGS. 4C and 4G, and further to the state as shown in FIGS. 4B and 4F and FIGS. 4A and 4E, the magnet 11 revolves clockwise.

Figure 5A:
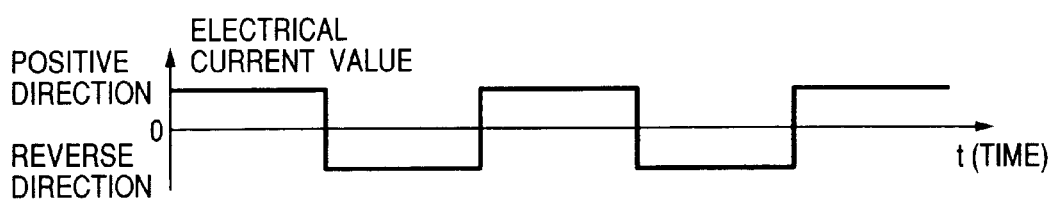
FIGS. 5A an 5B are diagrams showing a relationship between an energized electrical current to a coil and passage of time when the stepping motor is driven by full step driving.
Figure 5B:
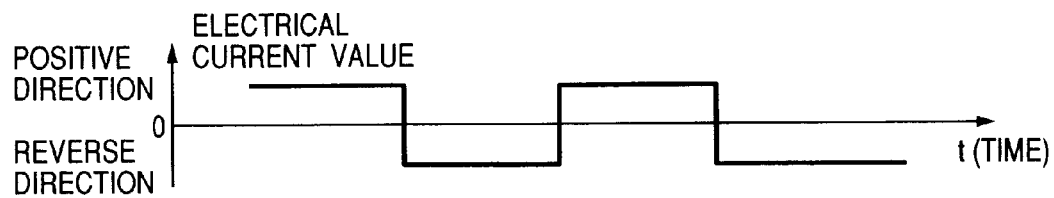

The above is the description of a full step drive where the switching of energizing to the coils 12, 13 is performed at a predetermined value. The state of the energized electrical current to the coils 12, 13 is shown in FIGS. 5A and 5B. FIG. 5A is an energized state of the coil 12 and FIG. 5B is an energized state of the coil 13.

As described above, in place of the full step driving system where the energizing to the coils 12, 13 is switched to a predetermined value, the ratio of an electric current value energizing to each coil is changed and the electric current which increases or decreases step by step gradually is let flow to each phase so that the stepping motor can be driven by using the micro step drive system which allows a rotor, that is, the magnet 11 to stop at a position between each position. The present invention drives the stepping motor by using this micro step drive system. At this time, each coil is energized by reading the electric current value from the two micro step drive tables which are stored in the memory as follows.

Figure 6A:
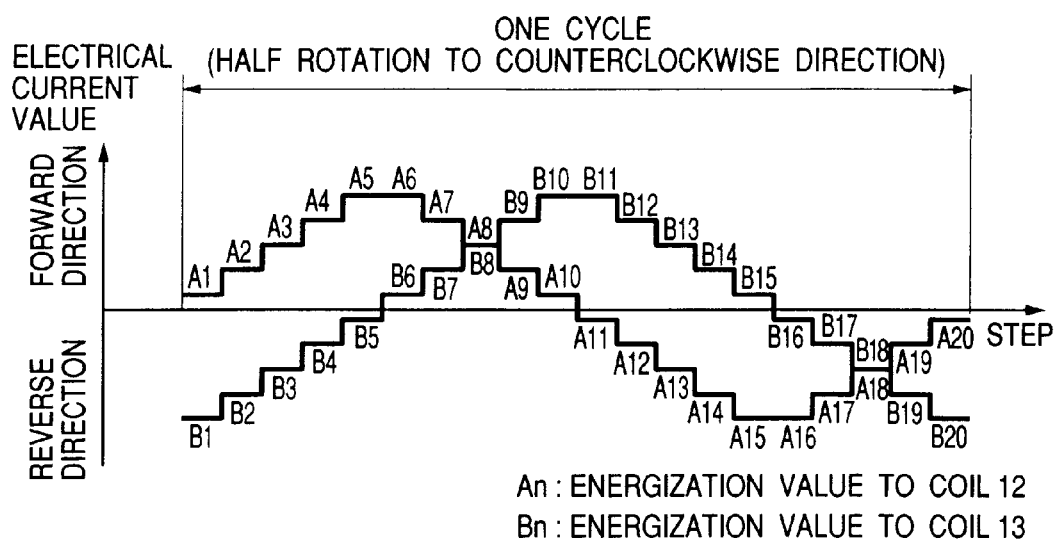
FIGS. 6A and 6B are diagrams showing a relationship between the energized electrical current to the coil and a position of a rotor when the stepping motor is counterclockwise and clockwise driven by micro step driving.

FIG. 6A is a drawing to show a relation between the energized electric current of the coils 12, 13 and the number of steps when the energization was performed under the first micro step drive table which is stored in the memory 3. The memory 3 stores the table indicating the ratio of the electric current value energizing to the coils 12, 13 of (A1, B1), (A2, B2), (A3, B3), . . . , (Am, Bm) as the first micro step drive table. A1, A2, A3, . . . , and Am are the ratios of the electric current values energizing to the coil 12 and B1, B2, B3, . . . , and Bm are the ratios of the electric current values energizing to the coil 13. When a pulse width modulation system (PWM control system) of an applied voltage is adapted as a system of changing the electric current value, the values stored in the first micro step drive table and the second micro step drive table store the data of the energized duty values.

Figure 6B:
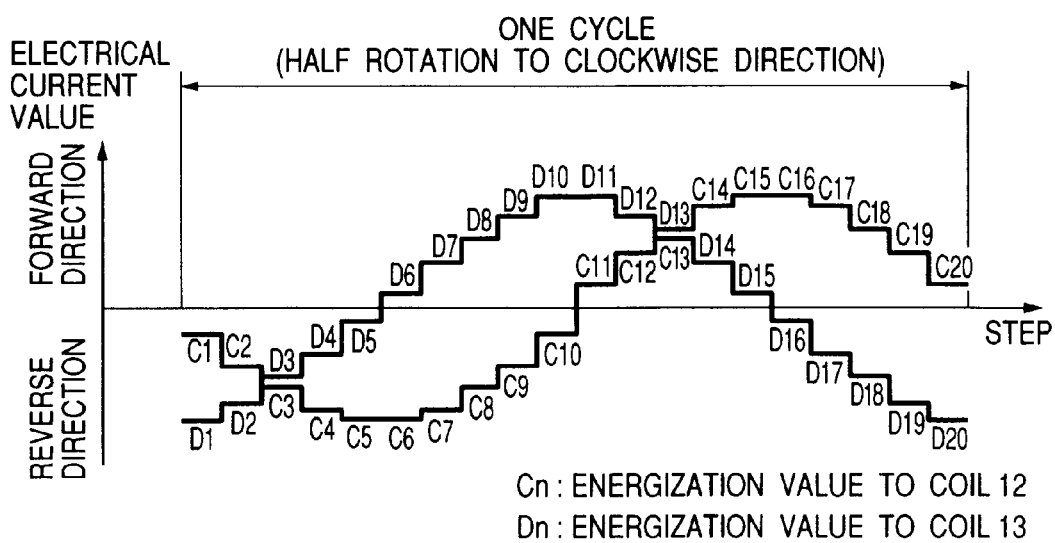

FIG. 6B is a drawing to show a relation between the energized electric current of the coils 12, 13 and the number of steps when the energization was performed under the second micro step drive table which is stored in the memory 3. The memory 3 stores the table indicating the ratio of the electric current value energizing to the coils 12, 13 of (C1, D1), (C2, D2), (C3, D3), . . . , and (Cm, Dm) as the second micro step drive table. C1, C2, C3, . . . , and Cm are the ratios of the electric current values energizing to the coil 12 and D1, D2, D3, . . . , and Dm are the ratios of the electric current values energizing to the coil 13. Similarly, when the pulse width modulation system (PMW control system) of the applied voltage is adapted as the system of changing the electric current value, the values stored in each table store the data of the energized duty values.

The first micro step drive table and the second micro step drive table are different at least in some of the values, which will be described later.

In the present embodiment, the magnet 11 which is a rotor performs the switching of the energizing to the coils 12, 13 according to (A1, B1), (A, B2), (A3, B3), . . . , and (Am, Bm) in two cycles so as to make one rotation counterclockwise. Or the magnet performs the switching of the energizing the coils 12, 13 according to (C1, D1), (C2, D2), (C3, D3), . . . , and (Cm, Dm) in two cycles so as to make one rotation clockwise.

For example, if m is taken as 20, the magnet 11 which is a rotor makes one rotation by 40 steps. When the relations of A(21−p)=Cp and B(21−p)=Dp are established, which is movable in the conventional micro step drive, that is, movable in the same micro step drive table but not depending on the rotational direction, the position of the magnet 11 which is a rotor and rotated q steps clockwise and the position rotated (40−q)steps counterclockwise reach agreement.

When an object is driven by the stepping motor, it is driven by using a gear or a lead screw. However, due to back lash or dry friction of a gear and a lead screw, it does not stop at the same position depending on the drive direction. Hence, the present invention disposes the first micro step drive table and the second micro step drive table which is composed of the combination of the PWM values which are different at least in some of the combined values of the PWM value energizing to each phase of the first micro step drive table. The values of these tables take into consideration the back lash or the dry friction of the driven object, and the value of the table is determined in such a manner that the position of the object which rotated counterclockwise and stopped by using the first micro step drive table conforms to the position of the driven object which rotated clockwise and stopped by using the second micro step drive table.

That is, when the position rotated by the q step clockwise and the position rotated by 40−q counterclockwise are taken into consideration, assuming that if 1≦q≦20, p=q and, on the other hand, if 21≦q≦40, p=q−20, a duty ratio of the position rotated by the q step clockwise can be expressed by Cp and Dp. On the other hand, the duty ratio of the position rotated by 40−q counterclockwise can be expressed by A(21−p) and B(21−p). In this case, when the values of the duty ratios Cp and Dp of the position rotated by the q step clockwise and the values of the duty ratios A(21−p) and B(21−p) of the position rotated by 40−q counterclockwise are compared, at least more than one pair are put into a relation of A(21−p)≠Cp or B(21−p)≠Dp. Under such relation, though the stopping position of the stepping motor itself differs depending on whether it stops from clockwise or counterclockwise, the stopping position of the driven object can be made the same.

Next, the operation of the control circuit 4 will be described by using the flowchart of FIG. 7.

A step S1 receives an information instructed from the instruction circuit 4 and a step S2 determines whether the rotational direction of the information instructed from the instruction circuit 4 is clockwise or counterclockwise and, if it is counterclockwise, advances to a step S3 and, by reading the first micro step drive table among the information stored in the memory 3, advances to a step S5 and drives the driving circuit 1 so as to rotate the micro step energization in a predetermined direction by a predetermined amount based on the information received from the instruction circuit 4 according to the read table.

On the other hand, when the step S2 determines that the information is clockwise, it advances to a step S4 and reads the second micro step drive table from the information stored in the memory 3, and the step S5 drives the driving circuit 1 so as to rotate the micro step energization in a predetermined direction by a predetermined amount based on the information received from the instruction circuit 4 according to the read table.

In this way, by using a different micro step table depending on the rotational direction of the stepping motor, though the stopping position of the stepping motor itself differs depending on whether it stops from clockwise or counterclockwise, the stopping position of the driven object is made approximately the same and an accurate positioning is made possible.

[A First Application Example of a Stepping Motor Driving Device]

An example of the case where a driving device of the above described stepping motor is applied to a luminous energy adjustment device will be described.

Figure 8:
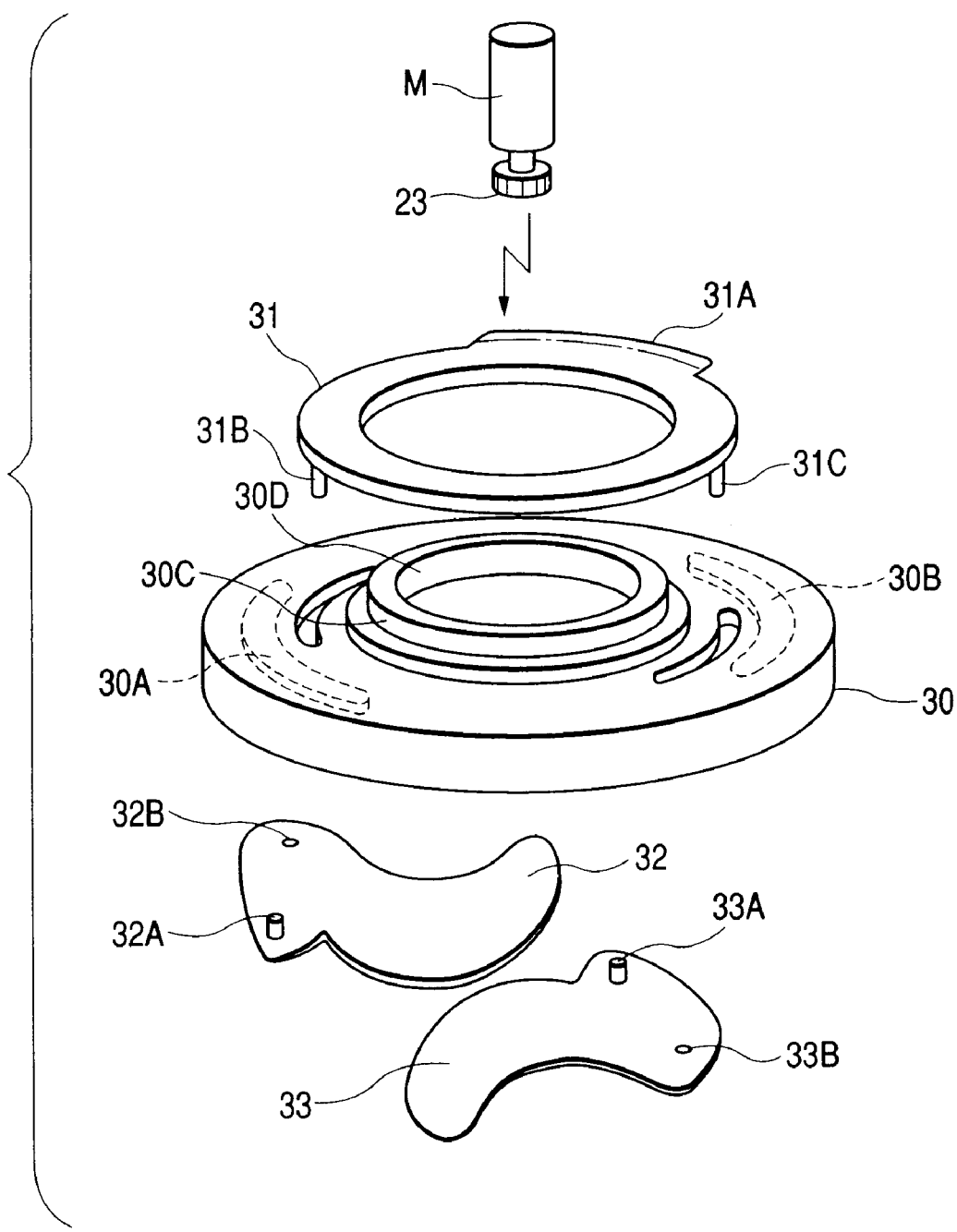
FIG. 8 is an exploded perspective view of a device for adjusting amount of light driven by the stepping motor according to the present invention.

FIG. 8 is an exploded oblique view of the luminous energy adjustment device using the driving device of the stepping motor of the present invention. Reference numeral 30 denotes a base plate and reference numeral 31 an output ring rotatably attached to an engaging portion 30C of the base plate. An opening portion 30D is disposed on the base plate. A stepping motor M is fixed to the base plate 30 by the known method, for example, an adhesive agent, a screw and the like. A pinion gear 23 is fixed to an output axis of the stepping motor M. A gear portion 31a is disposed on the output ring 31. This gear portion 31A is engagingly coupled with the above described pinion gear 23, and the output ring 31 is rotationally driven by the stepping motor M.

Reference numerals 32, 33 denote squeezing blades, and dowels 32A, 33A are slidably engaged with cum grooves 30A, 30B formed on the base plate 30, and holes 32B, 33B are rotationally engaged with dowels 31b, 31C of the output ring 31. The squeezing blades 32, 33 are constituted in such a manner as to change the opening amount by the rotation of the output ring 31, while rotating around an optical axis.

When the stepping motor M is driven by the micro step drive and the above described squeezing blades 32, 33 are positioned around the optical axis by a fine pitch, they are driven by the above described stepping motor driving circuit. When the squeezing blades 32, 33 are to be displaced in such a manner as to be driven in a counterclockwise direction of the stepping motor M and reach a predetermined opening amount, the stepping motor M is driven by the combination of the PWM values determined by the data stored in the first micro step drive table, and when the squeezing blades 32, 33 are to be displaced in such a manner as to be driven in a clockwise direction of the stepping motor M and reach a predetermined opening amount, the stepping motor is driven by the combination of the PWM values determined by the data stored in the second micro step drive table.

In this way, the rotational position of the rotor, that is, the magnet 11 of the stepping motor M in the case where the squeezing bales 32, 33 are displaced so as to reach the above described opening amount is delicately different in the case of stopping clockwise and stopping counterclockwise. However, depending on the different amount of the stopping position, a looseness of the above described cum grooves 30A, 30B and the dowels 32A, 33A, the backlash between the gear portion 31A of the output ring 31 and the above described pinion 23 and the effect of the dry friction of the squeezing blades 32, 33 are cancelled and the stopping from whichever rotational direction allows the squeezing blades 32, 33 to be positioned at a predetermined position so that a highly accurate luminous energy adjustment device is realized.

[A Second Application Example of the Stepping Motor Driving Device]

Figure 9:
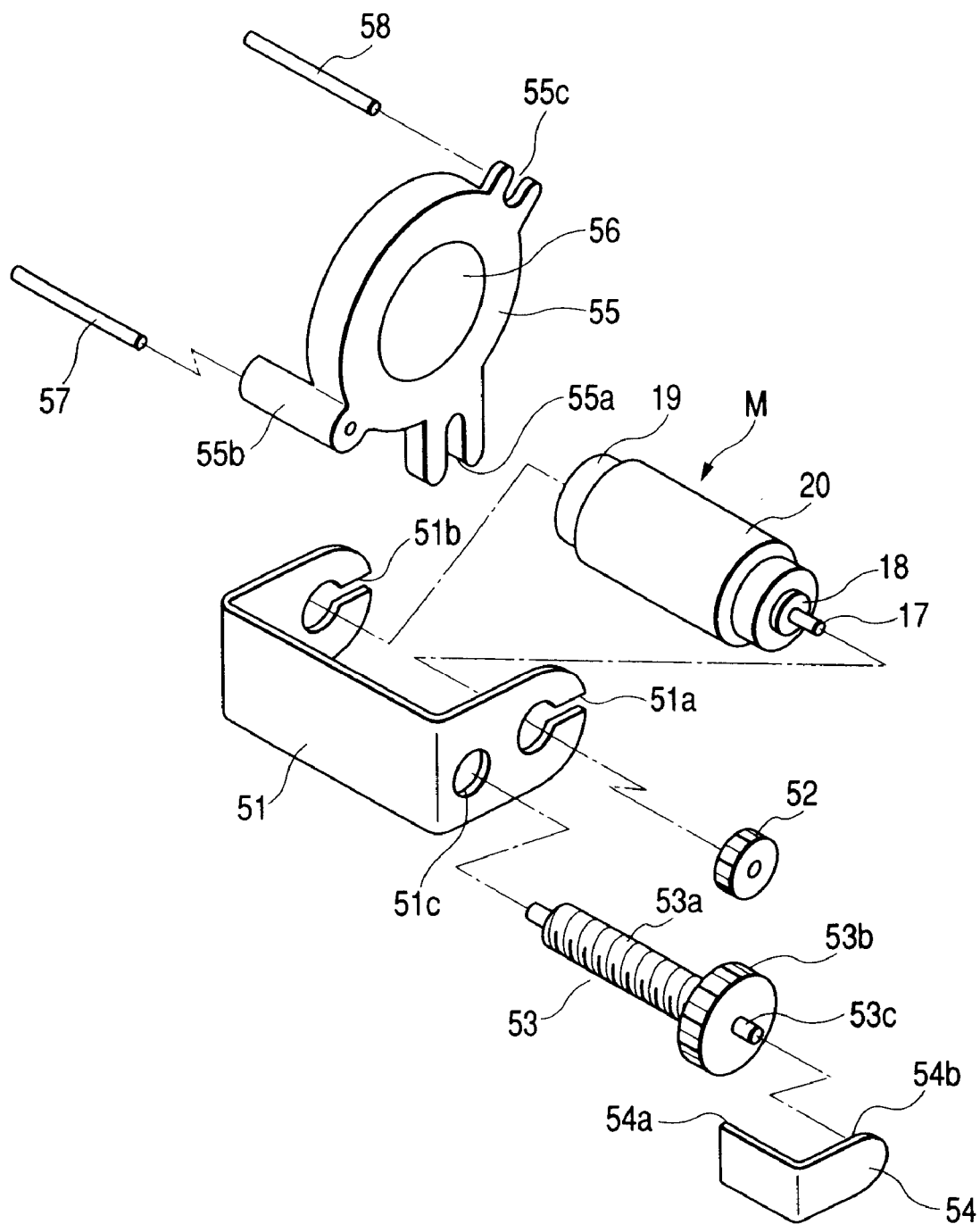
FIG. 9 is an exploded perspective view of a lens moving device driven by the stepping motor according to the present invention.

FIG. 9 is an exploded oblique view of a lens moving device using the stepping motor driving device of the present invention.

In the drawing, reference numeral 51 denotes a frame bent and formed in the shape of an U letter and the end portion of the main body (stator to be described later) of the stepping motor M is engaged with holding holes 51, 51b formed at both ends of this frame 51. Reference numeral 52 denotes a pinion gear and is fixed to an output axis 17 of the stepping motor M. Reference numeral 53 denotes a lead screw axis (drive axis) where a lead screw portion 53a having the same length as that of the main body of the stepping motor M is formed. This lead screw axis 53 is rockably held and engaged with a holding hole 51c formed on both sides of the frame 51. In this way, the stepping motor M and the lead screw axis 53 are arranged in such a manner that the output axis 17 and the lead screw 53 line up in the mutually radial direction and extend in parallel (so-called parallel-wise).

A gear portion 53b is disposed on one end of the lead screw axis 53 and this gear portion 53b is engaged with the pinion gear 52. Hence, when the stepping motor rotates, the lead screw axis 53 is rotationally driven. Note that the gear portion 53b and the pinion gear 52 constitute transmitting means.

Reference numeral 54 denotes a plate spring in the shape of an L letter, and a base end portion 54a is fixed to the frame 51 and an arm portion 54b having a spring property presses against an end portion 53c of the lead screw axis 53. In this way, the lead screw axis 53 is offset against the frame 51, thereby preventing looseness in the thrust direction between them. Reference numeral 56 denotes a lens and reference numeral 55 denotes a lens holder (driven object) for holding this lens 56. An abutting portion 55a where a female screw is formed is disposed in the lens holder 55 and this abutting portion 55a (female screw) abuts against (is engaged with) the lead screw portion 53a of the lead screw axis 53. Moreover, a guide hole portion 55b and an oscillation preventing groove 55c are formed in the lens holder 55 and are slidably engaged respectively with guide poles 57, 58 which are held by the base plate not shown. Hence, the lens holder is guided in the optical axis direction by the guide poles 57 and 58 in a state where the rotation around the optical axis is regulated.

In the lens driving device thus constituted, when the lead screw axis 53 is rotated by the rotation of the stepping motor M, the lens holder 55 receives an axial driving force from the lead screw portion 53a in the abutting portion 55a and moves to the optical axial direction together with the lens 56 in response to the rotational amount and the rotational direction of the stepping motor M.

Here, as described above, because the output axis 17 and the lead screw axis 53 are arranged in parallel, the stepping motor M and the lead screw axis 53 can shorten the whole length of the device in contrast to the case where the stepping motor M and the lead screw axis 53 is arranged in series. Moreover, despite the fact that the whole length of the device is short, by utilizing almost all the length, the length of the lead screw axis 53 (that is, the length of the lead screw portion 53a) can be secured similar to the case of the serial arrangement or in more than that length. This allows a moving range of the lens 56 to be set large. Also, because of the layout where the length of the stepping motor M does not have any influence on the length of the lens driving device, it is possible to make the stepping motor large and attempt to increase the driving force.

When the stepping motor M is driven by the micro step drive and the above described lens holder 55 and lens 56 are positioned along the optical axis by a fine pitch, the motor is driven by the stepping motor driving circuit. When the above described lens holder 55 and lens 56 are to be displaced in one direction so as to drive in the counterclockwise direction of the stepping motor M and reach a predetermined position, the stepping motor M is driven by the combination of the PWM values determined by the data stored in the first micro step drive table and, on the other hand, when the above described lens holder 55 and lens 56 are to be displaced in one direction so as to drive in the clockwise direction of the stepping motor M and reach a predetermined position, the stepping motor M is driven by the combination of the PWM values determined by the data stored in the second micro step drive table.

In this way, the rotational position of the rotor, that is, the magnet 11 of the stepping motor M in the case where the above described lens holder 55 and lens 56 are displaced so as to reach the above described predetermined position is different in the case of stopping clockwise and counterclockwise. However, depending on the different amount of the stopping position, the backlash between the abutting portion 55a and the lead screw portion 53a of the lead screw axis 53, or the backlash between the gear portion 53b of the lead screw axis 53 and the pinion gear 52, or the effect due to the dry friction of the sliding portion of the holder 55 are cancelled and the stopping from whichever direction allows the lens holder 55 and the lens 56 to be positioned at a predetermined position so that the lens holder 55 becomes a highly accurate lens moving device.

Embodiment 2

Because the configuration of the embodiment is the same as the first embodiment, the description thereof is omitted and the control flow different from there will be described. The micro step drive is as described in the first embodiment. Next, the switching of the full step drive and the micro step drive will be described.

It is only natural that the rotational speed and the output torque of the motor is higher in the case of the full step drive than in the case of the micro step drive and that the rotational resolution of the output axis of the motor is higher in the case of the micro step drive than in the case of the full step drive. For this reason, when a driven object is to be positioned at some predetermined position, if it is far from a target position, it is driven at a high speed by the full step drive and, when coming adjacent to the target position on the way, driven by the micro step drive so as to perform an accurate positioning in such a manner that a highly accurate positioning at a high speed can be performed. Or to make a smooth commencement of the movement, if a method is adapted where the speed is gradually increased by the micro step drive from the commencement of the movement during a low speed time, and from the time when the speed exceeds a predetermined speed, it is driven at a further higher speed by the full step drive, the driven object can be smoothly driven at a high seed.

The present embodiment gradually accelerates a drive commencement by the micro step drive and, after it exceeds a predetermined speed or the predetermined number of pulses, it is driven by the full step drive and driven at a further higher speed. When it comes close to the target position by a predetermined amount, it is again driven by the micro step drive mode, thereby making an accurate positioning.

Figure 10:
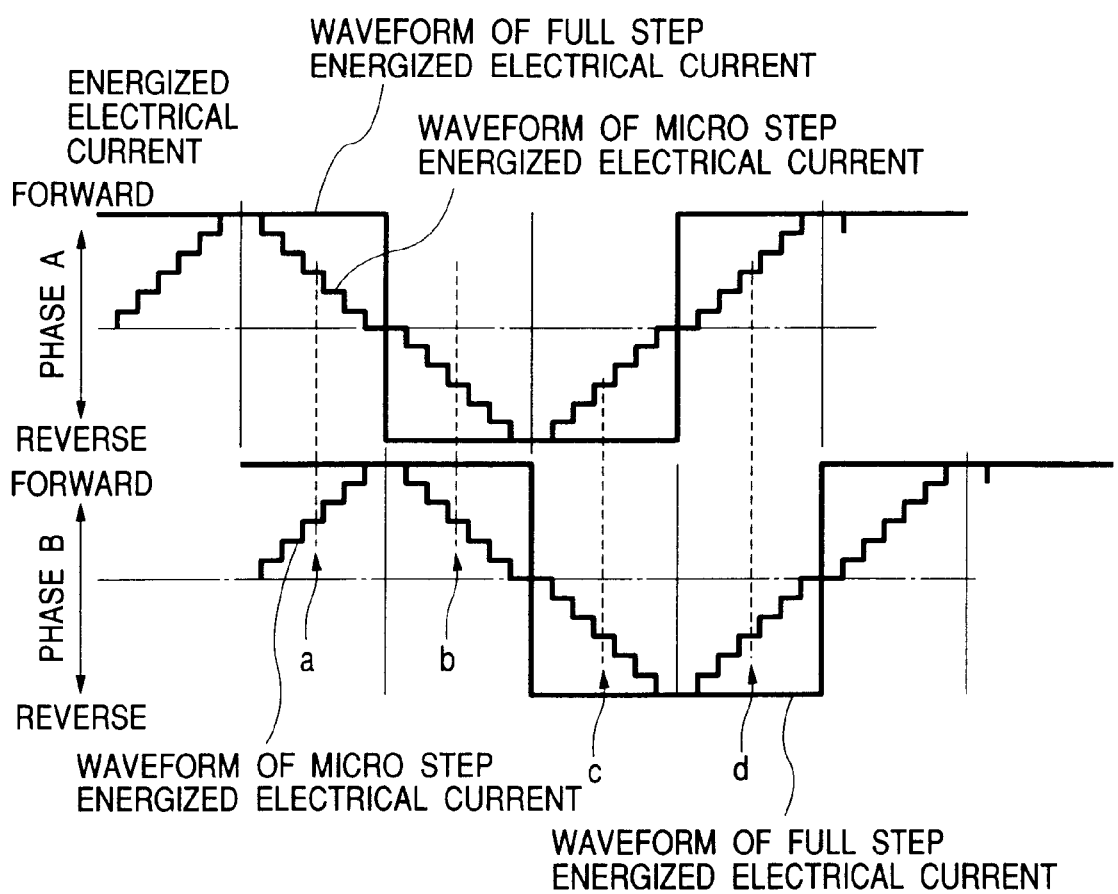
FIG. 10 is a view showing a mode of the energized electrical current of both of a micro step driving mode and a full step driving mode.

FIG. 10 is a drawing to show a state of the energized electrical current for both modes of the micro step drive mode and the full step drive mode.

Figure 11:
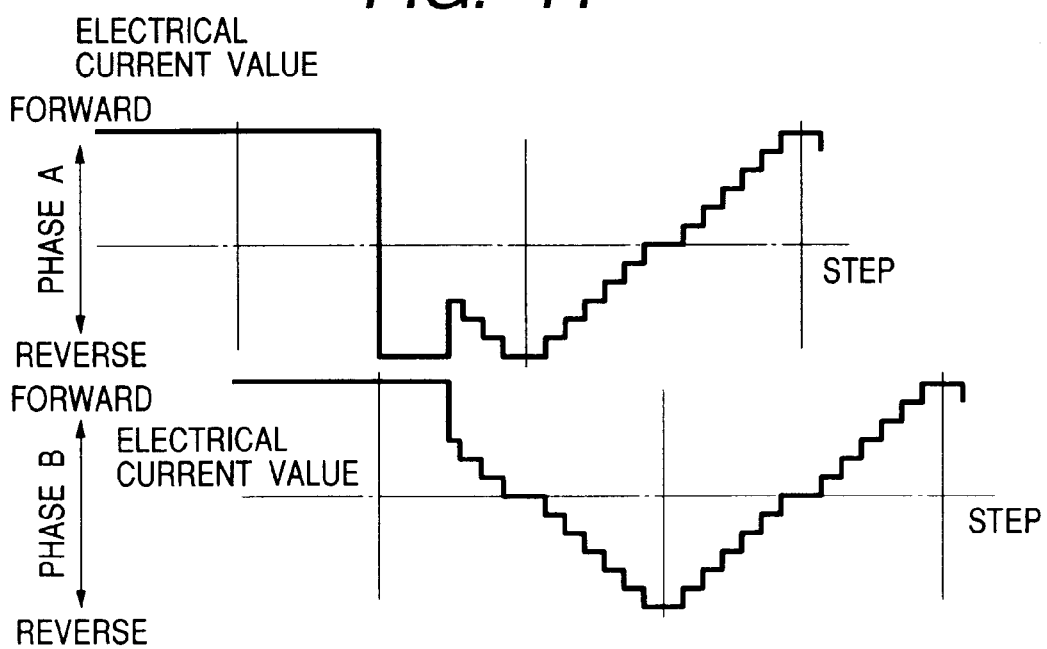
FIG. 11 is a view showing a mode of the energized electrical current when switched from the full step driving mode to micro step driving mode.

The switching from the micro step drive to the full step drive or from the full step drive to the micro step drive is performed at a timing when the absolute value of the energized electrical current of each phase in the micro step energized time becomes the same. That is, it is the timing at a, b and c as shown in FIG. 10. That is, it is the timing when the absolute value of the energized electrical current of each phase in the micro step energized time becomes the same. For example, the state of the energized electrical current in the case where the drive is switched from the full step drive to the micro step drive at the timing of b is as shown in FIG. 11.

Where the first micro step drive table is used when the rotation is to be made counterclockwise and where the second micro step drive table is used when the rotation is to be made clockwise, because as described above the first micro step drive table and the second micro step drive table are the tables different at least in some of the values, they do not necessarily become the combination of tables where the absolute value of the energized electrical current of each phase just conforms to each other when the electrical current gradually changes, except for the case where the energized electrical current continuously changes.

Figure 12:
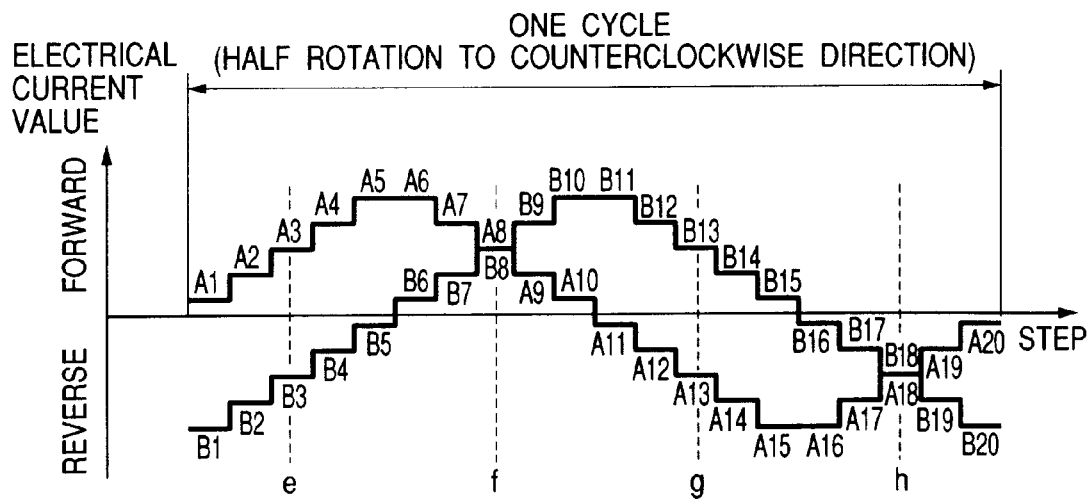
FIG. 12 is a view showing a relationship between the energized electrical current to the coil and the rotor in micro step driving.
Figure 13:
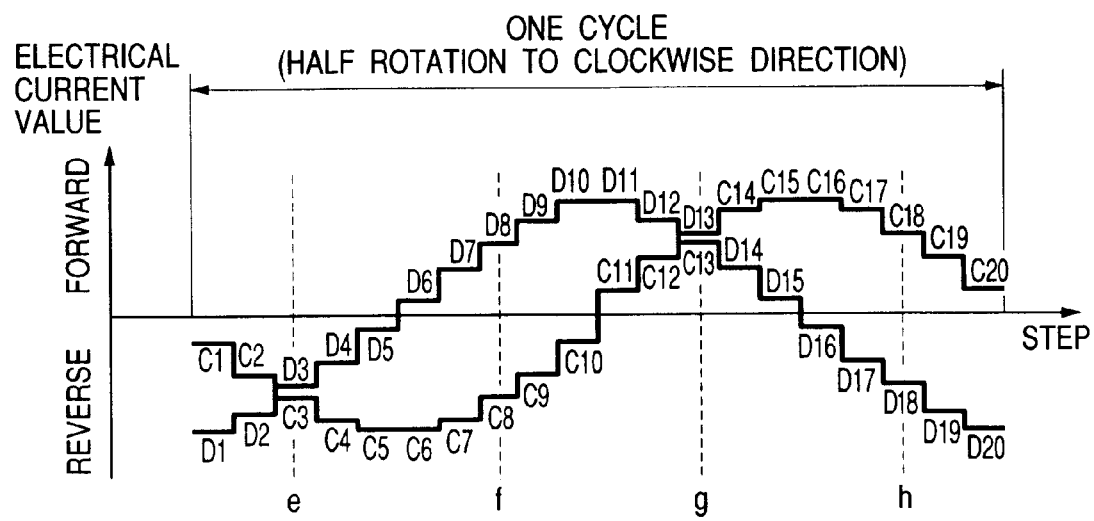
FIG. 13 is a view showing a relationship between the energized electrical current to the coil and the rotor in micro step driving.

For example, enumerated is the case of the combination of tables as shown in FIG. 12 or FIG. 13. In this case, the rotation is performed at the timing when the absolute value of the energized electrical current of each phase is approximately the same. That is, it is the timing of e, f, g and h. That is, when the rotation is made clockwise (C3, D3), it is the energized timing of (C8, D8), (C13, D13), (C18, D18) and when the rotation is made counterclockwise, it is the energizing timing of (A3, B3), (A8, B8), (A13, B13), (A18, B18).

This timing is the same or approximately the same at both the full step time and the micro step time as the ratio of the energized electrical current to the two coils is one to one or approximately one to one and therefore the rotational position of the rotor does not change with the switching of the drive mode. In this way, even when the switching of the drive mode from the full step drive to the micro step drive or from the micro step drive to the full step drive is performed, the rotation is smoothly shifted and under no circumstance will there be any case where vibrations attributable to the rotation not smoothly changed due to the switching of the mode as described in the conventional example occur or a loss of synchronism occurs with a result that the driven object can not be smoothly driven at a high speed or a highly accurate positioning can not be made at a high speed.

Figure 14:
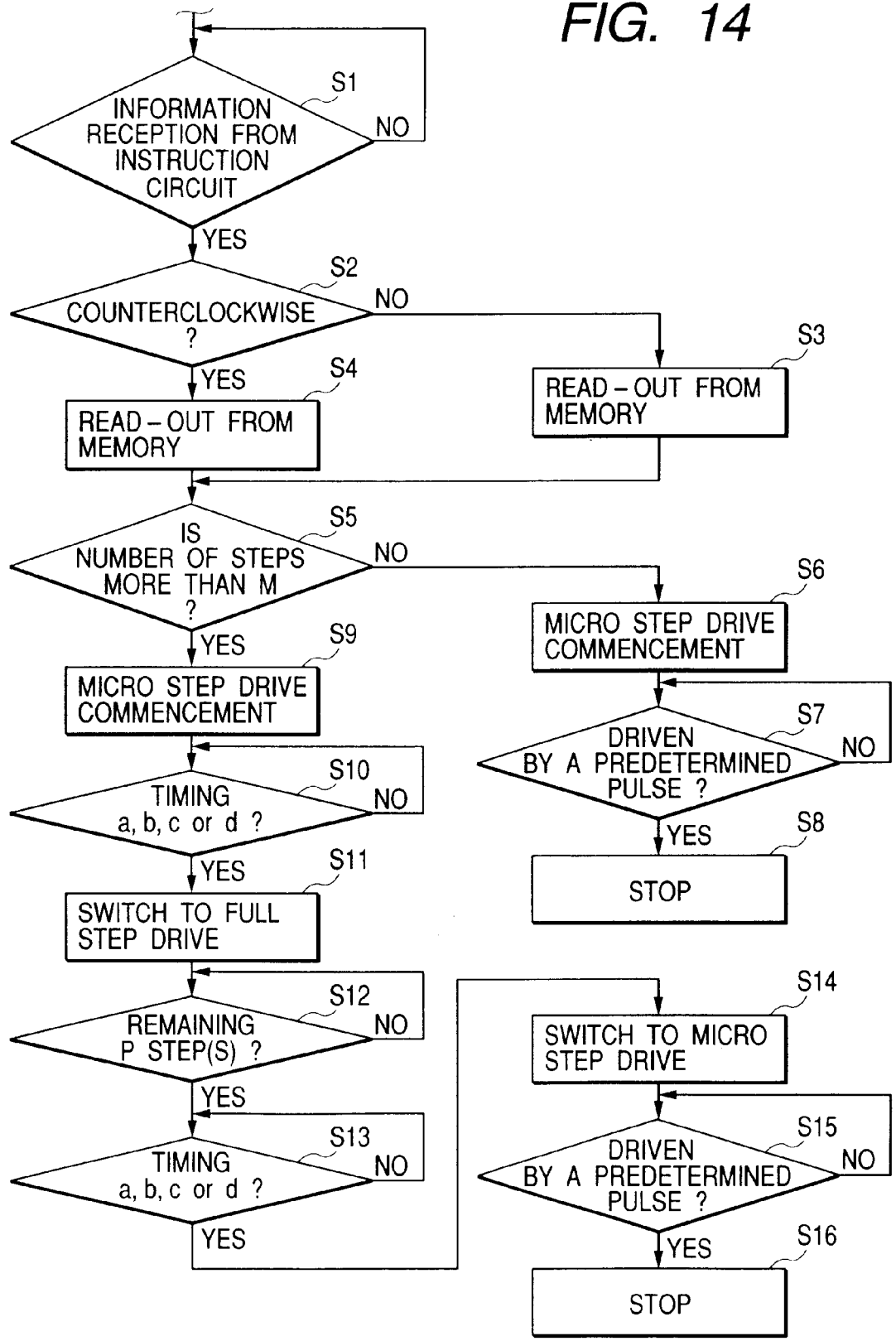
FIG. 14 is a flow chart showing an operation of a control circuit according to a second embodiment.

The operation of the control circuit 2 will be described by using the flowchart of FIG. 14.

(Step 1) receives the information (the rotational direction and the number of steps) instructed from the instruction circuit 4.

(Step 2) determines whether the rotational direction is counterclockwise or clockwise from among the information instructed from the instruction circuit 4 and, if it is counterclockwise, advances to a step 3 and, if it is clockwise, advances to a step 4.

(Step 3) reads the first micro step drive table from among the information stored in the memory 3 and advances to a step 5. This table is the table which becomes the electrical current value as shown in FIG. 12.

(Step 4) reads out the second micro step drive table from among the information stored in the memory 3 and advances to the step 5. This table is the table which becomes the electrical current value as shown in FIG. 13.

(Step 5) advances to a step 9 if the number of steps is equal to or more than the predetermined value M from among the information received from the instruction circuit 4 and, if the number of steps is less than the predetermined value M, advances to a step 6. What is meant by the predetermined value in the present embodiment is a numerical value larger than the number adding two pulses to the number of steps of the micro step drive corresponding to the rotational amount of one step portion of the full step drive. When the predetermined value M is set to seven tentatively, if a feed rate is the micro step and equal to or less than six, advances to a step 6 assuming that the number of steps is not available for switching to the full step drive.

(Step 6) drives the driving circuit 1 in such a manner as to rotate the micro step energization in a predetermined direction by a predetermined amount of rotations based on the information received from the instruction circuit 4 according to the table read from the memory 3.

(Step 7) advances to a step 8 when a predetermined pulse is driven.

(Step 8) stops the driving of the motor and completes the fixed amount of the rotation in the predetermined direction based on the information received from the instruction circuit 4.

(Step 9) drives the driving circuit 1 in such a manner as to rotate the micro step energization in the predetermined direction by the predetermined amount of rotations based on the information received from the instruction circuit 4 according to the table read from the memory 3.

(Step 10) determines, during the micro step drive which commenced in the step 9, whether the energized state emerges either at the timing of a, b, c and d in FIG. 10, that is, the timing when the absolute value of the energized electrical current of each phase in the micro step energized time becomes the same, or at the timing of e, f, g and h in FIG. 12, FIG. 13, that is, the timing when the absolute value of the energized electrical current of each phase becomes approximately the same and, if it emerges at either of the timings, advances to a step 11.

(Step 11) switches the drive mode of the motor from the micro step mode to the full step mode. The motor, when it advanced to the step 11, is fully accelerated and a driven object (not shown) is smoothly accelerated. From here, the motor is driven by the full step drive which has a fully high output torque and a high rotational speed.

This timing is the same at the full step time or approximately the same at the micro step time as the ratio of the energized electrical current to the two coils is one to one or approximately one to one and therefore the rotational position of the rotor does not change with the switching of the drive mode. In this way, even when the switching of the drive mode from the micro step drive to the full step drive is performed, the rotation is smoothly shifted and under no circumstance will there be any case where vibrations attributable to the rotation not smoothly changed due to the switching of the mode as described in the conventional example occur or a loss of synchronism occurs with a result that the driven object can not be smoothly driven at a high speed or a highly accurate positioning can not be made at a high speed.

(Step 12) advances to a step 13 when the remaining number of steps is equal to or less than a predetermined value P against the information received from the instruction circuit 4. What is meant by the predetermined value P is the numerical number adding more than one pulse to the number of steps of the micro step drive corresponding to the rotational amount of one step portion of the full step drive.

(Step 13) switches the full step drive which commenced in the step 11 to the micro step drive. The switching of the micro step drive commences either from timing which is the same as the phase of the energized electrical current to the coil in the full step drive at that time and the timing of a, b, c and d in FIG. 10, that is, the timing when the absolute value of the energized electrical current of each phase in the micro step energized time becomes the same or from the timing of e, f, g and h in FIGS. 12 and 13, that is, the timing when the absolute value of the energized electrical current of each phase becomes approximately the same. The energized electrical current at this time drives the driving circuit 1 so as to rotate by performing the micro step energization according to the table read from the memory 3.

This timing is the same or approximately the same at the full step time and at the micro step time as the ratio of the energized electrical current to the two coils is one to one or approximately one to one and therefore the rotor rotational position does not change with the switching of the drive mode.

In this way, even when the switching of the drive mode from the full step drive to the micro step drive is performed, the rotation is smoothly shifted and under no circumstance will be any case where vibrations attributable to the rotation not smoothly changed due to the switching of the mode as described in the conventional example occur or a loss of synchronism occurs with a result that the driven object can not be smoothly driven at a high speed or a highly accurate positioning can not be made at a high speed.

(Step 14) drives the remaining number of steps by the micro step drive based on the information received from the instruction circuit 4 in the step 1 and advances to a step 15.

(Step 16) stops the driving of the motor.

In the above described step 10, to determine if the energized state emerges at the timing of a, b, c and d in FIG. 10, that is, the timing when the absolute value of the energized electrical current of each phase in the micro step energized time becomes the same, or at the timing of e, f, g and h in FIGS. 12 and 13, that is, the timing when the absolute value of the energized electrical current of each phase becomes approximately the same may not necessarily be made at the initial timing from the commencement of the drive but at the timing of a, b, c and d or the timing of e, f, g and h after predetermined cycles elapse and the motor is sufficiently accelerated so that the driven object is smoothly accelerated at a predetermined speed. That is, what is required is that the timing for shifting from the micro step drive to the full step drive is set to the timing when the absolute value of the energized electrical current of each phase becomes the same or approximately the same.

In the above described step 13, the switching from the full step drive to the micro step drive is commenced either from the timing where the remaining number of steps is more than six pulses and which is the same as the phase of the energization to the coil in the full step drive and the timing of a, b, c and d in FIG. 10, that is, the timing when the absolute value of the energized electrical current of each phase in the micro step energized time becomes the same, or from the timing of e, f, g and h in FIG. 12, that is, the timing when the absolute value of the energized electrical current of each phase becomes approximately the same. However, what is required is that the timing for shifting from the full step drive to the micro step drive is set to the timing when the absolute value of the energized electrical current of each phase becomes the same or approximately the same.

In this way, by using the different micro step table depending on the rotational direction of the step motor, the stopping position of the step motor differs depending on whether stopping from clockwise or from counterclockwise. However, the stopping position of the driven object becomes the same and an accurate positioning thereof can be made. The switching from the micro step drive to the full step drive or from the full step drive to the micro step drive is performed at the timing when the absolute value of the energized electrical current of each phase in the micro step energized time becomes the same or approximately the same.

That is, it is the timing of a, b, c and d in FIG. 10 or the timing of e, f, g and h in FIGS. 12 and 13. This timing is the same or approximately the same at the full step time and the micro step time as the ratio of the energized electrical current to the two coils is one to one or approximately one to one and therefore the rotational position of the rotor does not change with the switching of the drive mode. In this way, even when the switching of the drive mode from the full step drive to the micro step drive or from the micro step drive to the full step drive is performed, the rotation is smoothly shifted and under no circumstance will there be any case where vibrations attributable to the rotation not smoothly changed due to the switching of the mode as described in the conventional example occur or a loss of synchronism occurs with a result that the driven object can not be smoothly driven at a high speed or a highly accurate positioning can not be made at a high speed.

Figure 15:
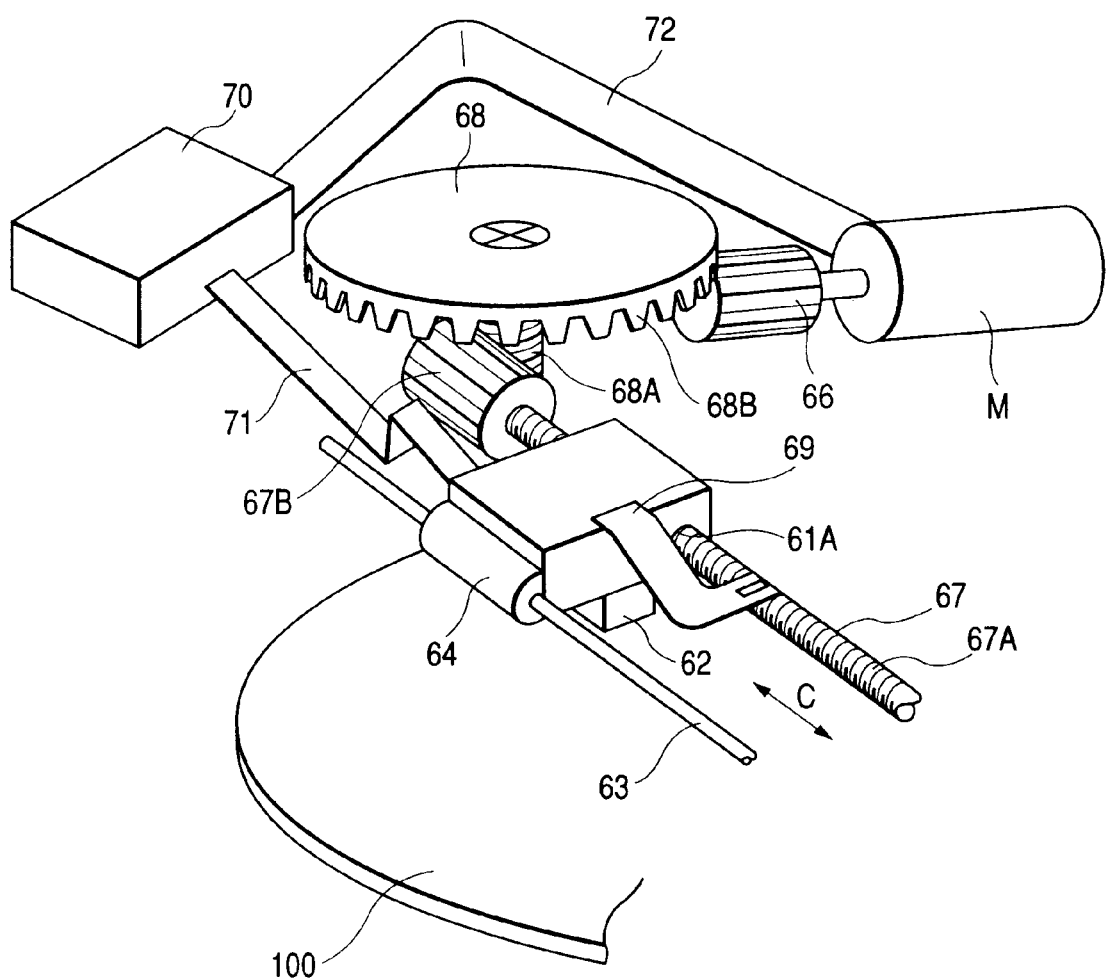
FIG. 15 is a perspective outline view when applied to a pickup device for reading and writing information of a magnetic optical disk.

With regard to a drive application example by this motor, the above described lens moving device is adapted. An oblique outside view thereof is shown in FIG. 15 where the direction of the lens is changed and the lens is arranged so as to move perpendicular to the direction of the optical axis. That is, it is applied for a pick up device for writing or an optical magnetic disk for information reading.

Reference numeral 100 denotes an optical magnetic disk where a track for recording at some μm intervals is formed and between the tracks, a spot path of some μm is formed by optical beams for recording information magnetically. This is a disk type information recording medium capable of optically reproducing the recorded information.

Reference numeral 61 denotes a carriage and reference numeral 62 denotes a pick up. The pick up 62 is composed of a light source for irradiation, a light receiving element and a lens for image-forming a reflected light on the light receiving element.

Reference numeral 63 denotes a guide shaft both ends of which are fixed to the main body, reference numeral 64 a slider sliderably engaged with the guide shaft fixed to the carriage 61, reference symbol M a motor fixed to the main body, reference numeral 66 a pinion gear fixed to the output axis of the motor M, reference numeral 67 a lead screw axis rotatably attached to the main body side. The lead screw portion 67A of the lead screw axis engages with a female screw portion 61A of the carriage 61 and on its end a helical gear 67B is formed. Reference numeral 68 is a reduction gear rotatably attached to the main body which is composed of a worm portion 68A and a crown gear portion 68B comprising a disk and tooth. A worm portion 68A of the reduction gear 68 engages with the helical gear 67B of the lead screw axis 67. The pinion gear 66 and the crown gear portion 68B of the reduction gear 68 engage with each other so as to drive the motor M, by which the carriage 61 and the pickup 62 are scanned along the optical magnetic disk 100 in the arrow direction.

Reference numeral 69 is a blade spring where one end is fixed to the carriage 61 and the other end presses against the lead screw portion 67A of the lead screw axis 67 so as to eliminate the looseness between the female screw portion 61A of the carriage 61 and the lead screw portion 67A. Reference numeral 70 is an electrical control circuit, which is disposed in the main body and includes at least the driving circuit 1, the memory 3 and the control circuit 2 as shown in FIG. 1. Reference numeral 71 denotes a flexible substrate, which electrically connects the pickup 62 with an electrical control circuit 70. Reference numeral 72 denotes a flexible print substrate, which electrically connects the motor M with the electrical control circuit 70.

By the forward rotation or the reverse rotation of the motor M, the pickup 62 is scanned along the optical disk 100 in the arrow direction.

Embodiment 3

The description of a motor configuration and a practical step drive of the present embodiment will be omitted as it is as described in the first embodiment.

Figure 16:
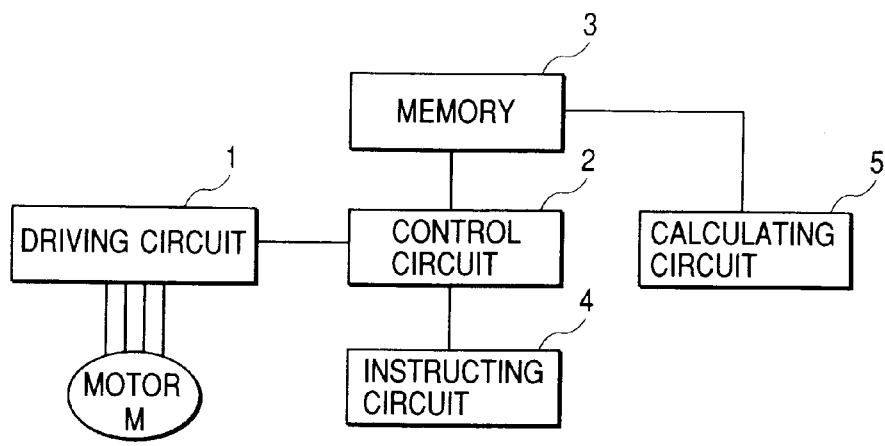
FIG. 16 is a block diagram of an electrical circuit according to a third embodiment of the present invention.

FIG. 16 is a block diagram of the third embodiment. In FIG. 16, reference symbol M denotes a motor, reference numeral 1 a driving circuit, reference numeral 2 a control circuit, reference numeral 3 a memory (storing means), reference numeral 4 an instruction circuit and reference numeral 5 calculation means. The driving circuit 1 is for letting the energized electrical current designated from the control circuit 2 flow to the coil of the motor M and is composed, for example, of the circuit having H circuits in the corresponding number of coils which can selectively energize the coils composed of four transistors in both directions in the forward and the reverse directions. In the present embodiment, because the description is made by using a stepping motor of two phases, it is provided with two pieces of the H circuits. The instruction circuit 4 is for inputting the rotational direction and the drive amount of the motor.

The memory 3 comprises a nonvolatile memory, which will be described in detail later by using FIG. 17. This memory 3 stores the first micro step drive table which is composed of the combination of the PWM values energizing to each phase of the coil of the step motor M. The calculation circuit 5 is composed of a microcomputer and a hard logic, where a first function and a second function are stored. The first function or the second function calculates the PWM value of the first micro step drive table and turns it into another value. The first function is for calculating the PWM value of the first micro step drive table. In the present embodiment, it is the function for approximately maximizing the PWM value of the first micro step drive table and, for example, for multiplying all the values by the number more than one. The number for multiplying may be a fixed value, for example, 1.5 and the like. Some predetermined range exceeds one, but another range multiplies the value below one. As a whole, it may be the function for approximately maximizing the PWM value of the first micro step drive table. The second function is for calculating the PWM, value of the first micro step drive table. In the present embodiment, it is the function for approximately minimizing the PWM value of the first micro step drive table and, for example, for multiplying all the values by the number below one. The number for multiplying may be a fixed value, for example, 0.5 and the like. Some predetermined range may exceed one, but another range multiplies the value below one. As a whole, it is the function for approximately minimizing the PWM value of the first micro step drive table. This state is shown in FIGS. 18A and 18B. FIG. 18A is the micro step drive table after the first micro step drive table was calculated by the first function by the calculating circuit 5 and FIG. 18B is the micro step drive table after the micro step drive table was calculated by the second function by the calculating circuit 5.

In the present embodiment, the micro step drive table where the first micro step drive table was calculated by the first function has a large PWM value as a whole in contrast to the first micro step drive table. Therefore, when the micro step drive table calculated by the first function is used, consumption electrical current is large and the driving force is also large.

Moreover, the micro step drive table where the first micro step drive table was calculated by the second function has a small PWM value as a whole in contrast to the first micro step drive table. Therefore, when the micro step drive table calculated by the second function is used, consumption electrical current is small and the driving force is also small in contrast to the case where the micro step drive table where the first micro step drive table and the first micro step drive table were calculated by the first function.

The control circuit 2 transmits a signal to the driving circuit 1 in such a manner that the motor M is driven by a drive amount inputted from the instruction circuit 4. At this time, the driving circuit 1 is driven in such a manner that whichever of the first micro step drive table stored in the memory 3 in response to the step range, or the drive table after the first micro step drive table was calculated by the first function through the calculating circuit 5, or the drive table after the first micro step drive table was calculated by the second function through the calculating circuit 5 is selected, and the energizing to the coil of each phase is performed by the combination of the PWM values in response to the selected table.

Figure 17:
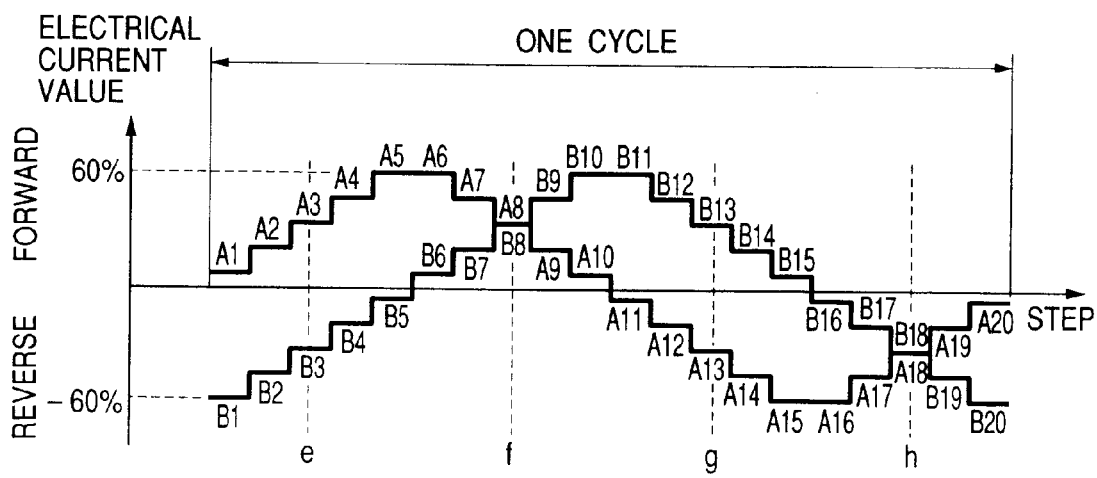
FIG. 17 is view showing a relationship between the energized electrical current to the coil and the number of steps when using a first micro step driving table.
Figure 18A:
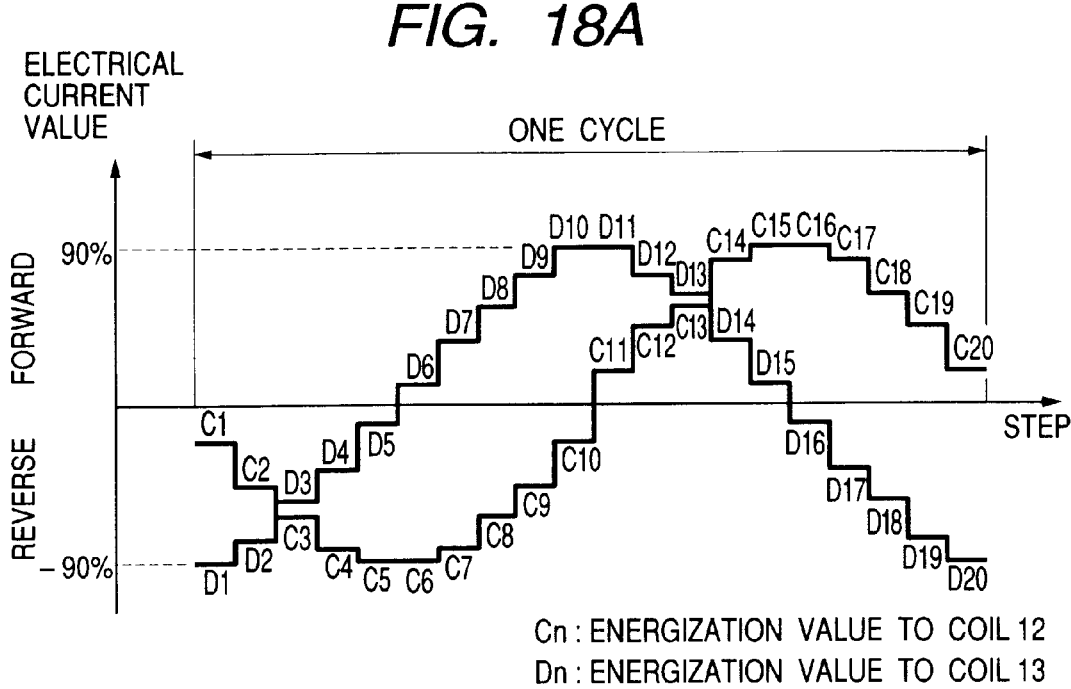
FIG. 18A is view showing a relationship between the energized electrical current to the coil and number of steps when using a micro step driving table where an arithmetical operation is performed by a first function with respect to the first micro step driving table.
Figure 18B:
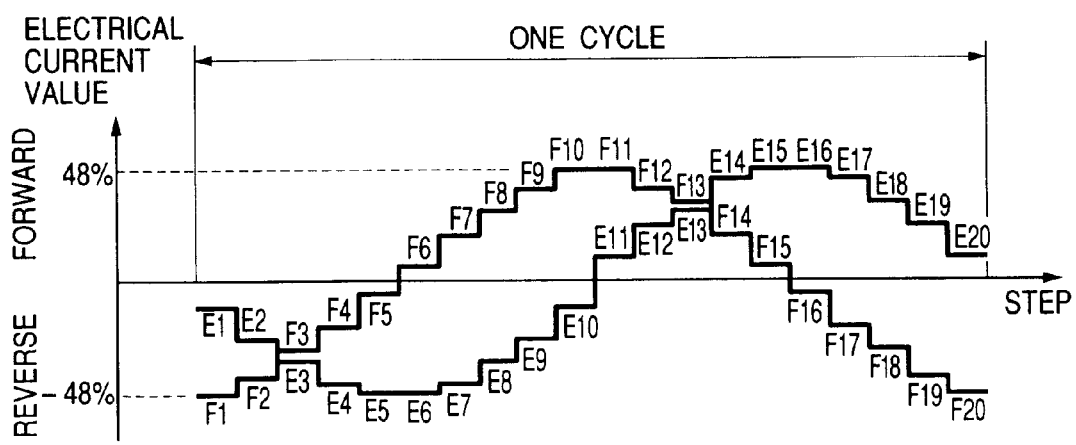
FIG. 18B is a view showing a relationship between the energized electrical current to the coil and the number of steps when using a micro step driving table where the arithmetical operation is performed by the second function with respect to the first micro step driving table.

FIG. 17 is a drawing to show a relation between the energized electrical current of the coils 12, 13 and the number of steps at the time when the energization was performed based on the first micro step drive table stored in the memory 3. The memory 3 stores the ratio of the electrical current value energizing to the coils 12, 13 of (A1, B1), (A2, B2), (A3, B3), . . . , (Am, Bm) as the first micro step drive table. A1, A2, A3, . . . , Am denote the ratio of the electrical current value energizing to the coil 12 and B1, B2, B3, . . . , Bm denote the ratio of the electrical current value energizing to the coil 13. With regard to the change of the electrical current value, there is available a pulse width modulation system (PWM control system) of the applied voltage and, in the case of such an energizing system, the value stored in the first micro step drive table stores the data of the duty value of the energization.

FIG. 18A is a drawing to show a relation between the energized electrical current of the coils 12, 13 and the number of steps when the energization was performed based on the micro step drive table at the time when the first micro step drive table was calculated by the first function. FIG. 18B is a drawing to show a relation between the energized electrical current of the coils 12, 13 and the number of steps at the time when the first micro step drive table was calculated by the second function.

The micro step drive table where the first micro step drive was calculated by the first function as shown in FIG. 18A has a large PWM value as a whole in contrast to the first micro step drive table. Therefore, when the micro step drive table calculated by the first function is used, consumption electrical current is large and the driving force is also large. The micro step drive table where the first micro step drive was calculated by the second function as shown in FIG. 18B has a small PWM value as a whole in contrast to the first micro step drive table. Therefore, when the micro step drive table calculated by the second function is used, consumption electrical current is small and the driving force is also small in contrast to the case where the micro step drive table was used where the first micro step drive table and the first micro step drive table were calculated by the first function.

The memory 3 store the table showing the ratio of the electrical current energizing to the coils 12, 13 of (C1, D1), (C2, D2), (C3, D3), . . . , (Cm, Dm) as the second micro step drive table. C1, C2, C3, . . . , Cm denote the ratio of the electrical current energizing to the coil 12, and D1, D2, D3, . . . , Dm denote the ratio of the electrical current energizing to the coil 13. The calculating circuit 5 stores the first function and the second function. The first function is for calculating the PWM value of the first micro step drive table. In the present embodiment, it is the function for approximately maximizing the PWM value of the second micro step drive table. In the present embodiment, it uses a function for multiplying all the numbers by the number exceeding one, to be concrete, 1.5. For example, in the second micro step drive table, A5, A6 or B10, B11 and the like which reach the maximum values as shown in FIG. 17 are set to reach 60%, while in the second micro step drive table calculated using the first function, C5, C6 or D10, D11 and the like which reach the maximum values as shown in FIG. 18A are set to reach 90%. For this reason, when the micro step drive table calculated through the first function as shown in FIG. 18A is used, the driving force is large and consumption electrical current is also large.

The second function of the calculating circuit 5 is for calculating the PWM value of the second micro step drive table. In the present embodiment, it is the function for approximately minimizing the PWM value of the second micro step drive table. In the present embodiment, it uses a function for multiplying all the numbers by the number smaller than one, to be concrete, 0.8. For example, in the second micro step drive table, A5, A6 or B10, B11 and the like which reach the maximum values as shown in FIGS. 6A and 6B are set to reach 60%, while in the second micro step drive table calculated using the second function, E5, E6 or F10, F11 and the like which reach the maximum value are set to reach 42 percent. For this reason, when the micro step drive table calculated through the second function as shown in FIG. 18B is used, the driving force is small and consumption electrical current is also small.

Of course, the numerical value to multiply is not required to be a fixed value for both the first function and the second function. What is required is not necessarily a method of multiplying some numerical value, but may be a method of adding or deducting. That is, the types of the functions are not restricted. When the second micro step drive table is calculated by the first function, all the values are not necessarily required to have the absolute values maximized by the calculation by the first function, but may have the duty values having the absolute values approximately larger than the second micro step drive table. If necessary when the second micro step drive table is similarly calculated by the second function, all the values are not necessarily required to have the absolute values minimized by the calculation by the second function, but may be required to have the duty values having the absolute values approximately smaller than the second micro step drive table.

When the values of (Cm, Dm) are compared to the values (Am, Bm), the absolute values of (Cm, Dm) are set to be larger than the absolute values of (Am, Bm). The values of Cm/Dm and Am/Bm which are the ratios of energizing to the coil 13 against the coil 12 are approximately the same, but do not necessarily conform to each other. That is, assuming that Cm is a numerical Figure 1.5 times that of Am, Dm does not necessarily become 1.5 times that of Bm.

The reason why the values of Cm/Dm and Am/Bm which are the ratios of the energizing to the coil 13 against the coil 12 are approximately the same, but are set not necessarily to conform to each other is because the position of the rotor is set to the same position for the energization at (Cm, Dm) and for the energization at (Am, Bm). The rotational position of the rotor is determined by the combined forces of the force in which a rotor magnet is sucked by the stators 18, 19 and the magnetic force which is generated by energizing to the coil 12, the coil 13. The combined energization of (Cm, Bm) rather than (Am, Bm) is set to have a larger absolute value and therefore the magnetic force generated by energizing to the coil 12, the coil 13 becomes large. In this way, the ratio of the force in which the rotor magnet is sucked by the stators 18, 19 and the magnetic force generated by energizing to the coil 12, the coil 13 changes also. Hence, even when the values of Cm/Dm and the values of Am/Bm are made the same, the rotational position of the rotor becomes different from the case of the combined energization of (Am, Bm). The values of Cm/Dm are set to be different from the values of Am/Bm by adding the force in which the rotor magnet is sucked by the stators 18, 19 so that the rotational position of the rotor becomes the same as the position of the energization of (Am, Bm). The same holds true with regard to the value Em/Fm calculated using the second function.

In the present embodiment, the magnet 11 makes one rotation counterclockwise by performing two cycles of the switching of the energization of the coils 12, 13 according to (A1, B1), (A2, B2), (A3, B3), . . . , (Am, Bm). Or it makes one rotation clockwise by performing two cycles of the switching of the energization of the coils 12, 13 according to (C1, D1), (C2, D2), (C3, D3), . . . , (Cm, Dm). For example, assuming that m is 20, 40 steps allows the magnet 11 which is a rotor to make one rotation.

Next, the switching of the full step drive and the micro step drive will be described.

It is only natural that the rotational speed and the output torque of the motor is higher in the case of the full step drive than in the case of the micro step drive and that the rotational resolution of the output axis of the motor is naturally higher in the case of the micro step drive than in the case of the full step drive. For this reason, when the driven object is to be positioned at some predetermined position, if it is far from the target position, it is driven at a high speed by the full step drive and, when coming adjacent to the target position on the way, driven by the micro step drive so as to perform an accurate positioning in such a manner that a highly accurate positioning at a high speed can be performed. Or to make a smooth commencement of the movement, if a method is adapted where the speed is gradually increased by the micro step drive from the commencement of the movement during a low speed time, and from the time when the speed exceeds a predetermined speed, it is driven at a further higher speed by the full step drive, the driven object can be smoothly driven at a high speed.

The present embodiment gradually accelerates a drive commencement by the micro step drive and, after it exceeds a predetermined speed or the predetermined number of pulses, it is driven by the full step drive and driven at a further higher speed. When it comes close to the target object, it is again driven by the micro step drive mode, thereby making an accurate positioning.

Figure 19:
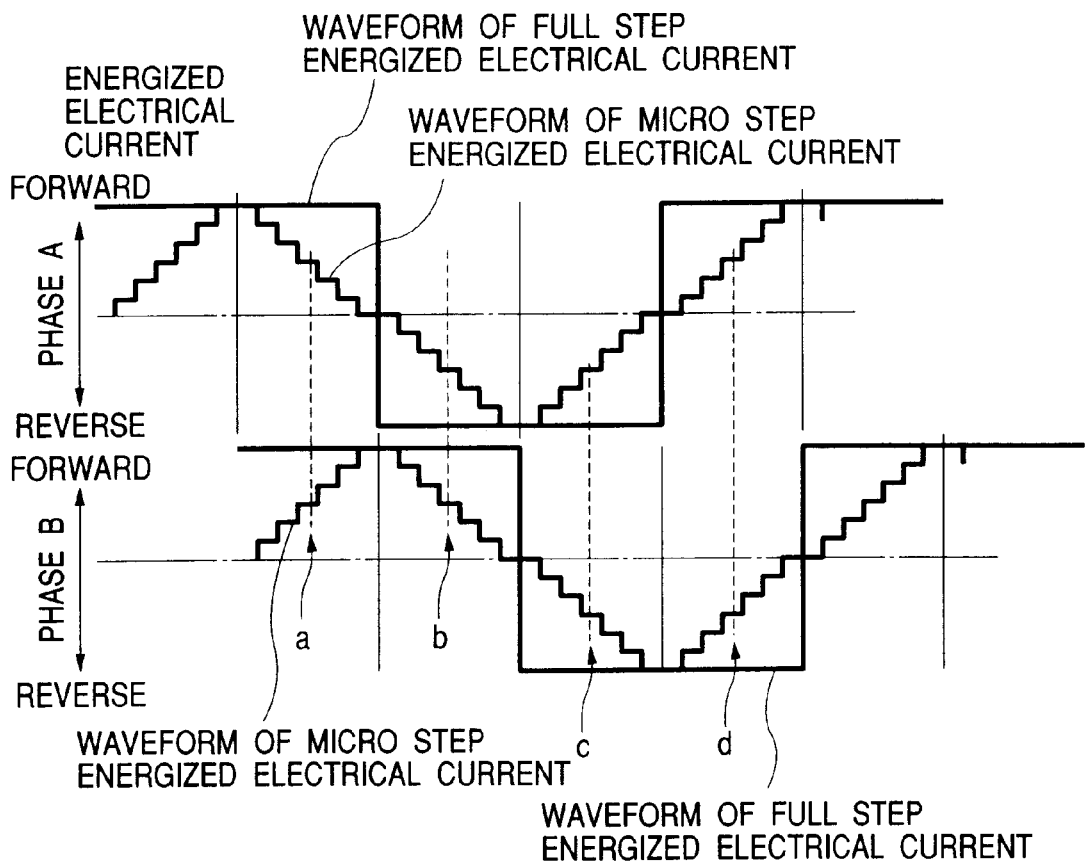
FIG. 19 is a view showing a mode of the energized electrical current of both of the micro step driving mode and full step driving mode.

FIG. 19 is a drawing to show the state of the energized electrical current of both modes of the micro step drive mode and the full step drive mode.

Figure 21:
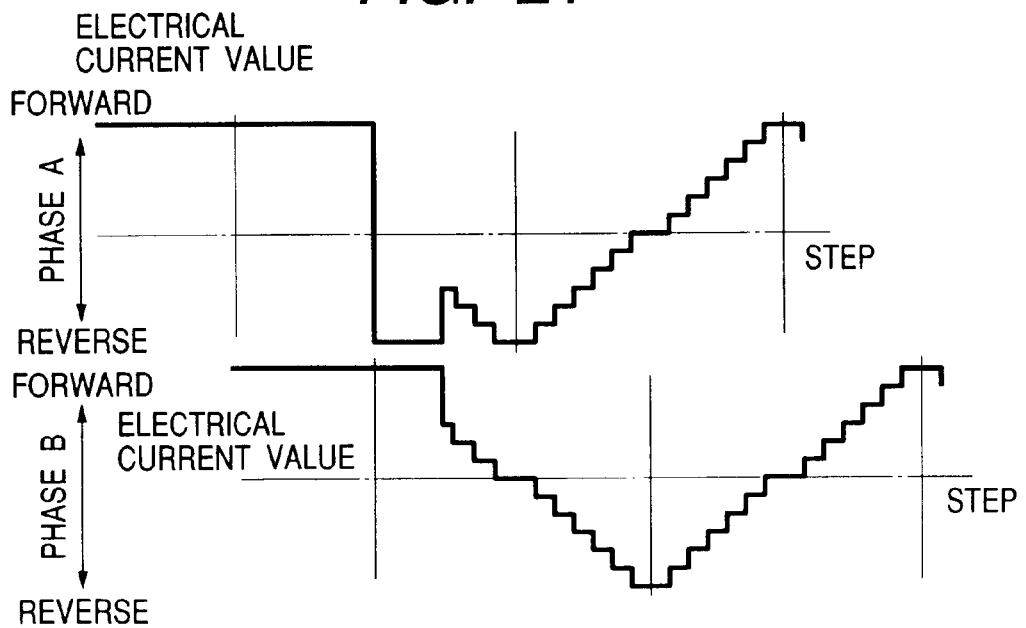
FIG. 21 is a view showing a mode of the energized electrical current when switched from the full step driving mode to micro step driving mode.

The switching from the micro step drive to the full step drive or from the full step drive to the micro step drive is performed at the timing when the absolute value of the energized electrical current of each phase becomes the same. That is, it is the timing of a, b, d and d in FIG. 19. That is, the timing when the absolute value of the energized electrical current of each phase becomes the same or approximately the same. For example, the state of the energized electrical current in the case where it is changed from the full step drive to the micro step drive at the timing of b is as shown in FIG. 21.

The micro step drive table does not necessarily become the combined tables where the absolute value of the energized electrical current of each phase just conforms to each other when the electrical current changes step by step, except for the case where the energized electrical current continuously changes. In this case, the switching is performed at the timing when the absolute value of the energized electrical current of each phase becomes approximately the same.

These timings are the same or approximately the same at both the full step time and the micro step time as the ratio of the energized electrical current to the two coils is one to one or approximately one to one and therefore the rotational position of the rotor does not change with the switching of the drive mode. In this way, even when the switching of the drive mode from the full step drive to the micro step drive or from the micro step drive to the full step drive is performed, the rotation is smoothly shifted and under no circumstance will there be any case where vibrations attributable to the rotation not smoothly changed due to the switching of the mode as described in the conventional example occur or a loss of synchronism occurs with a result that the driven object can not be smoothly driven at a high speed or a highly accurate positioning can not be made at a high speed.

Figure 20:
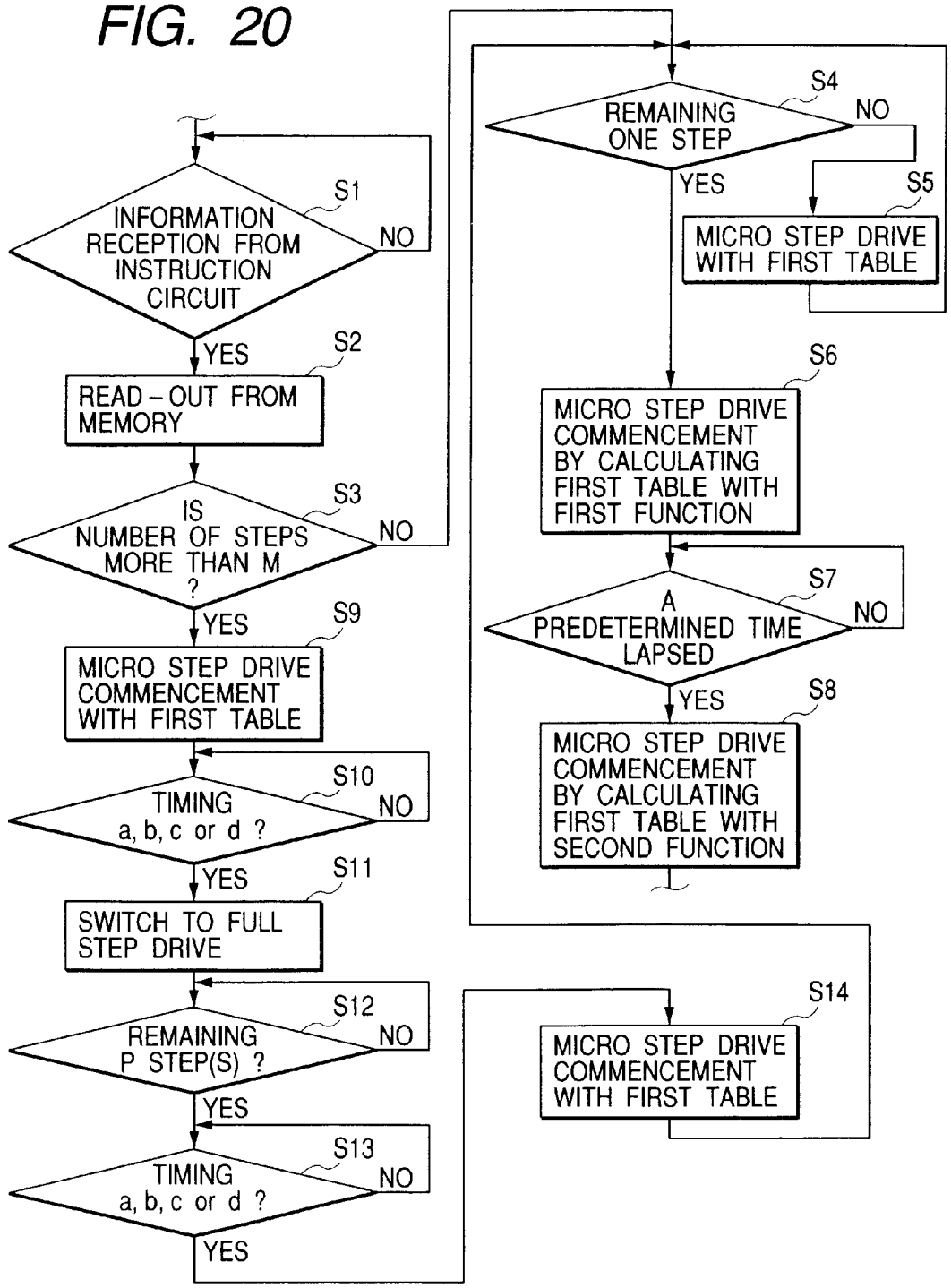
FIG. 20 is a flow chart showing an operation of a control circuit according to the third embodiment.

The operation of the control circuit 2 will be described by using the flow chart of FIG. 20.

Step 1: receives the information (rotational direction and the number of steps) instructed from the instruction circuit 4.

Step 2: reads the first micro step drive table stored in the memory 3 and advances to a step 3.

The fist micro step drive table, the micro step drive table where the first micro step drive table was calculated by the first function and the micro step drive table where the first micro step drive table was calculated by the second function are the tables which become the electrical current as previously explained in FIGS. 17, 18A and 18B. When the combination of the PWM values of the micro step drive table calculated by the second function are expressed as (Em, Fm), they are at least the tables of the values which become smaller in the absolute values of the electrical current than the electrical current flowed by (Cm, Dm) in contrast to the values (Cm, Dm) of the micro step drive tables calculated by the first function. Once the positioning is made by the micro step drive, the state thereof is kept by a frictional load and the energization to the coil is reduced so as to weaken the magnetic force attributable to the coil. Even when a ratio of the suction force of the magnet and the stator becomes large, if the magnetic force of more than fixed amount is generated, the magnet rotor is kept in the position which is once positioned. In this way, if consideration is given only to keeping the magnet rotor in the position which is once positioned, because the frictional force works to keep it in the position, the electrical current can be reduced and the effect of controlling consumption electrical current and preventing heat build up of the motor is achieved.

Step 3: advances to a step 9 if the number of steps from among the information received from the instruction circuit 4 is equal to or more than the predetermined value M, and advances to the step 4 if the number of steps is equal to or less than the predetermined value M. What is meant by the predetermined value in the present embodiment is the value larger than the number adding two pulses to the number of steps of the micro step drive corresponding to the rotational amount of one step portion of the full step drive. When the predetermined value M is temporarily set to seven, if the feed rate in the case of the micro step is equal to or less than six steps, the step 3 advances to the step 4 assuming that there are not enough number of steps available to switch to the full step drive.

Step 4: advances to a step 5 if the remaining number of drive steps in the case of the micro step is equal to or more than two steps, and advances to a step 6 if the remaining number of steps becomes one.

Step 5: drives the driving circuit 1 so as to rotate in a predetermined direction based on the information which received the micro step energization from the instruction circuit 4 according to the first micro step drive table read from the memory 3.

The first micro step drive table is, as described above, smaller in consumption electrical current and smaller also in the driving force than the case where it is driven according to the micro step drive table which calculated the first micro step drive table by the first function of the calculating circuit 5. When the stepping motor lags behind the position where the primary positioning is made against some energizing state, the driving force is increased to a certain extent and a force for rotating till the primary position is relatively large. Here, because a phase lag against the electrical signal of the rotor is tolerated to a certain degree, even when consumption electrical current is set small, the driving is possible. Because consumption electrical current is small, consumption electrical power is small. This can allow the drive to prevent heat build up.

Step 6: drives the driving circuit 1 so as to rotate the micro step energization in a predetermined direction for the last one step based on the information which received the micro step energization from the instruction circuit 4 according to the micro step drive table which calculated the first micro step drive by the first function of the calculating circuit 5. In this case, because the last stopping position is determined by this operation, an accurate positioning of the rotor is required. As described above, the closer the position of the rotor comes to the position primarily to be positioned, the smaller the rotational driving force generated by attempting to position it in the primary position becomes, and it becomes difficult to position it in the primary position even with a mere presence of a few frictional force. Hence, though the rotor is driven for this step alone according to the micro step drive table which calculated the first micro step drive table by the first function of the calculating circuit 5, the micro step drive table calculated by this fist function becomes large as a whole in the PWM value in contrast to the first micro step drive table. For this reason, when the micro step drive table calculated by the first function is used, consumption electrical current is large and the driving force is also large, thereby making it possible to position the rotor in an accurate position according to an electrical signal.

The combination of the PWM values (Cm, Dm) of the micro step drive table which calculated the first micro step drive table by the first function is set so as to become larger in the absolute value than the energization of the combination of the PWM values (Am, Bm) of the first micro step drive table and therefore the magnetic force generated by energizing to the coils 12, the coil 13 becomes large. In this way, because a ratio of the force where the rotor magnet is sucked by the stators 18, 19 and the magnetic force generated by energizing to the coil 12, the coil 13 changes, the values of Cm/Dm which are the ratio of each phase of the PWM values of the micro step drive table which calculated the first micro step drive table by the first function are set to different values from the values of Am/Bm which are the ratio of each phase of the PWM values of the first micro step drive table by adding the suction force to the stators 18, 19 so that the rotational position of the rotor becomes the same position of the energization of (Am, Bm).

Moreover, the driving in response to the PWM value of the micro step drive which calculated the first micro step drive table by the first function makes consumption electrical current large and makes the driving force large by that much. Even if a friction exists, the magnet rotor can be positioned in an accurate position, but it is feared that heat build up and consumption electrical current are increased. However, such a fear will be eliminated in a step 8 to be described later.

Step 7: advances to the step 8 when a sufficient time elapses for driving the last one step, positioning and stabilizing the magnet rotor in that energized state.

Step 8: performs a micro step energization according to the micro step drive table which calculated the first micro step drive table stored in the memory 3 by the second function of the calculating circuit 5 and keeps the rotational position of the magnet rotor positioned in the step 6.

When the combination of the PWM values of the micro step drive table which calculated the first micro step drive table by the second function of the calculating circuit 5 is expressed as (Em, Fm), they are at least the tables of the values which become smaller in the absolute values of the electrical current than the electrical current flowed by (Am, Bm) or (Cm, Dm) in contrast to the values of the first micro step drive tables (Am, Bm) or the micro step drive tables (Cm, Dm). Once the positioning is made by the micro step drive, the state thereof is kept by a frictional load and the energization to the coil is reduced so as to weaken the magnetic force attributable to the coil. Even when a ratio of the suction force of the magnet and the stator becomes large, if the magnetic force of more than fixed amount is generated, the magnet rotor is kept in the position which is once positioned. In this way, if consideration is given only to keeping the magnet rotor in the position which is once positioned, because the frictional force works to keep it in the position, the electrical current can be reduced and the effect of controlling consumption electrical current and preventing heat build up of the motor is achieved.

This step completes the fixed amount of the rotation in the predetermined direction based on the information received from the instruction circuit 4 and is in a state waiting for the next operation.

Step 9: drives the driving circuit 1 so as to rotate in a predetermined direction by a fixed amount based on the information which received the micro step energization from the instruction circuit 4 according to the first micro step drive table read from the memory 3.

Step 10: determines whether the energized state emerges either at the timing of a, b, c and d in FIG. 9 during the micro step driving commenced from the step 9, that is, the timing when the absolute value of each phase in the micro step energized time becomes the same, or at the timing of e, f, g and h in FIG. 17, that is, the timing when the absolute value of the energized electrical current of each phase becomes approximately the same and, if it emerged, advances to a step 11.

Step 11: switches the drive mode of the motor from the micro step drive to the full step drive. At the point where the motor advanced to the step 11, it is sufficiently accesalated and a driven object (not shown) is smoothly accesalated. From this point, the motor is driven by the full step drive which is sufficiently high in the output torque and can drive at a high rotational speed.

This timing is the same or approximately the same at both the full step time and the micro step time as the ratio of the energized electrical current to the two coils is one to one or approximately one to one and therefore the rotational position of the rotor does not change with the switching of the drive mode. In this way, even when the switching of the drive mode from the micro step drive to the full step drive is performed, the rotation is smoothly shifted and under no circumstance will there be any case where vibrations attributable to the rotation not smoothly changed due to the switching of the drive mode as described in the conventional example occur or a loss of synchronism occurs with a result that the driven object can not be smoothly driven at a high speed or a highly accurate positioning can not be made at a high speed.

Step 12: advances to a step 13 if the remaining number of steps in the micro step drive against the information received from the instruction circuit 4 is equal to or less than predetermined PWM values. What is meant by the predetermined value in the present embodiment is the number adding more than one pulse to the number of steps of the micro step drive corresponding to the rotational amount of one step portion of the full step drive.

Step 13: advances to a step 14 when the energized phase becomes the timing of a, b, c and h in FIG. 19, that is, the timing when the absolute value of the energized electrical current of each phase in the micro step energized time becomes the same, or the time of e, f, g and h in FIG. 17, that is, the timing when the absolute value of the energized electrical current of each phase becomes approximately the same.

Step 14: switches the full step drive commenced from the step 11 to the micro step drive. The switching of the micro step drive begins either from the timing which is the same as the phase of energizing to the coil of the full step drive at that time and the timing of a, b, c and d in FIG. 19, that is, the timing when the absolute value of the energized electrical current of each phase in the micro step energized time becomes the same, or from the timing of e, f, g and h in FIG. 17, that is, the timing when the absolute value of the energized electrical current of each phase becomes approximately the same and drives the driving circuit 1 so as to rotate the energized electrical current of that time by performing the micro step energization according to the first micro step drive table read from the memory 3.

This timing is the same or approximately the same at both the full step time and the micro step time as the ratio of the energized electrical current to the two coils is one to one or approximately one to one and therefore the rotational position of the rotor does not change with the switching of the drive mode.

In this way, even when the switching of the driving mode from the full step drive to the micro step drive is performed, the rotation is smoothly shifted and under no circumstance will there be any where vibrations attributable to the rotation not smoothly changed due to the switching of the drive mode as described in the conventional example occur or a loss of synchronism occurs with a result that the driven object can not be smoothly driven at a high speed or a highly accurate positioning can not be made at a high speed.

In the above described step 10, to determine if the energized state is produced at the timing of a, b, c and d in FIG. 19, that is, the timing when the absolute value of the energized electrical current of each phase in the micro step energized time becomes the same, or the timing of e, f, g and h in FIG. 17, that is, the timing when the absolute value of the energized electrical current of each phase becomes approximately the same may be not necessarily made at the initial timing from the drive commencement, but at the timing of a, b, c and d or at the timing of e, f, g and h after predetermined cycles elapse and the motor is sufficiently accelerated so that the driven object is smoothly accelerated at a predetermined speed. That is, what is required is that the timing for shifting from the micro step drive to the full set drive is set to the timing when the absolute value of the energized electrical current of each phase becomes the same or approximately the same.

In the above described step 13, the switching from the full step drive to the micro step drive begins either from the timing when the remaining number of steps is equal to or more than the steps of the micro step drive corresponding to one step portion of the full step drive and is the same as the energizing phase to the coil in the full step drive at this time and the timing of a, b, c and d in FIG. 19, that is, the timing when the absolute value of the energized electrical current of each phase becomes the same or from the timing of e, f, g and h in FIG. 17, that is, the timing when the absolute value of the energized electrical current of each phase becomes approximately the same. However, what is required is that the timing for shifting from the full step drive to the micro step drive is set to timing when the absolute value of the energized electrical current of each phase becomes the same or approximately the same.

This timing is the same or approximately the same at both the full step time and the micro step time as the ratio of the energized electrical current to the two coils is one to one or approximately one to one and therefore the rotational position of the rotor does not change with the switching of the drive mode. In this way, even when the switching of the drive mode from the full step drive to the micro step drive or from the micro step drive to the full step drive is performed, the rotation is smoothly shifted and under no circumstance will there be any case where vibrations attributable to the rotation not smoothly changed due to the switching of the mode as described in the conventional example occur or a loss of synchronism occurs with a result that the driven object can be smoothly driven at a high speed or a highly accurate positioning can be made at a high speed.

As described above, either of the first micro step drive table or the micro step drive table which calculated the first micro step drive table by the fist function is selected according to the area within the steps set by setting means which set the number of drive steps of the stepping motor so as to make the micro step drive possible so that consumption electrical current can be reduced to the minimum and build up heat is controlled, thereby positioning the magnet rotor in an accurate position.

Embodiment 4

Figure 22:
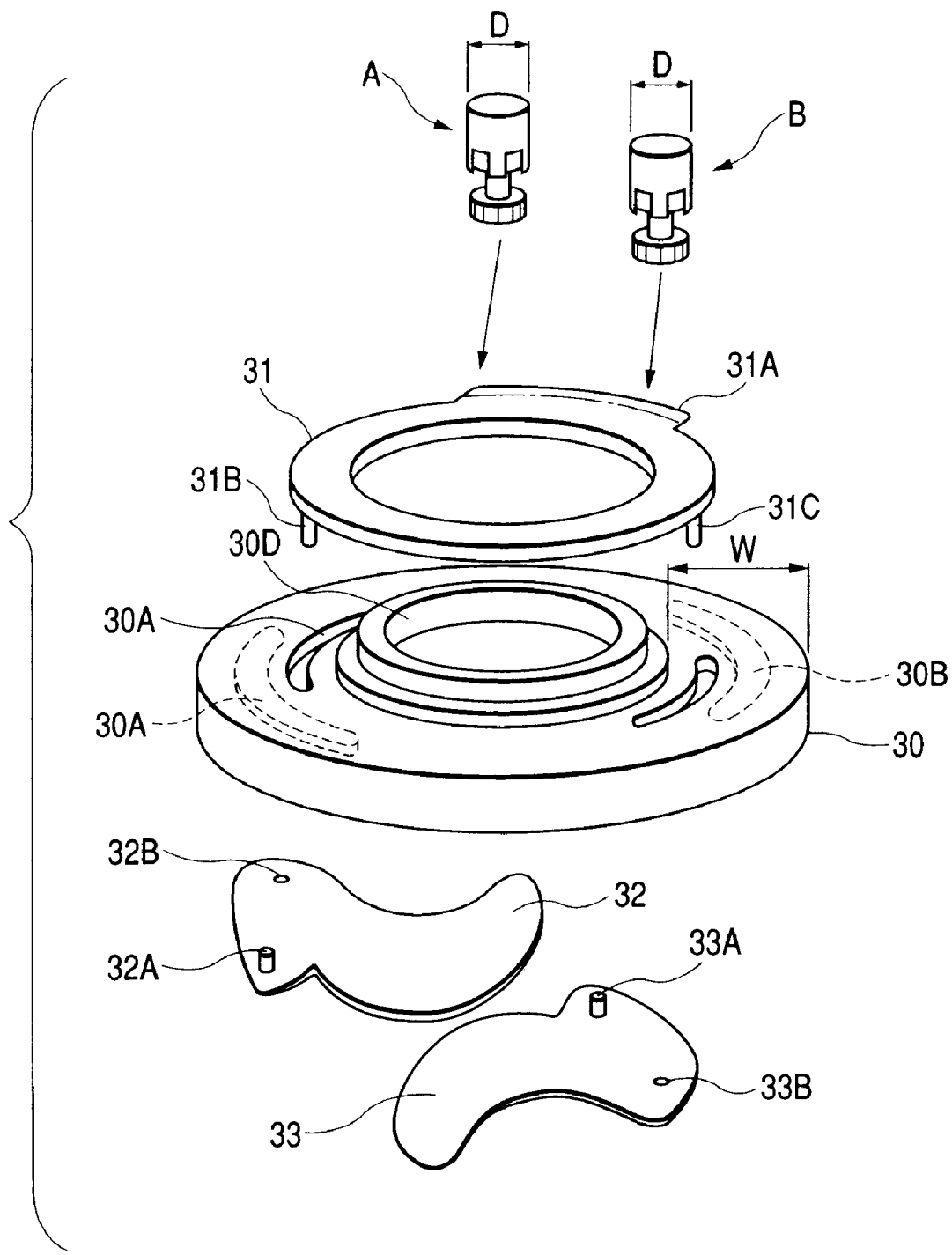
FIG. 22 is an exploded perspective view showing an embodiment when the driving apparatus according to the present invention is adopted in an aperture blade driving mechanism.
Figure 23:
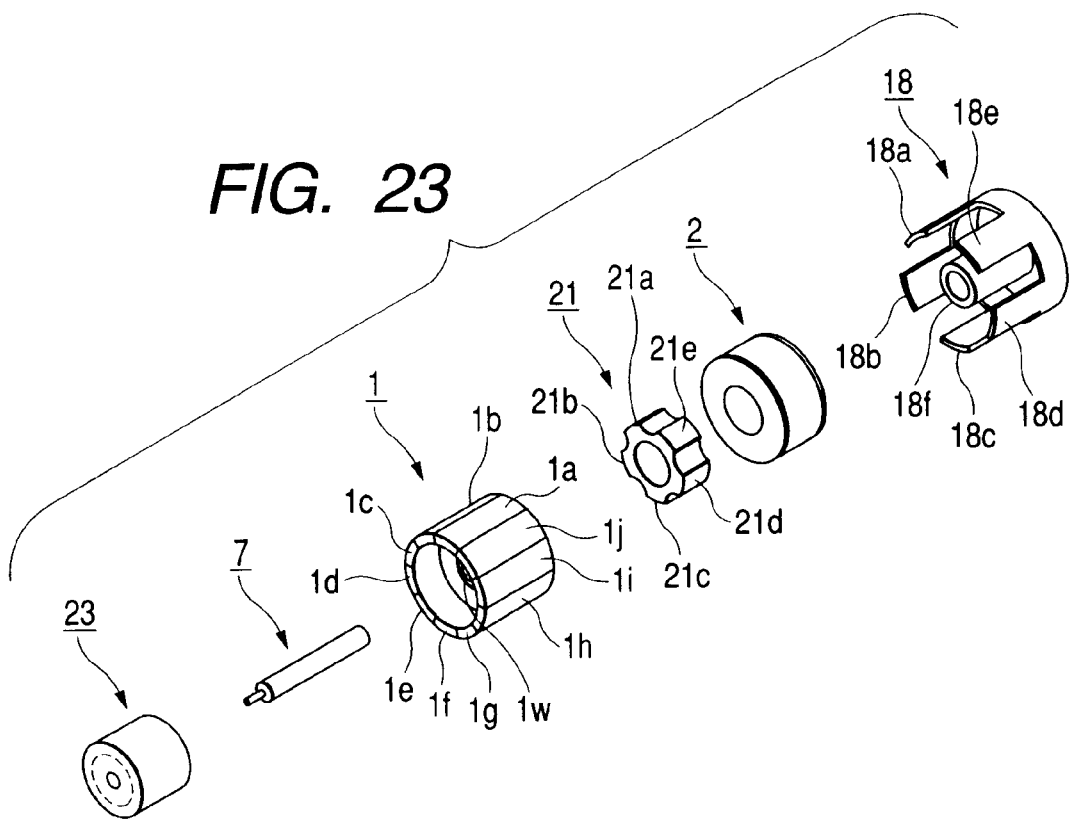
FIG. 23 is an exploded perspective view of a first driving apparatus.
Figure 24:
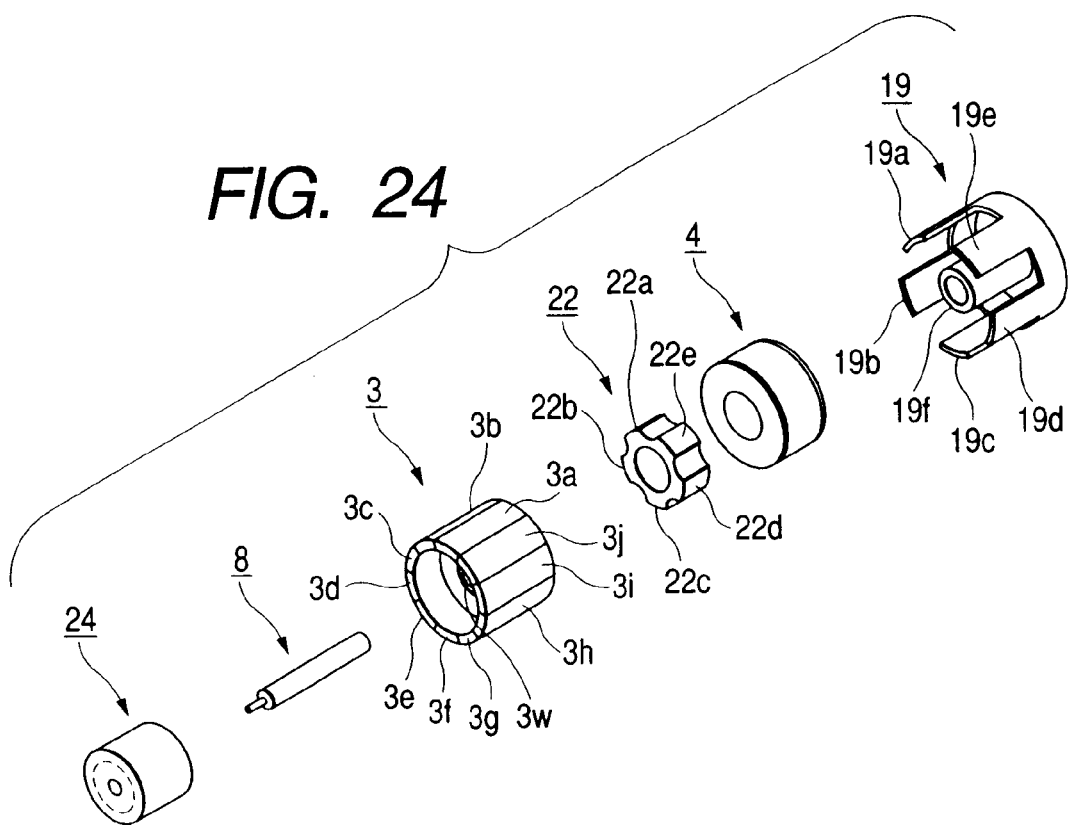
FIG. 24 is an exploded perspective view of a second driving apparatus.
Figure 25:
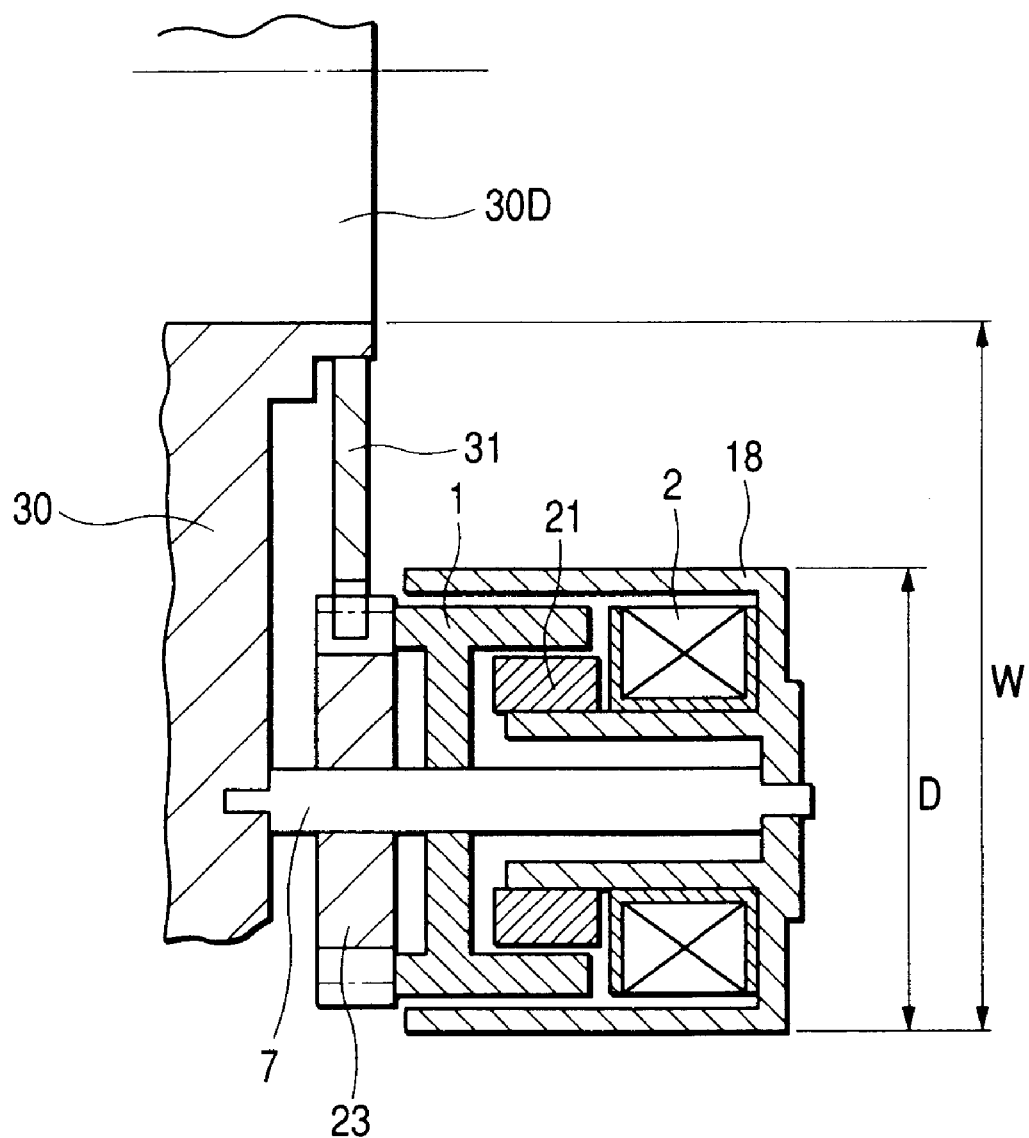
FIG. 25 is a sectional view of the first driving apparatus.

FIGS. 22 through 29 show a fourth embodiment of the present invention. FIG. 22 is an exploded perspective view of an iris blade drive mechanism; FIG. 23, an exploded perspective view of a first drive; FIG. 24, an exploded perspective view of a second drive; FIG. 25, a cross-sectional view of the first drive; and FIGS. 26 through 29, cross-sectional views showing the relationship between the first and second drives and a motor consisting of output means. Because the second drive has the same structure as the first drive, the cross-sectional view of the second drive is similar to that of the first drive in FIG. 25.

In FIGS. 22 through 29, a reference numeral 1 indicates a cylindrical magnet, a component of a rotor. The side of the magnet 1 is divided in the circumferential direction into n (10 for the embodiment) magnetized sections 1a, 1b, 1c, 1d, 1e, 1f, 1g, 1h, 1i, and 1j which are magnetized so that they are alternately S and N poles. That is, the magnetized sections 1a, 1c, 1e, 1g, and 1i are S poles, and the remaining sections 1b, 1d, 1f, 1h, and 1j are N poles. The magnet 1 is injection molded from a plastic magnet material. Injection molding allows the cylindrical magnet to have a small radial wall thickness.

In its longitudinal center, the magnet 1 has a fit hole 1*w* which is smaller in diameter than the magnet. A reference numeral 7 indicates a shaft which is press fit into the hole 1*w* of the magnet 1. The shaft 7 is rotatably supported at one end by a second stator 18 and at the other end by a base plate 30.

Because the magnet 1 is injection molded from plastic, it can be even press fit without cracks. Injection molding also allows the magnet to be easily produced, although its design is complex because of the longitudinal fit hole 1*w*, which is smaller in diameter than the magnet. Because the magnet is easily press fit over the shaft 7, production cost is low. The shaft 7 and magnet 1 constitute the rotor.

A reference numeral 2 indicates a coil. The coil 2 is concentric with the magnet 1 and aligned with the magnet 1 in the axial direction. The coil 2 also has almost the same outer diameter as the magnet 1.

A reference numeral 18 indicates a first stator made of a soft magnetic material. The first stator consists of an external cylinder and a hollow internal cylinder. One end of the external cylinder is formed into first external magnetic poles 18*a*, 18*b*, 18*c*, 18*d*, and 18*e*. A reference numeral 21 indicates an auxiliary stator which has an internal diameter 21*f*. The auxiliary stator is securely fit over the internal cylinder 18*f* of the first stator 18. The auxiliary stator is also provided around the circumference with counterparts 21*a*, 21*b*, 21*c*, 21*d*, and 21*e* which are opposite in phase to the external magnetic poles 18*a*, 18*b*, 18*c*, 18*d*, and 18*e*. The counterparts 21*a*, 21*b*, 21*c*, 21*d*, and 21*e* are formed at intervals of 360°/(n/2), that is, 72° so that they are similar in phase to each other for magnetization by the magnet 1. The first external magnetic poles 18*a*, 18*b*, 18*c*, 18*d*, and 18*e* are also formed at intervals of 360°/(n/2), that is, 72° so that they are similar in phase to each other for magnetization by the magnet 1. The hollow internal cylinder 18*f* and auxiliary stator 21 constitute a first internal magnetic pole.

A reference numeral 23 indicates a first gear with ten teeth. They are equal in number to the poles of the magnet 1. The first gear is integral with the magnet 1. The embodiment is arranged so that the center of each magnetic pole is in phase with a tooth as shown in FIGS. 26 through 29. The above-described components forms the first drive, which is indicated by a letter of the alphabet A in FIG. 22.

A reference numeral 3 indicates a cylindrical magnet, a component of a rotor. The side of the magnet 1 is divided in the circumferential direction into n (10 for the embodiment) magnetized sections 3*a*, 3*b*, 3*c*, 3*d*, 3*e*, 3*f*, 3*g*, 3*h*, 3*i*, and 3*j* which are magnetized so that they are alternately S and N poles. That is, the magnetized sections 3*a*, 3*c*, 3*e*, 3*g*, and 3*i* are S poles, and the remaining sections 3*b*, 3*d*, 3*f*, 3*h*, and 3*j* are N poles. The magnet 3 is injection molded from a plastic magnet material. Injection molding allows the cylindrical magnet to have a small radial wall thickness.

In its longitudinal center, the magnet 3 has a fit hole 3*w* which is smaller in diameter than the magnet. A reference numeral 8 indicates a shaft which is press fit into the hole 3*w* of the magnet 3. The shaft 8 is rotatably supported at one end by a second stator 19 and at the other end by the base plate 30.

Because the magnet 3 is injection molded from plastic, it can be even press fit without cracks. Injection molding also allows the magnet to be easily produced, although its design is complex because of the longitudinal fit hole 3*w*, which is smaller in diameter than the magnet. Because the magnet is easily press fit over the shaft 8, production cost is low. The shaft 8 and magnet 3 constitute the rotor.

A reference numeral 4 indicates a coil. The coil 4 is concentric with the magnet 3 and aligned with the magnet 3 in the axial direction. The coil 4 also has almost the same outer diameter as the magnet 3.

A reference numeral 19 indicates a second stator made of a soft magnetic material. The second stator consists of an external cylinder and a hollow internal cylinder. One end of the external cylinder is formed into second external magnetic poles 19*a*, 19*b*, 19*c*, 19*d*, and 19*e*. A reference numeral 22 indicates a second auxiliary stator which has an internal diameter 22*f*. The auxiliary stator is securely fit over the internal cylinder 19*f* of the second stator 19. The auxiliary stator is also provided around the circumference with counterparts 22*a*, 22*b*, 22*c*, 22*d*, and 22*e* which are opposite in phase to the external magnetic poles 19*a*, 19*b*, 19*c*, 19*d*, and 19*e*. The counterparts 22*a*, 22*b*, 22*c*, 22*d*, and 22*e* are formed at intervals of 360°/(n/2), that is, 72° so that they are similar in phase to each other for magnetization by the magnet 3. The second external magnetic poles 19*a*, 19*b*, 19*c*, 19*d*, and 19*e* are also formed at intervals of 360°/(n/2), that is, 72° so that they are similar in phase to each other for magnetization by the magnet 3. The hollow internal cylinder 19*f* and auxiliary stator 22 constitute a second internal magnetic pole.

A reference numeral 24 indicates a second gear with ten teeth. They are equal in number to the poles of the magnet 3. The second gear is integral with the magnet 3. The embodiment is arranged so that the center of each magnetic pole is in phase with a tooth as shown in FIGS. 26 through 29. The above-described components forms the second drive, which is indicated by a letter of the alphabet B in FIG. 22.

A reference numeral 31 indicates an output ring which is rotatably fit into a fit hole 30A in the base plate 30. The base plate has an opening 30D. The first stator 18 of the first drive A and the second stator 19 of the second drive B are secured to the base plate 30 using known means, such as a bond or screws.

The first and second drives are located so that their axes are parallel to the base plate 30. The output ring 31 has a toothed part 31A, which is engaged with the first gear 23 integral with the magnet of the first drive and the second gear 24 integral with the magnet of the second drive.

Thus the magnet 1 of the first drive 1 and the magnet 3 of the second drive can cooperatively be driven through the output ring 31. The relationship between the magnetization phase of the magnet 1 and the external magnetic poles 18*a*, 18*c*, 18*c*, 18*d*, and 18*e* differs by 180°/n, that is, 18° from that between the magnetization phase of the magnet 3 and the external magnetic poles 19*a*, 19*b*, 19*c*, 19*d*, and 19*e*.

The output ring 31 is rotated by the first and second drives. How the ring is driven will be described later. Reference numerals 32 and 33 indicate iris blades. Dowels 32A and 33A are slidably fit into cam grooves 30A, 30B formed in the base plate 30, and holes 32B and 33B are rotatably fit over dowels 31B and 31C of the output ring 31. The iris blades 32 and 33 are designed so that as the output ring 31 rotates, they rotate about an optical axis to change the opening.

The external magnetic poles 18*a*, 18*b*, 18*c*, 18*d*, and 18*e* of the first stator 18 and the external magnetic poles 19*a*, 19*b*, 19*c*, 19*d*, and 19*e* of the second stator 19 consist of cuts and teeth which extend in parallel with the axis. Such an arrangement allows the poles to be formed, with the diameter of the motor minimized. If the external magnetic poles are formed with radially extending irregularities, the diameter of the motor increases accordingly. For the embodiment, however, the external magnetic poles which consist of the cuts and teeth extending in parallel with the axis allow the first and second drives to be minimized in diameter. The first and second drives are disposed so that they do not block the opening 30D. The diameter D of the drives can be minimized, thus reducing a dimension W, excluding the opening 30D, to a minimum. As a result, the diameter of the iris blade drive itself is reduced to a minimum. FIGS. 22 and 25 show the above-described arrangement.

Both the first and second drives are permissibly as long as the magnets and the first or second coil together, so that the drives provide short actuators. Because the first and second drives are disposed so that their axes are parallel to each other, the drives, or actuators which drive the iris blades, are short in the direction parallel to the optical axis. Thus they do not obstruct other lenses or structures.

The external magnetic poles 18a, 18b, 18c, 18d, and 18e of the first stator 18 and splines 21a, 21b, 21c, 21d, and 21e of a first auxiliary stator, which are some of the first internal magnetic poles, are provided opposite to the outer and inner surface at one end of the magnet 1 to sandwich the end.

The external magnetic poles 19a, 19b, 19c, 19d, and 19e of the second stator 19 and splines 22a, 22b, 22c, 22d, and 22e of a second auxiliary stator, which are some of the second internal magnetic poles, are provided opposite to the outer and inner surface at the other end of the magnet 1 to sandwich the end.

A coil 2 is provided between the outer and inner cylinders of the first stator 18. By energizing the coil 2, the first stator 18 and a first auxiliary yoke 21 are magnetized.

A coil 4 is provided between the outer and inner cylinders of the second stator 19. By energizing the coil 4, the second stator 19 and a second auxiliary yoke 22 are magnetized.

Magnetic flux produced by the coil 2 crosses the magnet 1, or the rotor between the external magnetic poles 18a, 18b, 18c, 18d, and 18e and the counterparts 21a, 21b, 21c, 21d, and 21e which constitute a part of the internal magnetic flux, thus effectively acting on the magnet. On the other hand, magnetic flux produced by the coil 4 crosses the magnet 3, or the rotor between the external magnetic poles 19a, 19b, 19c, 19d, and 19e and the counterparts 22a, 22b, 21c, 22d, and 22e which constitute a part of the internal magnetic flux, thus effectively acting on the magnet to increase motor output.

The outer diameter of the first internal magnetic poles is larger than the inner diameter of the first coil, and the outer diameter of the second internal magnetic poles is larger than the inner diameter of the second coil. Because of this, the distance between the first external magnetic poles and the first internal magnetic poles and that between the second external magnetic poles and the second internal magnetic poles can be reduced if the inner diameter of the coils is reduced and if the volume which the coils take is increased. This, in turn, means that magnetic resistance is low as viewed from the coils, so that much magnetic flux is produced using low electric power, thus increasing motor output.

FIGS. 26 through 29 are cross-sectional views showing the relationship between the first and second drives and the motor, which consists of output means.

The relationship between the magnetization phase of the magnet 1 and the external magnetic poles 18a, 18c, 18c, 18d, and 18e differs by 180°/n, that is, 18° from that between the magnetization phase of the magnet 3 and the external magnetic poles 19a, 19b, 19c, 19d, and 19e.

Figure 26:
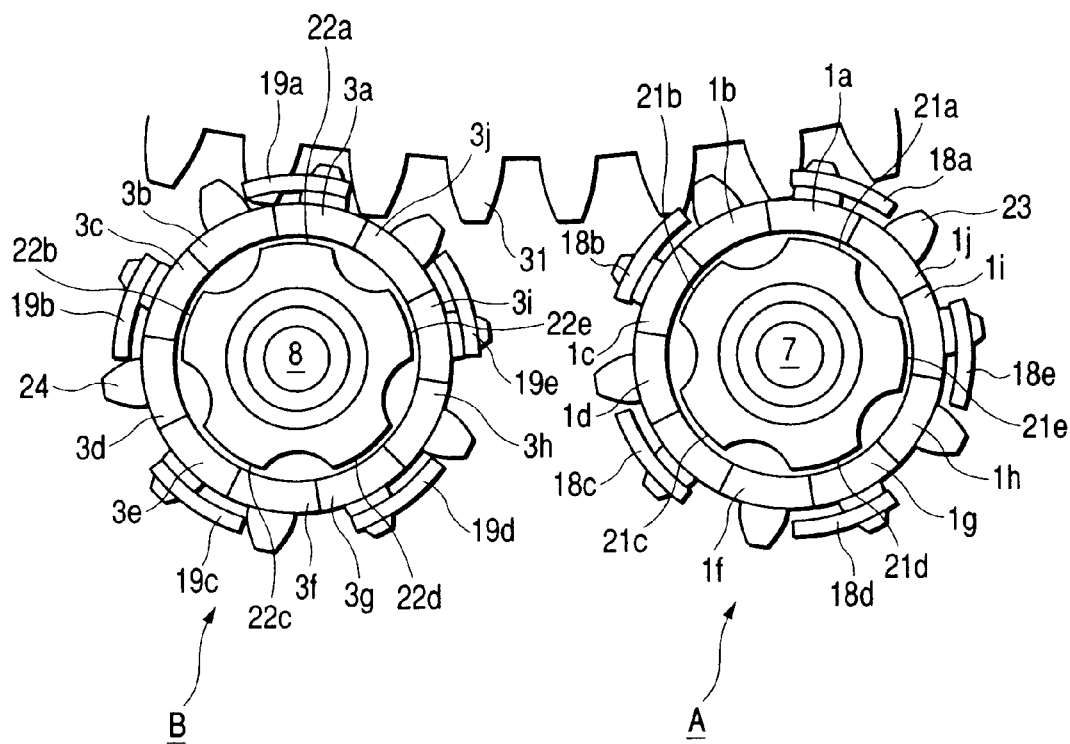
FIG. 26 is a view showing a relationship of a motor constituted by the first and second driving apparatuses and output means.
Figure 27:
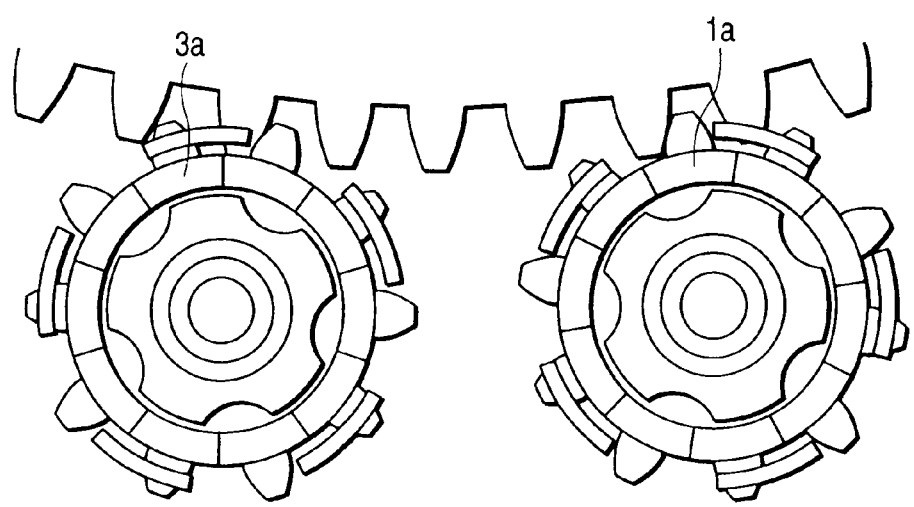
FIG. 27 is a view showing a relationship of the motor constituted by the first and second driving apparatuses and the output means.
Figure 28:
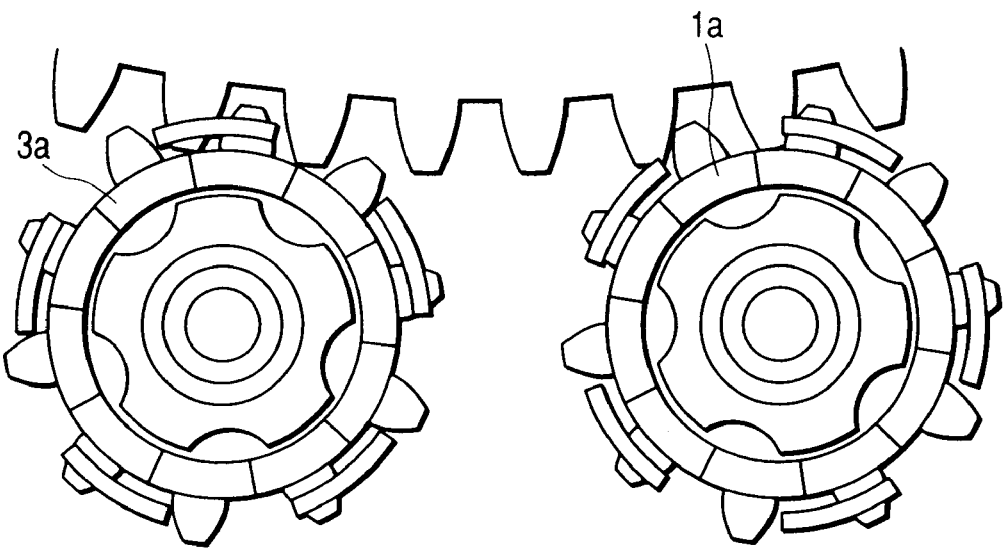
FIG. 28 is a view showing a relationship of the motor constituted by the first and second driving apparatuses and the output means.

Below will be described how the first and second drives drive an output ring 31. When the coils 2 and 4 in FIG. 26 are energized so that the external magnetic poles 18a, 18b, 18c, 18d, 18e, 22a, 22b, 22c, 22d, and 22e are S poles and that the counterparts 21a, 21b, 21c, 21d, 21e, 19a, 19b, 19c, 19d, and 19e are N poles, the magnets 1 and 3, connected together by the output ring 31, rotate 18° counterclockwise, and the output ring 31 also rotates accordingly to a position as shown in FIGS. 6A and 6B.

When the coil 4 is reversely energized so that the external magnetic poles 18a, 18b, 18c, 18d, 18e, 19a, 19b, 19c, 19d, and 19e are S poles and that the counterparts 21a, 21b, 21c, 21d, 21e, 22a, 22b, 22c, 22d, and 22e are N poles, the magnets 1 and 3 rotate 18° counterclockwise, and the output ring 31 also rotates accordingly to a position as shown in FIG. 7.

Figure 29:
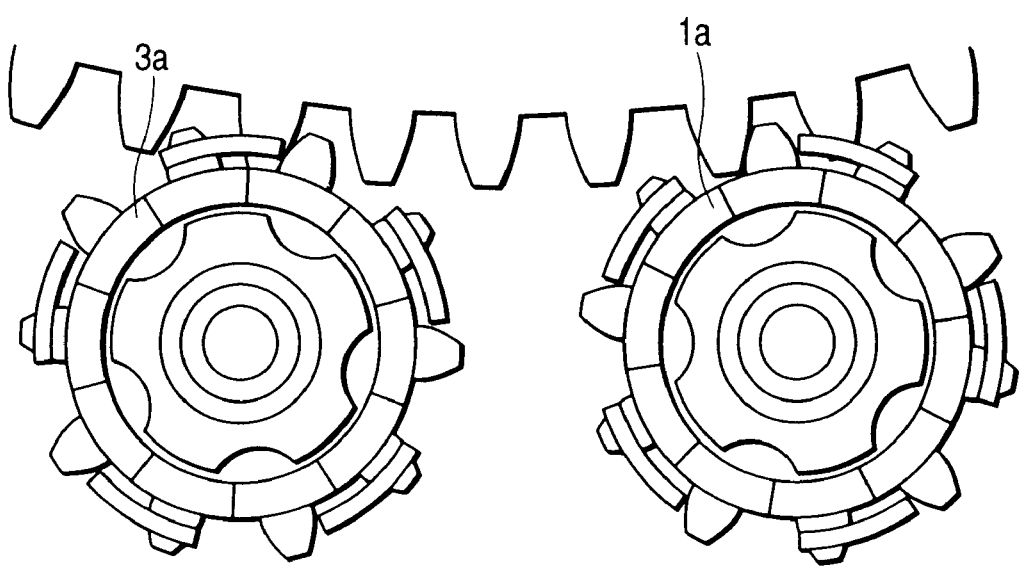
FIG. 29 is a view showing a relationship of the motor constituted by the first and second driving apparatuses and the output means.

When the coil 2 is reversely energized so that the external magnetic poles 18a, 18b, 18c, 18d, 18e, 22a, 22b, 22c, 22d, and 22e are N poles and that the counterparts 21a, 21b, 21c, 21d, 21e, 19a, 19b, 19c, 19d, and 19e are S poles, the magnets 1 and 3 rotate 18° counterclockwise, and the output ring 31 also rotates accordingly to a position as shown in FIG. 29.

The first and second drives have only to have an enough diameter to place the magnetic poles of the stators opposite to the diameter of the magnets. The first and second drives are permissibly as long as the magnets and the first or second coil together. Thus the size of the first and second drives depends on the diameter and length of the magnets and coils. Reducing the diameter and length of the magnets and coils allows the first and second drives to be downsized.

On the other hand, reducing the diameter and length of the magnets and coils makes it difficult to maintain the accuracy of the drives 1 and 2. To solve this problem, the magnets are formed into a hollow cylinder to provide such a simple structure that the external and internal magnetic poles of the first and second stators are opposite to the external and internal circumferential surfaces of the hollow cylinder. By dividing not only the external circumferential surface of the magnets but their internal circumferential surface circumferentially and magnetizing the surfaces, motor output can be increased.

The first and second drives are disposed not to block the opening 30D. Reducing the diameter of the drives allows the iris blade drive to be reduced in diameter.

Disposing the first and second drives axially in parallel with each other allows them, that is, the actuators driving the iris blades to be short in the direction of the optical axis and be prevented from obstructing other lenses and structures.

As described above, the relationship between the magnetization phase of the magnet 1 and the external magnetic poles 18a, 18b, 18c, 18d, and 18e must differ by 180°/n, that is, 18° from that between the magnetization phase of the magnet 3 and the external magnetic poles 19a, 19b, 19c, 19d, and 19e. The first and second gears 23, 24 have as many teeth as the magnetizing poles of the magnet 1 or 3, that is, ten teeth. The gears are formed integrally with the magnet 1 or 3.

Such formation allows an assembler to check magnet magnetization phases by observing the phases of the first and second gears. For the embodiment, the magnetization phases are adapted so that the center of each pole of the magnets aligns with the end of a tooth.

Thus observing the position of the teeth of the gears allows the magnetization phases of the magnets to be visually checked. The magnets of the first and second drives rotate through the output means with respect to each other. Visually checking the magnetization phases as described above helps assemble the magnets in place, thus increasing assembly efficiency.

For the embodiment, the magnets 1 and 3 are connected together, using the output ring and gears which have as many teeth as the magnetic poles. However, if ease of assembly is neglected, the first and second gears do not need to have as many teeth as the magnetic poles of the magnets 1 and 3.

The magnets 1 and 3 are connected together through the first and second gears 23 and 24 and the toothed part 31A of the output ring 31. However, another connecting method may be used. For example the magnets 1 and 3 are provided with pins, and a groove into which the pins fit is formed in the output ring. Such an arrangement works if the magnets 1 and 3 make a small number of turns.

The embodiment uses the transmission which consists of the first and second drives and the output ring, or a transmitting mechanism, as an actuator which opens or closes the iris blades. However, the transmission, which finds other uses, such as rotating a cam cylinder to drive a lens, has the advantages of high power, a small diameter, and a short axial length.

Embodiment 5

Figure 30:
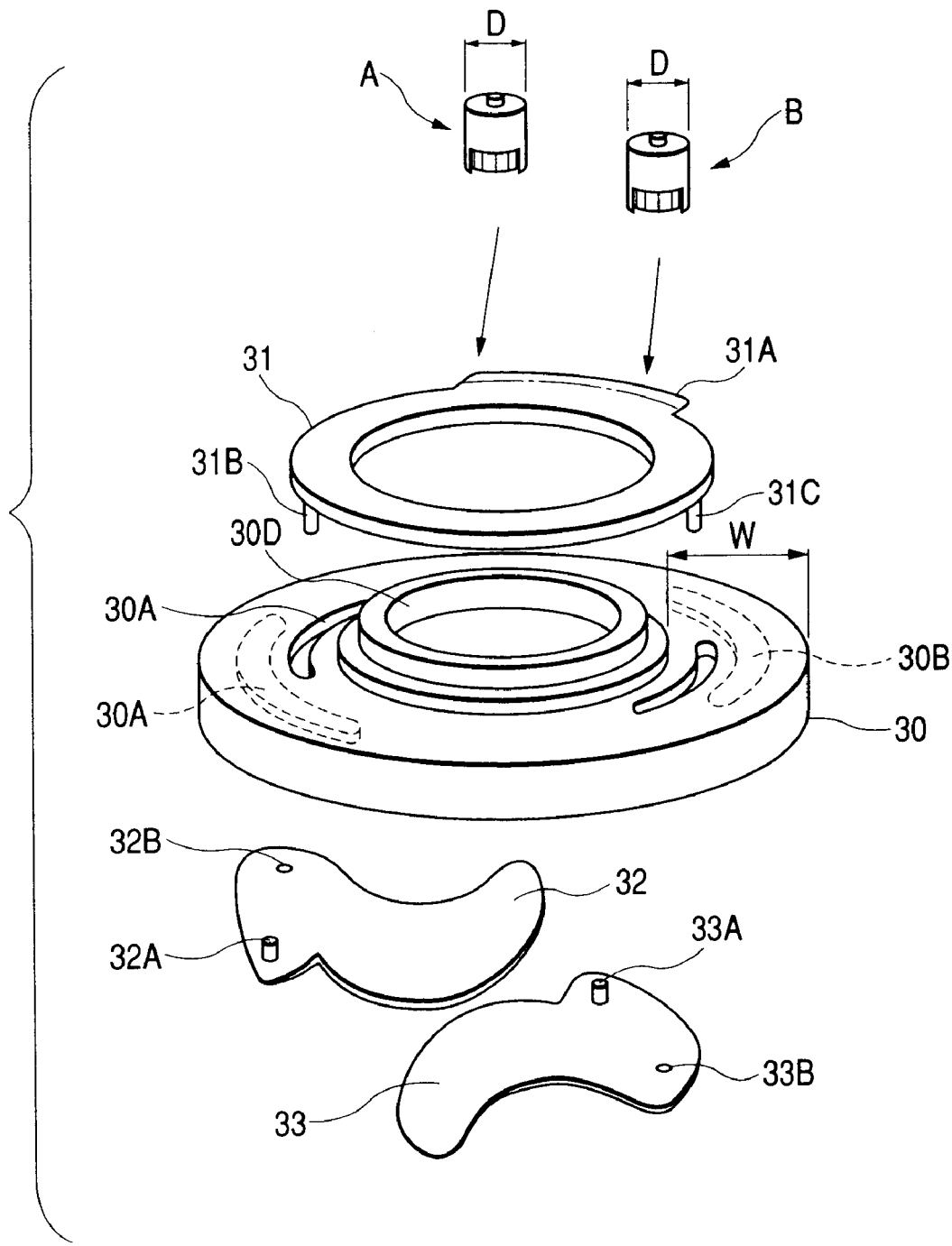
FIG. 30 is an exploded perspective view showing another embodiment when the driving apparatus according to the present invention is adopted in an aperture blade driving mechanism.
Figure 31:
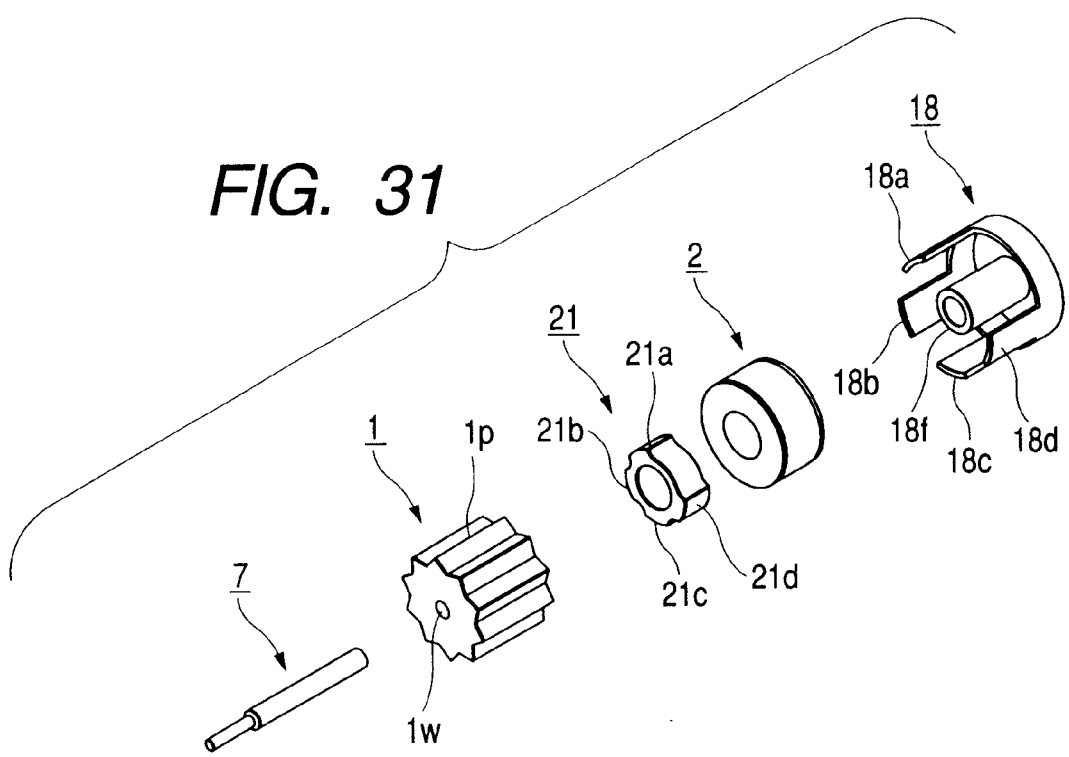
FIG. 31 is an exploded perspective view of a first driving apparatus shown in FIG. 30.
Figure 32:
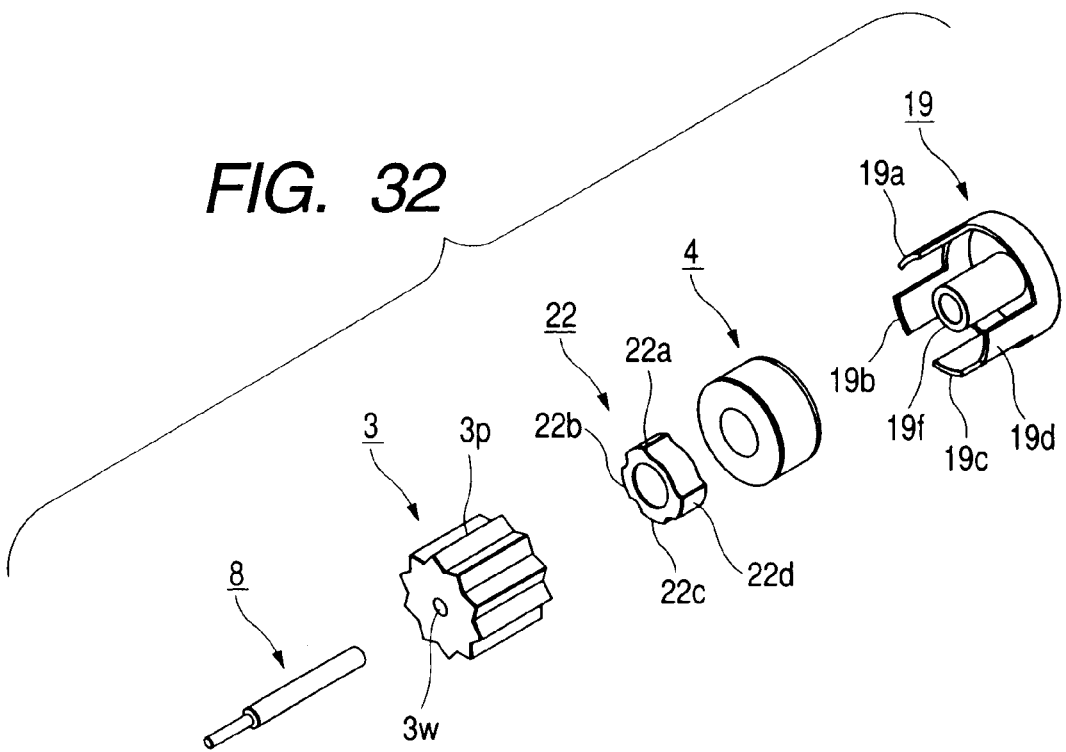
FIG. 32 is an exploded perspective view of the first driving apparatus shown in FIG. 30.
Figure 33:
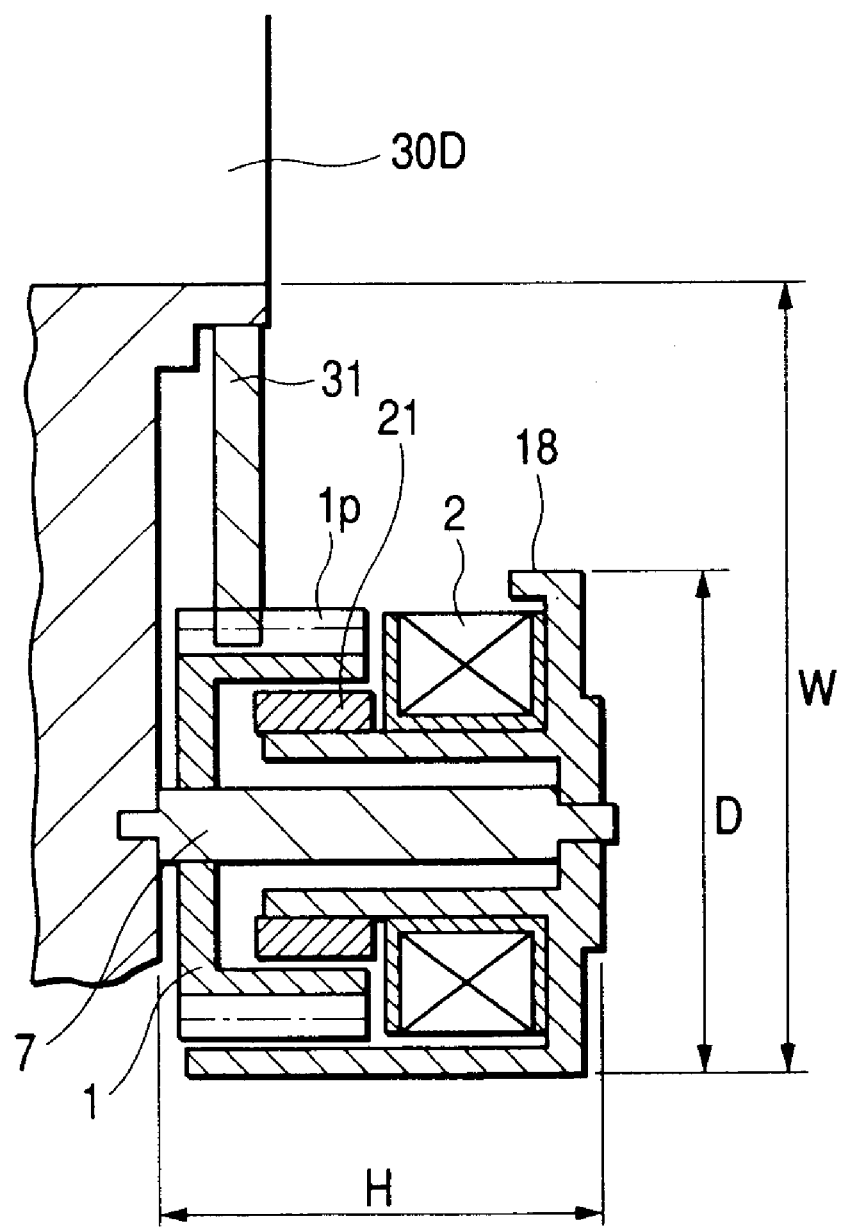
FIG. 33 is a sectional view of the first driving apparatus.

FIGS. 30 through 37 show a fifth embodiment of the present invention. FIG. 30 is an exploded perspective view of an iris blade drive mechanism; FIG. 31, an exploded perspective view of a first drive; FIG. 32, an exploded perspective view of a second drive; FIG. 33, a cross-sectional view of the first drive; and FIGS. 34 through 37, cross-sectional views showing the relationship between the first and second drives and a motor consisting of output means. Because the second drive has the same structure as the first drive, the cross-sectional view of the second drive is similar to that of the first drive in FIG. 33.

In FIGS. 30 through 37, a reference numeral 1 indicates a cylindrical magnet, a component of a rotor. The side of the magnet 1 is divided in the circumferential direction into n (10 for the embodiment) magnetized sections 1a, 1b, 1c, 1d, 1e, 1f, 1g, 1h, 1i, and 1j which are magnetized so that they are alternately S and N poles. That is, the magnetized sections 1a, 1c, 1e, 1g, and 1i are S poles, and the remaining sections 1b, 1d, 1f, 1h, and 1j are N poles. The magnet 1 is injection molded from a plastic magnet material. Injection molding allows the cylindrical magnet to have a small radial wall thickness.

In its longitudinal center, the magnet 1 has a fit hole 1w which is smaller in diameter than the magnet. A reference symbol 1p indicates a toothed part formed on the magnet. The toothed section has as many teeth as the magnetic poles of the magnet 1, that is 10 teeth, and is, of course, magnetized. For the embodiment, the tooth phases and magnetization phases are adapted so that each pole of the magnet aligns with the end of a tooth, as shown in FIGS. 34 through 37. The number of teeth which the toothed part has may be an integral multiple of the number of magnetic poles. For example, the toothed part may have 20 teeth, twice as many as the 10 magnetic poles. In this case, the teeth are disposed so that they are symmetric about the center of the magnetic poles as shown in FIG. 38. No matter whether the toothed part has 10 or 20 teeth, the teeth are disposed to be symmetric about the center of the magnetic poles, and the shape is also symmetric about the center of the magnetic poles. Thus the magnet can be adapted so that its intensity of magnetism is symmetric about the center of each pole and that stable output can be provided.

A reference numeral 7 indicates a shaft which is press fit into the hole 1w of the magnet 1. The shaft 7 is rotatably supported at one end by a second stator 18 and at the other end by a base plate 30.

Because the magnet 1 is injection molded from plastic, it can be even press fit without cracks. Injection molding also allows the magnet to be easily produced, although its design is complex because of the longitudinal fit hole 1w, which is smaller in diameter than the magnet. Because the magnet is easily press fit over the shaft 7, production cost is low. The shaft 7 and magnet 1 constitute the rotor. A reference numeral 2 indicates a cylindrical coil. The coil 2 is concentric with the magnet 1 and aligned with the magnet 1 in the axial direction. The coil 2 also has almost the same outer diameter as the magnet 1.

A reference numeral 18 indicates a first stator made of a soft magnetic material. The first stator consists of an external cylinder and a hollow internal cylinder. One end of the external cylinder is formed into N/(2−1) first external magnetic poles, that is, four first external magnetic poles 18a, 18b, 18c, and 18d. A reference numeral 21 indicates a first auxiliary stator which has an internal diameter 21f. The auxiliary stator is securely fit over the internal cylinder 18f of the first stator 18. The auxiliary stator is also provided around the outer circumference with counterparts 21a, 21b, 21c, and 21d which are opposite in phase to the external magnetic poles 18a, 18b, 18c, and 18d. The counterparts 21a, 21b, 21c, and 21d are formed at intervals of an integral multiple of 360°/(n/2), that is, an integral multiple of 72° so that they are similar in phase to each other for magnetization by the magnet 1. The first external magnetic poles 18a, 18b, 18c, and 18d are also formed at intervals of an integral multiple of 360°/(n/2), that is, an integral multiple of 72° so that they are similar in phase to each other for magnetization by the magnet 1. The interval between the external magnetic poles 18a and 18b, between 18b and 18c, and between 18c and 18d is 360°/(n/2), that is 72°, and only the interval between the external magnetic poles 18a and 18d is 360°/(n/2) multiplied by 2, that is, 144°.

The hollow internal cylinder 18f and auxiliary stator 21 constitute a first internal magnetic pole. The above-described components forms the first drive, which is indicated by a letter of the alphabet A in FIG. 30.

A reference numeral 3 indicates a cylindrical magnet, a component of a rotor. The side of the magnet 3 is divided in the circumferential direction into n (10 for the embodiment) magnetized sections 3a, 3b, 3c, 3d, 3e, 3f, 3g, 3h, 3i, and 3j which are magnetized so that they are alternately S and N poles. That is, the magnetized sections 3a, 3c, 3e, 3g, and 3i are S poles, and the remaining sections 3b, 3d, 3f, 3h, and 3j are N poles. The magnet 3 is injection molded from a plastic magnet material. Injection molding allows the cylindrical magnet to have a small radial wall thickness.

In its longitudinal center, the magnet 3 has a fit hole 3w which is smaller in diameter than the magnet. A reference symbol 3p indicates a toothed part formed on the magnet. The toothed section has as many teeth as the magnetic poles of the magnet 3, that is 10 teeth, and is, of course, magnetized. For the embodiment, the tooth phases and magnetization phases are adapted so that each pole of the magnet aligns with the end of a tooth, as shown in FIGS. 34 through 37. The number of teeth which the toothed part has may be an integral multiple of the number of magnetic poles. For example the toothed part may have 20 teeth, twice as many as the 10 magnetic poles. In this case, the teeth are disposed so that they are symmetric about the center of the magnetic poles as is the case with the magnet 1 in FIG. 38. No matter whether the toothed part has 10 or 20 teeth, the teeth are disposed to be symmetric about the center of the magnetic poles, and the shape is also symmetric about the center of the magnetic poles. Thus the magnet can be adapted so that its intensity of magnetism is symmetric about the center of each pole and that stable output can be provided.

A reference numeral 8 indicates a shaft which is press fit into the hole 3w of the magnet 3. The shaft 8 is rotatably supported at one end by a second stator 19 and at the other end by a base plate 30.

Because the magnet 3 is injection molded from plastic magnet, it can be even press fit without cracks. Injection molding also allows the magnet to be easily produced, although its design is complex because of the fit hole 3w in the axial center, which is smaller in diameter than the magnet. Because the magnet 3 is easily press fit over the shaft 8, production cost is low. The shaft 8 and magnet 3 constitute the rotor. A reference numeral 4 indicates a cylindrical coil. The coil 4 is concentric with the magnet 3 and aligned with the magnet 3 in the axial direction. The coil 4 also has almost the same outer diameter as the magnet 3.

A reference numeral 19 indicates a second stator made of a soft magnetic material. The second stator consists of an external cylinder and a hollow internal cylinder. One end of the external cylinder is formed into N/(2–1) second external magnetic poles, that is, four first external magnetic poles 19a, 19b, 19c, and 19d. A reference numeral 22 indicates a second auxiliary stator which has an internal diameter 22f. The auxiliary stator is securely fit over the internal cylinder 19f of the second stator 19. The auxiliary stator is also provided around the outer circumference with counterparts 22a, 22b, 22c, and 22d which are opposite in phase to the external magnetic poles 19a, 19b, 19c, and 19d. The counterparts 22a, 22b, 22c, and 22d are formed at intervals of an integral multiple of 360°/(n/2), that is, an integral multiple of 72° so that they are similar in phase to each other for magnetization by the magnet 3. The second external magnetic poles 19a, 19b, 19c, and 19d are also formed at intervals of an integral multiple of 360°/(n/2), that is, an integral multiple of 72° so that they are similar in phase to each other for magnetization by the magnet 3. The interval between the external magnetic poles 19a and 19b, between 19b and 19c, and between 19c and 19d is 360°/(n/2), that is 72°, and only the interval between the external magnetic poles 19a and 19d is 360° /(n/2) multiplied by 2, that is, 144°.

The hollow internal cylinder 19f and auxiliary stator 22 constitute a second internal magnetic pole.

The embodiment is arranged so that the center of each magnetic pole is in phase with a tooth as shown in FIGS. 34 through 37. The above-described components forms the second drive, which is indicated by a letter of the alphabet B in FIG. 30.

A reference numeral 31 indicates an output ring which is rotatably fit into a fit hole 30A in the base plate 30. The base plate has an opening 30D. The first stator 18 of the first drive A and the second stator 19 of the second drive B are secured to the base plate 30 using known means, such as a bond or screws.

The first and second drives are located so that their axes are parallel to the base plate 30. The output ring 31 has a toothed part 31A, which is engaged with the first gear 23 integral with the magnet of the first drive and the second gear 24 integral with the magnet of the second drive.

Thus the first magnet 1 and the second magnet 3 can cooperatively be driven through the output ring 31. The relationship between the magnetization phase of the magnet 1 and the external magnetic poles 18a, 18c, 18c, and 18d differs by 180°/n, that is, 18° from that between the magnetization phase of the magnet 3 and the external magnetic poles 19a, 19b, 19c, and 19d. The output ring 31 is engaged with the toothed part of the magnet 1 between the external magnetic poles 18a and 18d and with the toothed part of the magnet 3 between the external magnetic poles 19a and 19d. Thus the output ring can be axially disposed in the same positions as the external magnetic poles so that the ring does not come in contact with the external magnetic poles. This allows the axial dimension of the motor to be reduced. That is, the dimension H in FIG. 33 can be reduced.

The output ring 31 is rotated by the first and second drives. This will be described later. Reference numerals 32 and 33 indicate iris blades. Dowels 32A and 33A are slidably fit into cam grooves 30A, 30B formed in the base plate 30, and holes 32B and 33B are rotatably fit over dowels 31B and 31C of the output ring 31. The iris blades 32 and 33 are designed so that as the output ring 31 rotates, they rotate about an optical axis to change the opening.

The external magnetic poles 18a, 18b, 18c, and 18d of the first stator 18 and the external magnetic poles 19a, 19b, 19c, and 19d of the second stator 19 consist of cuts and teeth which extend in parallel with the axis. Such an arrangement allows the poles to be formed, with the diameter of the motor minimized. If the external magnetic poles are formed with radially extending irregularities, the diameter of the motor increases accordingly. For the embodiment, however, the external magnetic poles which consist of the cuts and teeth extending in parallel with the axis allow the first and second drives to be minimized in diameter. The first and second drives are disposed so that they do not block the opening 30D. The diameter D of the drives can be minimized, thus reducing a dimension W, excluding the opening 30D, to a minimum. As a result, the diameter of the iris blade drive itself is reduced to a minimum. FIGS. 30 and 33 show the above-described arrangement.

Both the first and second drives are permissibly as long as the magnets and the first or second coil together, so that the drives provide short actuators. Because the first and second drives are disposed so that their axes are parallel to each other, the drives, or actuators which drive the iris blades, are short in the direction parallel to the optical axis. Thus they do not obstruct other lenses or structures.

The external magnetic poles 18a, 18b, 18c, and 18d of the first stator 18 and splines 21a, 21b, 21c, and 21d of a first auxiliary stator which are some of the first internal magnetic poles, are provided opposite to the outer and inner surfaces at one end of the magnet 1 to sandwich the end.

The external magnetic poles 19a, 19b, 19c, and 19d of the second stator 19 and splines 22a, 22b, 22c, and 22d of a second auxiliary stator, which are some of the second internal magnetic poles, are provided opposite to the outer and inner surfaces at the other end of the magnet 1 to sandwich the end.

A coil 2 is provided between the outer and inner cylinders of the first stator 18. By energizing the coil 2, the first stator 18 and a first auxiliary yoke 21 are magnetized.

A coil 4 is provided between the outer and inner cylinders of the second stator 19. By energizing the coil 4, the second stator 19 and a second auxiliary yoke 22 are magnetized.

Magnetic flux produced by the coil 2 crosses the magnet 1, or the rotor between the external magnetic poles 18a, 18b, 18c, and 18d and the counterparts 21a, 21b, 21c, and 21d, which constitute a part of the internal magnetic flux, thus effectively acting on the magnet. On the other hand, magnetic flux produced by the coil 4 crosses the magnet 3, or the rotor between the external magnetic poles 19a, 19b, 19c, and 19d and the counterparts 22a, 22b, 21c, and 22d, thus effectively acting on the magnet to increase motor output.

The outer diameter of the first internal magnetic poles is larger than the inner diameter of the first coil, and the outer diameter of the second internal magnetic poles is larger than the inner diameter of the second coil. Because of this, the distance between the first external magnetic poles and the first internal magnetic poles and that between the second external magnetic poles and the second internal magnetic poles can be reduced if the inner diameter of the coils is reduced and if the volume which the coils take is increased. This, in turn, means that magnetic resistance is low as viewed from the coils, so that much magnetic flux is produced using low electric power, thus increasing motor output.

FIGS. 34 through 37 are cross-sectional views showing the relationship between the first and second drives and the motor, which consists of output means.

The relationship between the magnetization phase of the magnet 1 and the external magnetic poles 18a, 18c, 18c, and 18d differs by 180°/n, that is, 18° from that between the magnetization phase of the magnet 3 and the external magnetic poles 19a, 19b, 19c, and 19d.

How the output ring 31 is driven by the first and second drives will be described below. FIGS. 34A and 34B show that only the coil 2 is energized so that the external magnetic poles 18a, 18b, 18c, and 18d and N poles and that the counterparts 21a, 21b, 21c, and 21d are S poles. The S poles of the magnet 1 are positioned in the center of the external magnetic poles of the first stator 18. In this case, the magnetic pole 1c of the magnet 1 is positioned opposite to the center of the external magnetic pole 18a; the magnetic pole 1e of the magnet 1e the center of the external magnetic pole 18b; the magnetic pole 1g of the magnet 1, the center of the external magnetic pole 18c; and the magnetic pole 1i of the magnet 1, the center of the external magnetic pole 18d.

Figure 34:
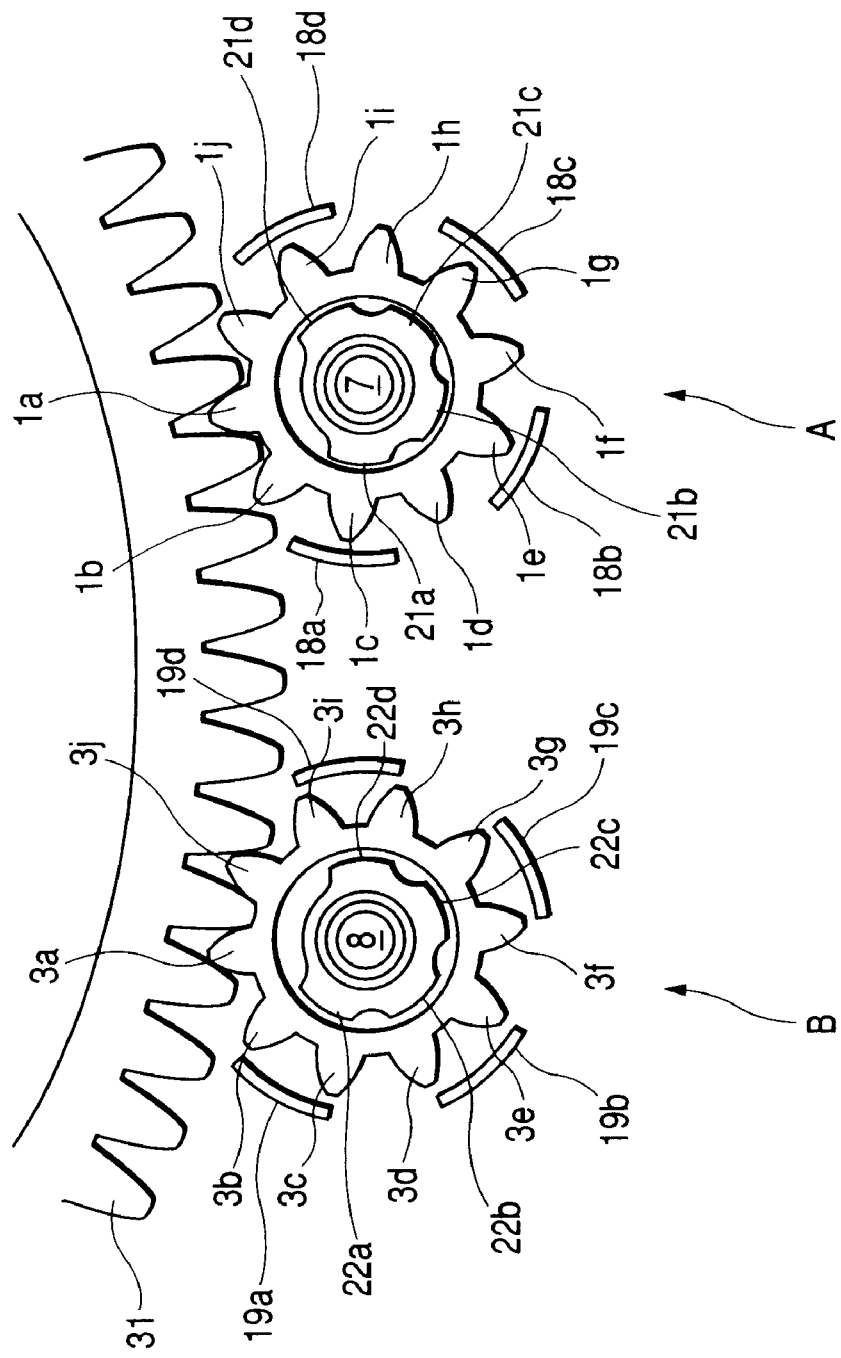
FIG. 34 is a view showing a relationship of a motor constituted by the first and second driving apparatuses and output means.

When the coil 4 is energized instead of the coil 2 under the condition in FIG. 34 so that the external magnetic poles 19a, 19b, 19c, and 19d are S poles and that the counterparts 22a, 22b, 22c, and 22d are N poles, the N poles of the magnet 3 are positioned in the center of the external magnetic poles of the second stator 19. In this case, the magnetic pole 3b of the magnet 3 is positioned opposite to the center of the external magnetic pole 19a; the magnetic pole 3d of the magnet 3, the center of the external magnetic pole 19b; the magnetic pole 3f of the magnet 3, the center of the external magnetic pole 19c; and the magnetic pole 3h of the magnet 3, the center of the external magnetic pole 19d.

Figure 35:
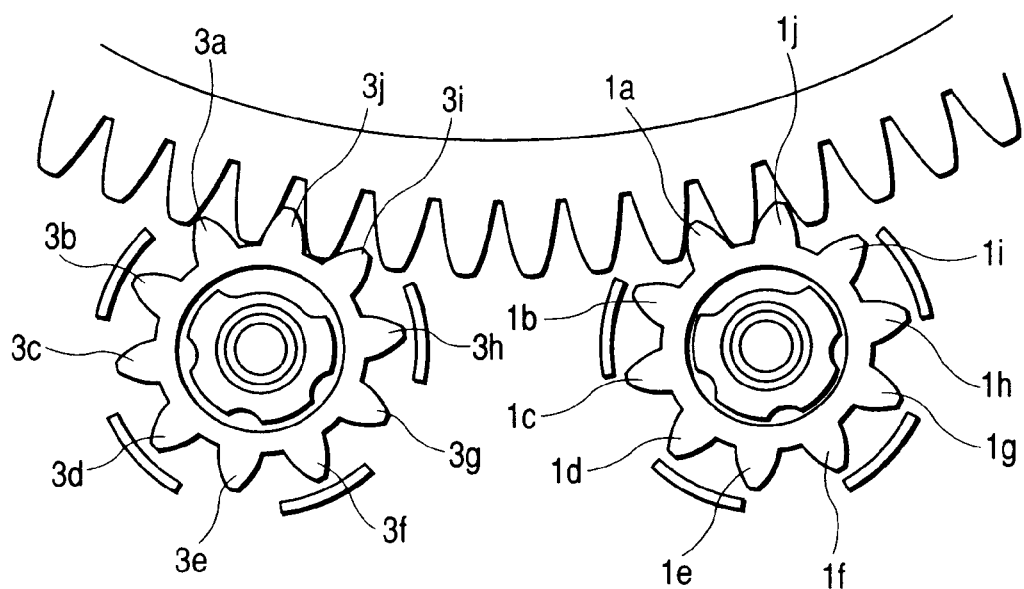
FIG. 35 is a view showing a relationship of the motor constituted by the first and second driving apparatuses and the output means.

The magnets 1 and 3 connected together through the output ring 31 rotate 18° counterclockwise, and the output ring 31 rotates accordingly to be as shown in FIG. 35.

Then the coil 2 is energized the same as the coil 4 in FIG. 34, and the coil 4 is deenergized.

When magnetization is performed so that the external magnetic poles 18a, 18b, 18c, and 18d are S poles and that the counterparts 21a, 21b, 21c, and 21d are N poles, the N poles of the magnet 1 are positioned in the center of the external magnetic poles of the first stator 18. In this case, the magnetic pole 1b of the magnet 1 is positioned opposite to the center of the external magnetic pole 18a; the magnetic pole 1d of the magnet 1, the center of the external magnetic pole 18b; the magnetic pole if of the magnet 1, the center of the external magnetic pole 18c; and the magnetic pole 1h of the magnet 1, the center of the external magnetic pole 18d.

Figure 36:
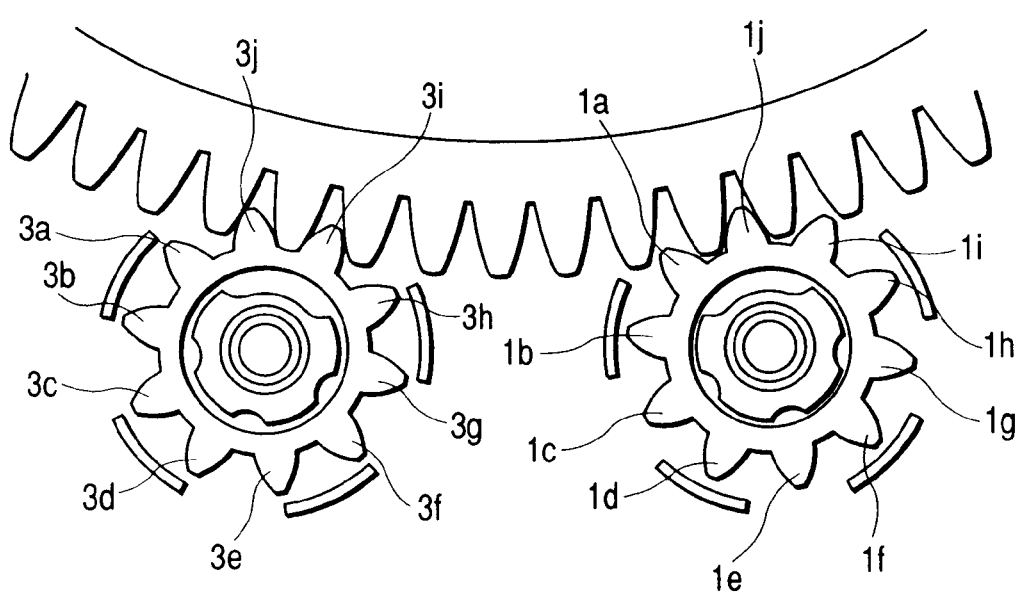
FIG. 36 is a view showing a relationship of the motor constituted by the first and second driving apparatuses and the output means.

The magnets 1 and 3 connected together through the output ring 31 rotate 18° counterclockwise, and the output ring 31 rotates accordingly to be as shown in FIG. 36.

Then the coil is reversely energized as opposed to the coil 2 in FIG. 35, and the coil 2 is deenergized.

When magnetization is performed so that the external magnetic poles 19a, 19b, 19c, and 19d are N poles and that the counterparts 22a, 22b, 22c, and 22d are S poles, the S poles of the magnet 3 are positioned in the center of the external magnetic poles of the second stator 19. In this case, the magnetic pole 3a of the magnet 3 is positioned opposite to the center of the external magnetic pole 19a; the magnetic pole 3c of the magnet 3, the center of the external magnetic pole 19b; the magnetic pole 3e of the magnet 3, the center of the external magnetic pole 19c; and the magnetic pole 3g of the magnet 3, the center of the external magnetic pole 19d.

Figure 37:
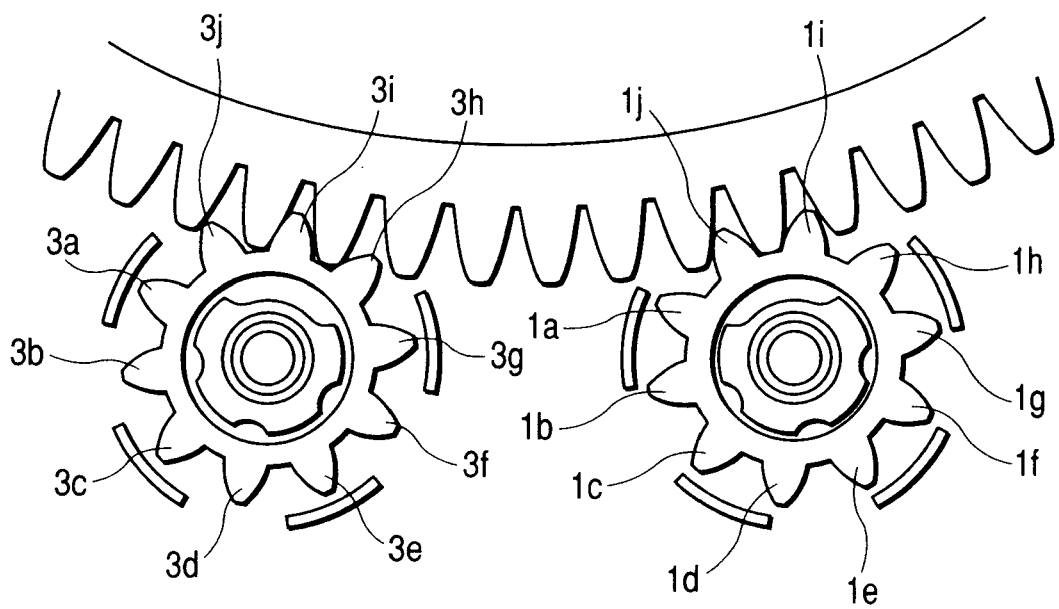
FIG. 37 is a view showing a relationship of the motor constituted by the first and second driving apparatuses and the output means.
Figure 38:
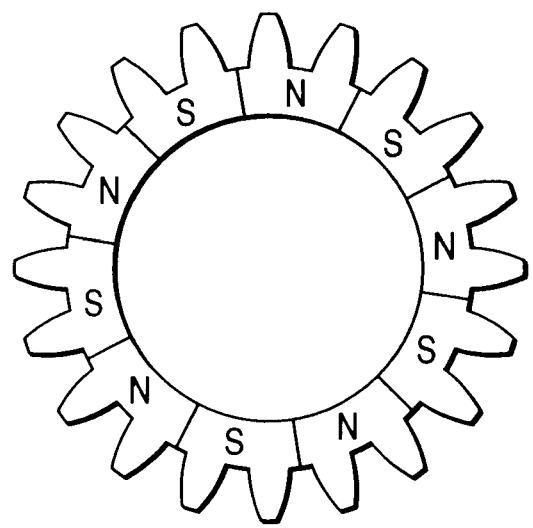
FIG. 38 is a plan view showing a relationship between a gear portion and phase of attraction of a magnet in another embodiment.
Figure 39:
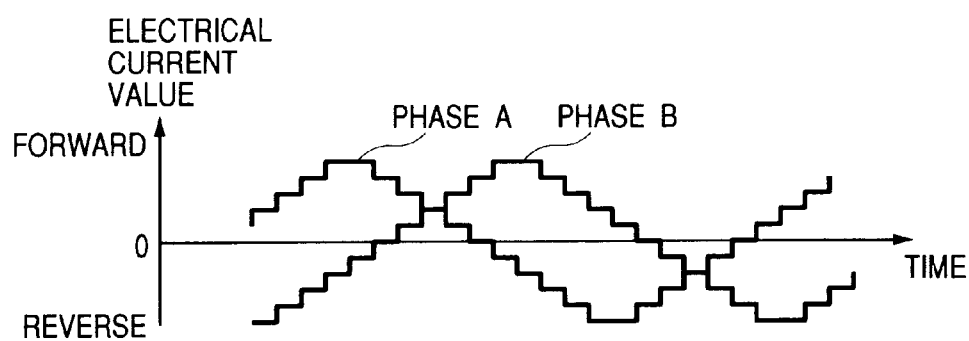
FIG. 39 is a diagram showing a typical energizing method of a conventional micro step driving.
Figure 40:
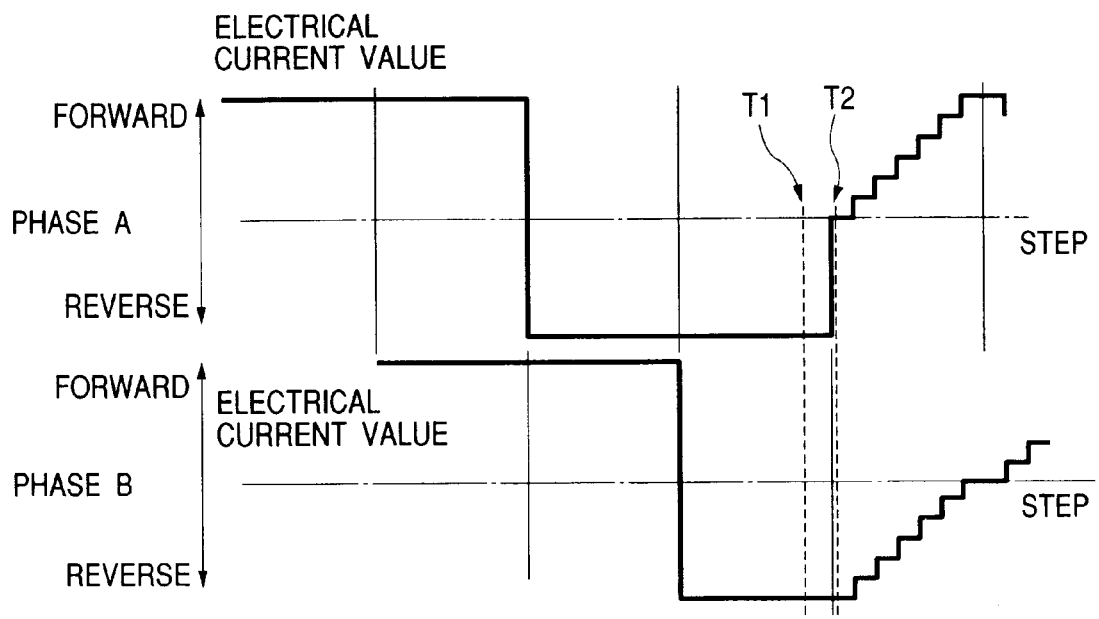
FIG. 40 is a view showing a mode of the energized an electrical current when switched from the conventional full step driving to micro step driving.
Figure 41:
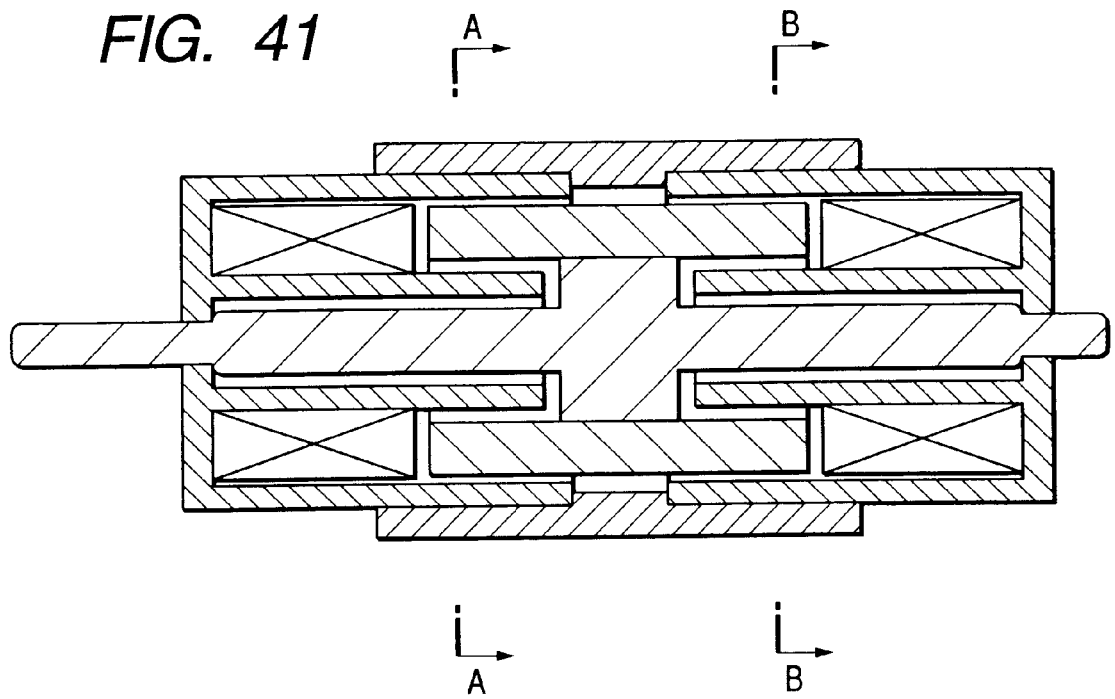
FIG. 41 is a sectional view of a stepping motor.
Figure 42A:
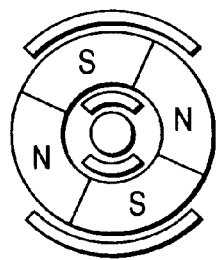
FIGS. 42A and 42B are views showing a relationship between a stator and a rotor.
Figure 42B:
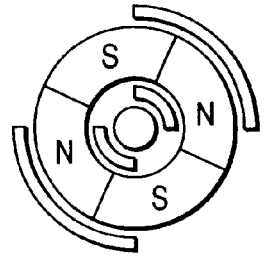
Figure 43A:
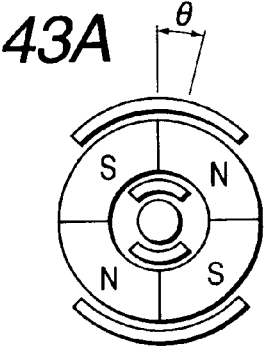
FIGS. 43A and 43B are views showing a relationship between the stator and rotor.
Figure 43B:
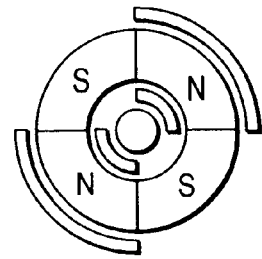
Figure 44:
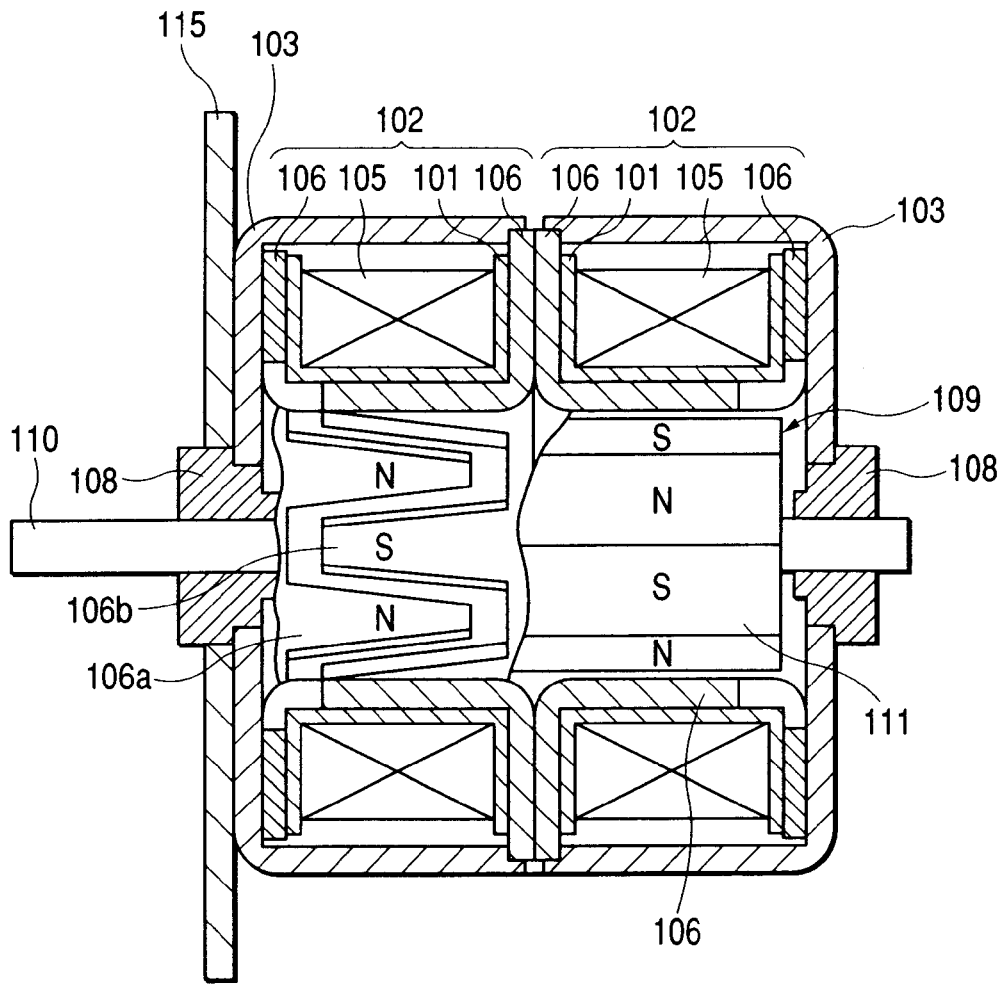
FIG. 44 is a sectional view of a conventional stepping motor.
Figure 45:
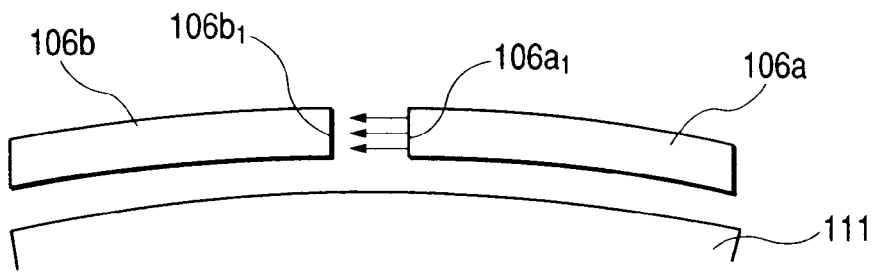
FIG. 45 is a sectional view showing a mode of the stator of the conventional stepping motor.
Figure 46:
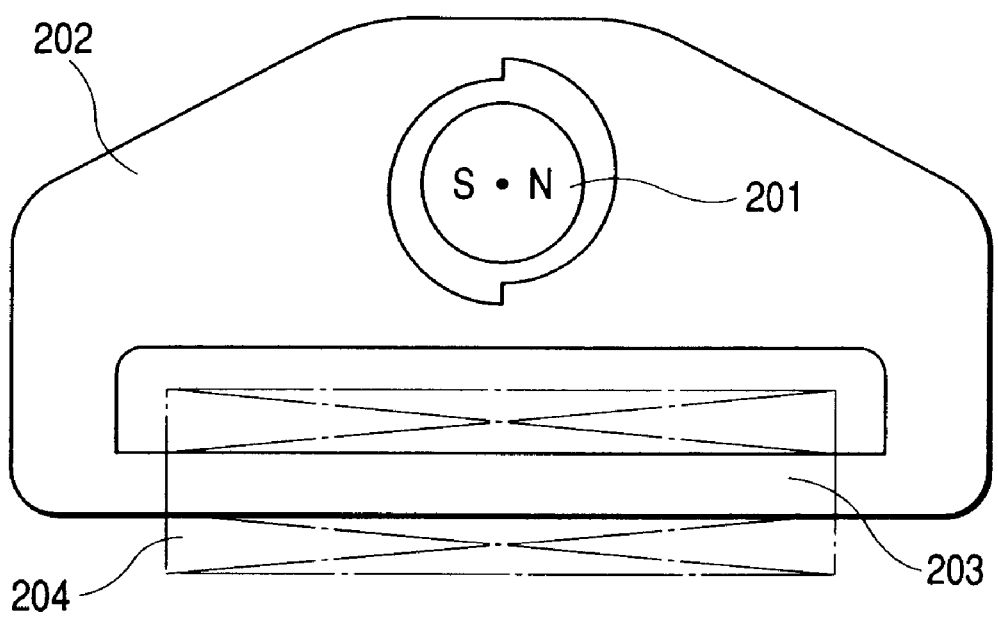
FIG. 46 is a plan view of another conventional stepping motor.

The magnets 1 and 3 connected together through the output ring 31 rotate 18° counterclockwise, and the output ring 31 rotates accordingly to be as shown in FIG. 37.

Energizing the coils 2 and 4 in the sequential ways as described above causes the magnets 1 and 3 and the output ring 31 to rotate at the same time to positions according to an energization phase.

The first and second drives have only to have an enough diameter to place the magnetic poles of the stators opposite to the diameter of the magnets. The first and second drives are permissibly as long as the magnets and the first or second coil together. Thus the size of the first and second drives depends on the diameter and length of the magnets and coils. Reducing the diameter and length of the magnets and coils allows the first and second drives to be downsized.

On the other hand, reducing the diameter and length of the magnets and coils makes it difficult to maintain the accuracy of the drives 1 and 2. To solve this problem, the magnets are formed into a hollow cylinder to provide such a simple structure that the external and internal magnetic poles of the first and second stators are opposite to the external and internal circumferential surfaces of the hollow cylinder. By dividing not only the external circumferential surface of the magnets but their internal circumferential surface circumferentially and magnetizing the surfaces, motor output can be increased.

The first and second drives are disposed not to block the opening 30D. Reducing the diameter of the drives allows the iris blade drive itself to be reduced in diameter.

Disposing the first and second drives axially in parallel with each other allows them, that is, the actuators driving the iris blades to be short in the direction of the optical axis and be prevented from obstructing other lenses and structures.

As described above, the relationship between the magnetization phase of the magnet 1 and the external magnetic poles 18a, 18c, 18c, and 18d differs by 180°/n, that is, 18° from that between the magnetization phase of the magnet 3 and the external magnetic poles 19a, 19b, 19c, and 19d. The gears 1p and 3p has as many teeth as the magnetic poles of the magnet 1 and 3, that is, 10 teeth. The tooth phases are adapted to be symmetric about the center of the magnetic poles of the magnet 1 or 3. The intensity of magnetism of the poles is well-balanced, thus providing a motor whose output is stable.

The output ring 31 is engaged with the toothed part of the magnet 1 between the external magnetic poles 18a and 18d, where the interval between the poles is larger than that between the other poles of the first stator and with the toothed part of the magnet 3 between the external magnetic poles 19a and 19d, where the interval between the poles is larger than that between the other poles of the second stator. Thus the output ring can be axially disposed in the same positions as the external magnetic poles so that the ring does not come in contact with the external magnetic poles. This allows the axial dimension (the dimension in FIG. 4H) of the motor to be reduced.

The embodiment is arranged so that the number of the magnetic poles of the magnets is equal to that of the teeth of the toothed part and that the center of each magnetic pole is in phase with a tooth. Such formation allows an assembler to check magnet magnetization phases by observing the phases of the phases of the gears 1p and 3p.

Thus observing the position of the teeth of the gears allows the magnetization phases of the magnets to be visually checked. The magnets of the first and second drives rotate through the output means with respect to each other. Visually checking the magnetization phases as described above helps assemble the magnets in place, thus increasing assembly efficiency.

For the embodiment, the magnets 1 and 3 are connected together through the gears which have as many teeth as the magnetic poles and the toothed part of the output ring. However, if ease of assembly is neglected, the number of teeth of the first and second gears which is not equal to the number of the magnetic poles of the magnets 1 and 3 but its integral multiple allows the tooth phases to be provided so that they are symmetric about the center of the magnetic poles of the magnet 1 or 3. As a result, the intensity of magnetism of the poles is well-balanced, thus providing a motor whose output is stable. FIG. 38 shows a gear which has twice as many teeth as the magnetic poles. In the figure, the center of a magnetic pole is between two teeth, and the magnet is formed to be symmetric about the center of a magnetic pole, so that magnetism distribution is symmetric about the center of a magnetic pole.

The embodiment uses the motor which consists of the first and second drives and the output ring, or output means, as an actuator which opens or closes the iris blades. However, the motor, which finds other uses, such as rotating a cam cylinder to drive a lens, also has the advantages of high power, a small diameter, and a short axial length.

What is claimed is:

1. A driving apparatus for a stepping motor using a micro step driving mode where an exciting current, which is increased and decreased step by step, is energized to each phase, said driving apparatus comprising:
    a drive control circuit, which causes a drive circuit to perform energization to each phase by a predetermined combination of energization values to each phase when the stepping motor rotates in one direction, and energization to each phase by a combination different from the predetermined combination of energization values when the stepping motor rotates in another direction.

2. The driving apparatus according to claim 1, further comprising a memorizing circuit provided where the predetermined combination of the energization values to each phase is memorized as a first micro step driving table and the combination of the energization values different from the predetermined combination of the energization values of said first micro step driving table is memorized as a second micro step driving table,
    wherein said drive control circuit selects one of said first micro step driving table and said second micro step driving table depending upon a rotational direction of the stepping motor and, when rotating the stepping motor in the one direction, causes said drive circuit to perform energization to each phase at the energization value of a combination read out from said first micro step driving table step by step, and when rotating the stepping motor in the another direction, causes said drive circuit to perform energization to each phase at the energization value of the combination read out from said second micro step driving table step by step.

3. The driving apparatus according to claim 1, wherein the predetermined combination of the energization values to each phase when the stepping motor is driven in the one direction and the combination thereof when the motor is driven in the another direction is set in such a manner that a stopping position at each step of a driven object, which is driven by the stepping motor, is the same independently of the rotational direction of the stepping motor.

4. The driving apparatus according to claim 2, wherein the combination of the energization values to each phase read out from said first micro step driving table and said second micro step driving table is set in such a manner that a stopping position at each step of the driven object, which is driven by the stepping motor is the same independently of the rotational direction.

5. A driving control apparatus for a stepping motor having a full step driving mode where an exciting current for step driving is energized to each phase and a micro step driving mode where a step in the full step driving mode is divided into a plurality of steps and the exciting current, which is increased and decreased step by step, is energized to each phase, said driving control apparatus comprising:
    a drive control circuit, which causes a drive circuit to switch between a full step driving mode and a micro step driving mode at a timing such that an absolute value of an energized electrical current in each phase during the micro step driving mode is a same value and an energization value at the micro step driving mode is different from an energization value at the full step driving mode.

6. A driving control apparatus according to claim 5, wherein said driving control circuit causes said drive circuit to perform the full step driving mode when the remaining number of driving steps of the stepping motor is more than a predetermined value, and causes said drive circuit to perform the micro step driving mode when the remaining number of driving steps of the stepping motor is equal to or less than a predetermined value.

7. A driving apparatus for a stepping motor comprising:
    a memorizing circuit which memorizes a micro step driving table constituted by a combination of the energization values;
    a control circuit which sets a number of driving steps of the stepping motor;
    wherein said control circuit carries out micro step driving selectively by one of said micro step driving table and a calculation of a value of said micro step driving table with a first function depending upon an area in the number of driving steps.

8. A driving method for a stepping motor having a micro step driving mode where an exciting current, which is increased and decreased step by step, is energized to each phase, comprising:
    a drive control step which causes a drive circuit to perform energization to each phase by a predetermined combination of energization values to each phase, when said stepping motor rotates in one direction, and energization to each phase by a combination different from the predetermined combination of energization values to each phase when said stepping motor rotates in another direction.

9. A driving control method for a stepping motor having a full step driving mode where an exciting current for step driving is energized to each phase and a micro step driving mode where a step in the full step driving mode is divided into a plurality of steps and the exciting current, which is increased and decreased step by step, is energized to each phase, comprising:

a drive control step which causes a drive circuit to switch between the full step driving mode and the micro step driving mode at a timing such that an absolute value of an energized electrical current in each phase during the micro step driving mode is the same value and energization value at the micro step driving mode is different from energization value at the full step driving mode.

10. A driving apparatus for a stepping motor using a micro step driving mode where an exciting current, which is increased and decreased step by step, is energized to each phase, comprising:

a drive control circuit, which sets a number of driving steps of the stepping motor and which causes a drive circuit to perform energization to each phase by a predetermined combination of the energiztion values to each phase, wherein said control circuit causes said drive circuit to perform energization to each phase by a calculation of a value of said predetermined combination with a first function when the remaining number of driving steps of the stepping motor is equal to or less than a predetermined value.

11. The driving apparatus according to claim 10, wherein said drive control circuit causes said driving circuit to perform energization to each phase by a calculation of a value of said predetermined combination with a second function after said control circuit causes said drive circuit to perform energization to each phase by said calculation of the value of said predetermined combination with said first function.

12. The driving apparatus according to claim 10, wherein said calculation of the value of said predetermined conbination with said first function is greater than the value of said predetermined combination.

13. The driving apparatus according to claim 11, wherein said calculation of the value of said predetermined combination with said first function is larger than the value of said predetermined combination and said calculation of the value of said predetermined combination with said second function.

14. The driving apparatus according to claim 11, wherein said drive control circuit causes said driving circuit to perform energization to each phase by the calculation of the value of said predetermined combination with the second function to keep a rotor of said stepping motor in position which is positioned.

15. A driving control apparatus for a stepping motor having a full step driving mode where an exciting current for step driving is energized to each phase and a micro step driving mode where a step in the full step driving mode is divided into a plurality of steps and the exciting current, which is increased and decreased step by step, is energized to each phase, said driving control apparatus comprising:

a driving control circuit, which causes a drive circuit to switch between a full step driving mode and a micro step driving mode at a timing such that an absolute value of an energized electrical current in each phase during the micro step driving mode is a value close to the same value and an energization value at the micro step driving mode is different from an energization value at the full step driving mode.

16. The driving apparatus according to claim 15, wherein said driving control circuit causes said drive circuit to perform the full step driving mode when the remaining number of driving steps of the stepping motor is more than a predetermined value, and causes said drive circuit to perform the micro step driving mode when the remaining number of driving steps of the stepping motor is equal to or less than a predetermined value.

17. The driving apparatus according to claim 16, wherein said driving control circuit causes said driving circuit to perform a micro step driving mode when driving of said stepping motor is commenced.

18. A driving control method for a stepping motor having a full step driving mode where an exciting current for step driving is energized to each phase and a micro step driving mode where a step in the full step driving mode is divided into a plurality of steps and the exciting current, which is increased and decreased step by step, is energized to each phase, said driving apparatus comprising:

a driving control step which causes a drive circuit to switch between the full step driving mode and the micro step driving mode at a timing such that an absolute value of an energized electrical current in each phase during the micro step driving mode is a value close to the same value and energization value at the micro step driving mode is different from an energization value at the full step driving mode.

* * * * *

UNITED STATES PATENT AND TRADEMARK OFFICE
CERTIFICATE OF CORRECTION

PATENT NO. : 6,713,985 B2
DATED : March 30, 2004
INVENTOR(S) : Chikara Aoshima

It is certified that error appears in the above-identified patent and that said Letters Patent is hereby corrected as shown below:

Column 24,
Line 47, "consumption" should read -- consumption of --.

Column 25,
Lines 6, 15, 17 and 41, "consumption" should read -- consumption of --.
Line 18, "tion" should read -- tion of --.

Column 26,
Line 32, "consumption" should read -- comsumption of --.

Column 28,
Line 41, "consumption" should read -- consumption of --.

Column 29,
Line 40, "forms" should read -- form --.

Column 35,
Line 50, "forms" should read -- form --.

Column 41,
Line 44, "conbi-" should read -- combi- --.

Signed and Sealed this

Twenty-seventh Day of July, 2004

JON W. DUDAS
*Acting Director of the United States Patent and Trademark Office*